US008489913B2

(12) United States Patent
Arai et al.

(10) Patent No.: US 8,489,913 B2
(45) Date of Patent: Jul. 16, 2013

(54) NETWORK SYSTEM AND NETWORK RELAY APPARATUS

(75) Inventors: Masaya Arai, Atsugi (JP); Shinji Nozaki, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 368 days.

(21) Appl. No.: 12/841,532

(22) Filed: Jul. 22, 2010

(65) Prior Publication Data
US 2011/0055622 A1    Mar. 3, 2011

(30) Foreign Application Priority Data

Sep. 2, 2009 (JP) ................................. 2009-202297

(51) Int. Cl.
G06F 11/00 (2006.01)
(52) U.S. Cl.
USPC ........................... 714/4.2; 714/4.11; 714/4.12
(58) Field of Classification Search
USPC ........................................ 714/4.11, 4.12, 4.2
See application file for complete search history.

(56) References Cited

U.S. PATENT DOCUMENTS

| | | | |
|---|---|---|---|
| 6,763,479 B1 * | 7/2004 | Hebert | 714/4.11 |
| 7,010,716 B2 * | 3/2006 | Yu et al. | 714/4.12 |
| 7,139,926 B1 * | 11/2006 | Madhav et al. | 714/4.11 |
| 7,152,179 B1 * | 12/2006 | Critchfield | 714/4.11 |
| 7,590,757 B1 * | 9/2009 | Barnes | 709/224 |
| 7,590,886 B2 * | 9/2009 | Moscirella et al. | 714/13 |
| 7,693,047 B2 * | 4/2010 | Guichard et al. | 370/217 |
| 7,783,914 B1 * | 8/2010 | Havemose | 714/4.11 |
| 8,032,780 B2 * | 10/2011 | Koh et al. | 714/4.11 |
| 8,051,322 B2 * | 11/2011 | Matsumoto et al. | 714/4.11 |
| 8,264,947 B1 * | 9/2012 | Tavares | 370/216 |
| 8,266,472 B2 * | 9/2012 | Bose | 714/4.11 |
| 2004/0010731 A1 * | 1/2004 | Yu et al. | 714/4 |
| 2004/0223500 A1 * | 11/2004 | Sanderson et al. | 370/395.53 |
| 2005/0172161 A1 * | 8/2005 | Cruz et al. | 714/4 |
| 2005/0198327 A1 * | 9/2005 | Iwamura et al. | 709/229 |
| 2005/0204183 A1 * | 9/2005 | Saika | 714/4 |
| 2006/0209682 A1 * | 9/2006 | Filsfils et al. | 370/219 |
| 2006/0294211 A1 * | 12/2006 | Amato | 709/220 |
| 2007/0121486 A1 * | 5/2007 | Guichard et al. | 370/216 |
| 2007/0198710 A1 * | 8/2007 | Gopalakrishnan | 709/225 |
| 2009/0037763 A1 * | 2/2009 | Adhya et al. | 714/4 |

(Continued)

FOREIGN PATENT DOCUMENTS

| | | |
|---|---|---|
| JP | 2005-056347 | 3/2005 |
| JP | 2005-250626 | 9/2005 |
| JP | 2005-258847 | 9/2005 |

Primary Examiner — Joshua P Lottich
(74) Attorney, Agent, or Firm — Antonelli, Terry, Stout & Kraus, LLP.

(57) ABSTRACT

The network system is provided. The network system includes: a first processing apparatus configured to provide a specific service; a second processing apparatus configured to provide the specific service, the first processing apparatus and the second processing apparatus having one identical address; a client apparatus configured to utilize the specific service; and a network relay apparatus connected directly or indirectly via interfaces to the first processing apparatus, the second processing apparatus, and the client apparatus and configured to relay packet transmission between the client apparatus and the first processing apparatus or the second processing apparatus, wherein the network relay apparatus forwards a received packet, which is received via the interface connecting with the client apparatus to be sent to the address as a destination, to one processing apparatus in a state enabled to provide the specific service between the first processing apparatus and the second processing apparatus.

17 Claims, 51 Drawing Sheets

U.S. PATENT DOCUMENTS

2009/0158082 A1* 6/2009 Jain et al. .......................... 714/4
2009/0245259 A1* 10/2009 Filsfils et al. ................. 370/392
2010/0271937 A1* 10/2010 Durbin et al. ................. 370/225
2011/0072108 A1* 3/2011 Gopalakrishnan ............ 709/217
2011/0164508 A1* 7/2011 Arai et al. ..................... 370/245

* cited by examiner

Fig.2

| IP ADDRESS | SUBNET MASK LENGTH | DEFAULT GATEWAY |
|---|---|---|
| 10. 1. 1. 1 | 24 | 10. 1. 1. 254 |

Fig.3

| IP ADDRESS | SUBNET MASK LENGTH | DEFAULT GATEWAY |
|---|---|---|
| 20. 1. 1. 1 | 24 | 20. 1. 1. 254 |

Fig.4

| IP ADDRESS | SUBNET MASK LENGTH | DEFAULT GATEWAY |
|---|---|---|
| 30. 1. 1. 1 | 24 | 30. 1. 1. 254 |

Fig.5

C1: vrf definition 1
C2: vrf definition 2
C3: interface ethernet 131
C4:   vrf forwarding 1
C5:   ip address 10.1.1.254/24
C6: interface ethernet 132
C7:   vrf forwarding 2
C8:   ip address 10.1.1.254/24
C9: interface ethernet 133
C10:   vrf forwarding 1
C11:   vrf forwarding 2 redundant track 50 lock
C12:   ip address 20.1.1.254/24
C13: interface ethernet 134
C14:   vrf forwarding 1
C15:   vrf forwarding 2 redundant track 50 recovery
C16:   ip address 30.1.1.254/24
C17: track 50 ip route 10.1.1.1 vrf 1 reachability

| | DESTINATION IP ADDRESS | SUBNET MASK LENGTH | NEXT HOP IP ADDRESS | OUTPUT INTERFACE |
|---|---|---|---|---|
| E1 | 10. 1. 1. 1 | 32 | 10. 1. 1. 1 | 131 |
| E2 | 10. 1. 1. 254 | 32 | — | — |
| E3 | 20. 1. 1. 1 | 32 | 20. 1. 1. 1 | 133 |
| E4 | 20. 1. 1. 254 | 32 | — | — |
| E5 | 30. 1. 1. 1 | 32 | 30. 1. 1. 1 | 134 |
| E6 | 30. 1. 1. 254 | 32 | — | — |

| | DESTINATION IP ADDRESS | SUBNET MASK LENGTH | NEXT HOP IP ADDRESS | OUTPUT INTERFACE |
|---|---|---|---|---|
| E1 | 10. 1. 1. 1 | 32 | 10. 1. 1. 1 | 132 |
| E2 | 10. 1. 1. 254 | 32 | — | — |

Fig.15

| MONITOR ID | MONITOR OBJECT IP ADDRESS | MONITOR OBJECT VRF | MONITOR STATE |
|---|---|---|---|
| 50 | 10. 1. 1. 1 | 1 | COMMUNICATION DISABLED |

E1 (row marker); 170 (table marker)

| DESTINATION IP ADDRESS | SUBNET MASK LENGTH | NEXT HOP IP ADDRESS | OUTPUT INTERFACE |
|---|---|---|---|
| 10. 1. 1. 1 | 32 | 10. 1. 1. 1 | 131 |
| 10. 1. 1. 254 | 32 | — | — |

| | DESTINATION IP ADDRESS | SUBNET MASK LENGTH | NEXT HOP IP ADDRESS | OUTPUT INTERFACE |
|---|---|---|---|---|
| E1 | 10. 1. 1. 1 | 32 | 10. 1. 1. 1 | 132 |
| E2 | 10. 1. 1. 254 | 32 | — | — |
| E3 | 20. 1. 1. 1 | 32 | 20. 1. 1. 1 | 133 |
| E4 | 20. 1. 1. 254 | 32 | — | — |
| E5 | 30. 1. 1. 1 | 32 | 30. 1. 1. 1 | 134 |
| E6 | 30. 1. 1. 254 | 32 | — | — |

| | INTERFACE NUMBER | VRF NUMBER | IP ADDRESS | SUBNET MASK LENGTH |
|---|---|---|---|---|
| E1 | 131 | 1 | 10. 1. 1. 254 | 24 |
| E2 | 132 | 2 | 10. 1. 1. 254 | 24 |
| E3 | 133 | 2 | 20. 1. 1. 254 | 24 |
| E4 | 134 | 1 | 30. 1. 1. 254 | 24 |

| | DESTINATION IP ADDRESS | SUBNET MASK LENGTH | NEXT HOP IP ADDRESS | OUTPUT INTERFACE |
|---|---|---|---|---|
| E1 | 10. 1. 1. 1 | 32 | 10. 1. 1. 1 | 131 |
| E2 | 10. 1. 1. 254 | 32 | — | — |
| E3 | 30. 1. 1. 1 | 32 | 30. 1. 1. 1 | 134 |
| E4 | 30. 1. 1. 254 | 32 | — | — |

Fig.24

|  | DESTINATION IP ADDRESS | SUBNET MASK LENGTH | NEXT HOP IP ADDRESS | OUTPUT INTERFACE |
|---|---|---|---|---|
| E1 | 10. 1. 1. 1 | 32 | 10. 1. 1. 1 | 132 |
| E2 | 10. 1. 1. 254 | 32 | — | — |
| E3 | 20. 1. 1. 1 | 32 | 20. 1. 1. 1 | 133 |
| E4 | 20. 1. 1. 254 | 32 | — | — |

Router# redundancy force-switchover interface 133 vrf 1

Fig.27

C1: vrf definition 1
C2: vrf definition 2
C3: interface ethernet 131
C4:     vrf forwarding 1
C201:     vrf forwarding 2 redundant track 50 switch-back
C5:    ip address 10.1.1.254/24
C6: interface ethernet 132
C202:     vrf forwarding 1 redundant track 50 switch-back
C7:    vrf forwarding 2
C8:    ip address 10.1.1.254/24
C9: interface ethernet 133
C10:    vrf forwarding 1
C12:    ip address 20.1.1.254/24
C13: interface ethernet 134
C14:    vrf forwarding 1
C16:    ip address 30.1.1.254/24
C203: track 50 ip route 10.1.1.1 vrf 1 reachability

Fig.28

| | MONITOR ID | CHANGEOVER OBJECT INTERFACE | CHANGEOVER DESTINATION VRF | POST CHANGEOVER OPERATION |
|---|---|---|---|---|
| E21 | 50 | 131 | 2 | SWITCHBACK |
| E22 | 50 | 132 | 1 | SWITCHBACK |

| | INTERFACE NUMBER | VRF NUMBER | IP ADDRESS | SUBNET MASK LENGTH |
|---|---|---|---|---|
| E21 | 131 | 2 | 10. 1. 1. 254 | 24 |
| E22 | 132 | 1 | 10. 1. 1. 254 | 24 |
| E23 | 133 | 1 | 20. 1. 1. 254 | 24 |
| E24 | 134 | 1 | 30. 1. 1. 254 | 24 |

| | DESTINATION IP ADDRESS | SUBNET MASK LENGTH | NEXT HOP IP ADDRESS | OUTPUT INTERFACE |
|---|---|---|---|---|
| E21 | 10. 1. 1. 1 | 32 | 10. 1. 1. 1 | 132 |
| E22 | 10. 1. 1. 254 | 32 | — | — |
| E23 | 20. 1. 1. 1 | 32 | 20. 1. 1. 1 | 133 |
| E24 | 20. 1. 1. 254 | 32 | — | — |
| E25 | 30. 1. 1. 1 | 32 | 30. 1. 1. 1 | 134 |
| E26 | 30. 1. 1. 254 | 32 | — | — |

Fig.32

| | DESTINATION IP ADDRESS | SUBNET MASK LENGTH | NEXT HOP IP ADDRESS | OUTPUT INTERFACE |
|---|---|---|---|---|
| E21 | 10. 1. 1. 1 | 32 | 10. 1. 1. 1 | 131 |
| E22 | 10. 1. 1. 254 | 32 | — | — |

| | MONITOR ID | CHANGEOVER OBJECT INTERFACE | CHANGEOVER DESTINATION VRF | POST CHANGEOVER OPERATION |
|---|---|---|---|---|
| E21 | 50 | 131 | 1 | SWITCHBACK |
| E22 | 50 | 132 | 2 | SWITCHBACK |

| IP ADDRESS | SUBNET MASK LENGTH | DEFAULT GATEWAY |
|---|---|---|
| 10. 1. 1. 2 | 24 | 10. 1. 1. 254 |

Fig.36

C1: vrf definition 1
C2: vrf definition 2
C3: interface ethernet 131
C4:     vrf forwarding 1
C5:     ip address 10.1.1.254/24
C6: interface ethernet 132
C7:     vrf forwarding 2
C8:     ip address 10.1.1.254/24
C9: interface ethernet 133
C10:    vrf forwarding 1
C12:    ip address 20.1.1.254/24
C13: interface ethernet 134
C14:    vrf forwarding 1
C16:    ip address 30.1.1.254/24
C17: track 50 ip route 10.1.1.1 vrf 1 reachability
C301: track 51 ip route 10.1.1.2 vrf 1 reachability
C302: ip route 10.1.1.1 vrf  1 redundant track 50 out-interface 132
C303: ip route 10.1.1.2 vrf  1 redundant track 51 out-interface 132

Fig.37

|  | DESTINATION IP ADDRESS | SUBNET MASK LENGTH | NEXT HOP IP ADDRESS | OUTPUT INTERFACE |
|---|---|---|---|---|
| E31 | 10. 1. 1. 1 | 32 | 10. 1. 1. 1 | 131 |
| E32 | 10. 1. 1. 2 | 32 | 10. 1. 1. 2 | 131 |
| E33 | 10. 1. 1. 254 | 32 | — | — |
| E34 | 20. 1. 1. 1 | 32 | 20. 1. 1. 1 | 133 |
| E35 | 20. 1. 1. 254 | 32 | — | — |
| E36 | 30. 1. 1. 1 | 32 | 30. 1. 1. 1 | 134 |
| E37 | 30. 1. 1. 254 | 32 | — | — |

|  | DESTINATION IP ADDRESS | SUBNET MASK LENGTH | NEXT HOP IP ADDRESS | OUTPUT INTERFACE |
|---|---|---|---|---|
| E31 | 10. 1. 1. 1 | 32 | 10. 1. 1. 1 | 132 |
| E32 | 10. 1. 1. 2 | 32 | 10. 1. 1. 2 | 132 |
| E33 | 10. 1. 1. 254 | 32 | — | — |

| MONITOR ID | MONITOR OBJECT IP ADDRESS | MONITOR OBJECT VRF | MONITOR STATE |
|---|---|---|---|
| 50 | 10. 1. 1. 1 | 1 | COMMUNICATION ENABLED |
| 51 | 10. 1. 1. 2 | 1 | COMMUNICATION ENABLED |

E31 → row 1
E32 → row 2

| MONITOR ID | CHANGEOVER OBJECT VRF | CHANGEOVER OBJECT ROUTE | CHANGEOVER DESTINATION OUTPUT INTERFACE |
|---|---|---|---|
| 50 | 1 | 10. 1. 1. 1 | 132 |
| 51 | 1 | 10. 1. 1. 2 | 132 |

E31 → row 1
E32 → row 2

Fig.41

| MONITOR ID | MONITOR OBJECT IP ADDRESS | MONITOR OBJECT VRF | MONITOR STATE |
|---|---|---|---|
| 50 | 10. 1. 1. 1 | 1 | COMMUNICATION DISABLED |
| 51 | 10. 1. 1. 2 | 1 | COMMUNICATION ENABLED |

|   | DESTINATION IP ADDRESS | SUBNET MASK LENGTH | NEXT HOP IP ADDRESS | OUTPUT INTERFACE |
|---|---|---|---|---|
| E31 | 10. 1. 1. 1 | 32 | 10. 1. 1. 1 | 132 |
| E32 | 10. 1. 1. 2 | 32 | 10. 1. 1. 2 | 131 |
| E33 | 10. 1. 1. 254 | 32 | — | — |
| E34 | 20. 1. 1. 1 | 32 | 20. 1. 1. 1 | 133 |
| E35 | 20. 1. 1. 254 | 32 | — | — |
| E36 | 30. 1. 1. 1 | 32 | 30. 1. 1. 1 | 134 |
| E37 | 30. 1. 1. 254 | 32 | — | — |

|   | DESTINATION IP ADDRESS | SUBNET MASK LENGTH | NEXT HOP IP ADDRESS | OUTPUT INTERFACE |
|---|---|---|---|---|
| E31 | 10. 1. 1. 1 | 32 | 10. 1. 1. 1 | 132 |
| E32 | 10. 1. 1. 2 | 32 | 10. 1. 1. 2 | 132 |
| E33 | 10. 1. 1. 254 | 32 | — | — |
| E34 | 20. 1. 1. 1 | 32 | 20. 1. 1. 1 | 133 |
| E35 | 20. 1. 1. 254 | 32 | — | — |
| E36 | 30. 1. 1. 1 | 32 | 30. 1. 1. 1 | 134 |
| E37 | 30. 1. 1. 254 | 32 | — | — |

| | MONITOR ID | CHANGEOVER OBJECT VRF | CHANGEOVER OBJECT ROUTE | CHANGEOVER DESTINATION OUTPUT INTERFACE |
|---|---|---|---|---|
| E31 | | | | 181 |
| E32 | 50 | 1 | 10. 1. 1. 1 | 131 |
| | 51 | 1 | 10. 1. 1. 2 | 132 |

Fig.49

Router# clear ip route vrf 2

Fig.50

Router# clear ip route vrf 1 10.1.1.1

Fig.52

C1: vrf definition 1
C2: vrf definition 2
C3: interface ethernet 131
C4:     vrf forwarding 1
C5:     ip address 10.1.1.254/24
C6: interface ethernet 132
C7:     vrf forwarding 2
C8:     ip address 10.1.1.254/24
C9: interface ethernet 133
C401:   vrf forwarding 1 load-balance track 50 lock
C402:   vrf forwarding 2 load-balance
C12:    ip address 20.1.1.254/24
C13: interface ethernet 134
C403:   vrf forwarding 1 load-balance track 50 recovery
C404:   vrf forwarding 2 load-balance
C16:    ip address 30.1.1.254/24
C17: track 50 ip route 10.1.1.1 vrf 1 reachability

Fig.53

| | INTERFACE NUMBER | VRF NUMBER | IP ADDRESS | SUBNET MASK LENGTH |
|---|---|---|---|---|
| E41 | 131 | 1 | 10. 1. 1. 254 | 24 |
| E42 | 132 | 2 | 10. 1. 1. 254 | 24 |
| E43 | 133 | LB | 20. 1. 1. 254 | 24 |
| E44 | 134 | LB | 30. 1. 1. 254 | 24 |

| | INTERFACE NUMBER | LOAD BALANCE TYPE | VRF NUMBER |
|---|---|---|---|
| E41 | 133 | SOURCE IP ADDRESS | (1, 2) |
| E42 | 134 | SOURCE IP ADDRESS | (1, 2) |

| | DESTINATION IP ADDRESS | SUBNET MASK LENGTH | NEXT HOP IP ADDRESS | OUTPUT INTERFACE |
|---|---|---|---|---|
| E41 | 10. 1. 1. 1 | 32 | 10. 1. 1. 1 | 131 |
| E42 | 10. 1. 1. 254 | 32 | — | — |
| E43 | 20. 1. 1. 1 | 32 | 20. 1. 1. 1 | 133 |
| E44 | 20. 1. 1. 254 | 32 | — | — |
| E45 | 30. 1. 1. 1 | 32 | 30. 1. 1. 1 | 134 |
| E46 | 30. 1. 1. 254 | 32 | — | — |

| | DESTINATION IP ADDRESS | SUBNET MASK LENGTH | NEXT HOP IP ADDRESS | OUTPUT INTERFACE |
|---|---|---|---|---|
| E41 | 10. 1. 1. 1 | 32 | 10. 1. 1. 1 | 132 |
| E42 | 10. 1. 1. 254 | 32 | — | — |
| E43 | 20. 1. 1. 1 | 32 | 20. 1. 1. 1 | 133 |
| E44 | 20. 1. 1. 254 | 32 | — | — |
| E45 | 30. 1. 1. 1 | 32 | 30. 1. 1. 1 | 134 |
| E46 | 30. 1. 1. 254 | 32 | — | — |

Fig.58

|  | MONITOR ID | CHANGEOVER OBJECT INTERFACE | NON-LOAD BALANCE OBJECT VRF | POST CHANGEOVER OPERATION |
|---|---|---|---|---|
| E41 | 50 | 133 | 1 | LOCK |
| E42 | 50 | 134 | 1 | RECOVERY |

| INTERFACE NUMBER | LOAD BALANCE TYPE | VRF NUMBER |
|---|---|---|
| 133 | SOURCE IP ADDRESS | 2 |
| 134 | SOURCE IP ADDRESS | 2 |

141

E41 → (row 1)
E42 → (row 2)

Fig.64

| | INTERFACE NUMBER | LOAD BALANCE TYPE | VRF NUMBER |
|---|---|---|---|
| E41 | 133 | SOURCE IP ADDRESS | 2 |
| E42 | 134 | SOURCE IP ADDRESS | (1, 2) |

Router# redundancy force-switchover interface 133 vrf 1,2

Fig.67

C1: vrf definition 1
C2: vrf definition 2
C3: interface ethernet 131
C4:    vrf forwarding 1
C5:    ip address 10.1.1.254/24
C6: interface ethernet 132
C7:    vrf forwarding 2
C8:    ip address 10.1.1.254/24
C9: interface ethernet 133
C10:   vrf forwarding 1
C12:   ip address 20.1.1.254/24
C13: interface ethernet 134
C14:   vrf forwarding 1
C16:   ip address 30.1.1.254/24
C501: interface ethernet 135
C502:  ip address 192.168.0.100/24
C503: failover server 250

Fig.68

| | INTERFACE NUMBER | VRF NUMBER | IP ADDRESS | SUBNET MASK LENGTH |
|---|---|---|---|---|
| E51 | 131 | 1 | 10. 1. 1. 254 | 24 |
| E52 | 132 | 2 | 10. 1. 1. 254 | 24 |
| E53 | 133 | 1 | 20. 1. 1. 254 | 24 |
| E54 | 134 | 1 | 30. 1. 1. 254 | 24 |
| E55 | 135 | — | 192. 168. 0. 100 | 24 |

140

NETWORK SYSTEM AND NETWORK RELAY APPARATUS

CROSS-REFERENCE TO RELATED APPLICATIONS

The present application claims priority to Japanese Patent Application No. 2009-202297 filed on Sep. 2, 2009, the disclosure of which is hereby incorporated by reference in its entirety.

BACKGROUND OF THE INVENTION

1. Field of the Invention

The present invention relates to a network system.

2. Description of the Related Art

A failover is a technique of establishing a server network system having high reliability and availability. On the occurrence of a failure or abnormality occurring in a working server (system, network), the failover automatically changes over the processing from the working server to a redundant standby server (system, network). A cold standby failover technique may be adopted in a network system including a working server that provides a specific service, such as web service, and a standby server that performs another processing or stands in power-off condition. On the occurrence of a failure in the working server, the cold standby failover is implemented by resetting information (for example, an IP address) that is originally set in the working server, in the standby server.

A hot standby failover technique may be adopted in a network system including multiple servers that provide a specific service and a load balancer or a DNS (Domain Name System) server. On the occurrence of a failure in one of the multiple servers providing the specific service, a failover is implemented adequately according to the system configuration. In the system configuration with the load balancer, the failover is implemented by prohibiting the load balancer from sending a processing request to the server having the failure. In the system configuration with the DNS server, the failover is implemented by prohibiting the DNS server from notifying an IP address of the server having the failure.

The cold standby failover technique requires time for resetting the information to take over the specific service from the working server to the standby server and may thus cause a relatively long-time stop of the service. The hot standby failover technique allows for resumption of the specific service within a relatively short time but requires an additional network system component, such as the load balancer or the DNS server and may thus complicate the configuration of the network system.

SUMMARY

By taking into account the issue discussed above, there is a requirement for implementing a failover within a short time period without any additional components.

According to first aspect of the present invention, a network system is provided. The network system includes: a first processing apparatus configured to provide a specific service; a second processing apparatus configured to provide the specific service, the first processing apparatus and the second processing apparatus having one identical address; a client apparatus configured to utilize the specific service; and a network relay apparatus connected directly or indirectly via interfaces to the first processing apparatus, the second processing apparatus, and the client apparatus and configured to relay packet transmission between the client apparatus and the first processing apparatus or the second processing apparatus, wherein the network relay apparatus forwards a received packet, which is received via the interface connecting with the client apparatus to be sent to the address as a destination, to one processing apparatus in a state enabled to provide the specific service between the first processing apparatus and the second processing apparatus.

In the network system according to this aspect of the invention, both the first processing apparatus and the second processing apparatus are capable of providing the specific service and have one identical address allocated thereto. The network relay apparatus forwards a received packet, which is sent from the client apparatus, to one processing apparatus in the state enabled to provide the specific state between the first processing apparatus and the second processing apparatus. This arrangement assures a failover within a short time period without any additional components in a server network system.

According to the first aspect of the present invention, the network relay apparatus may include: a first route information storage configured to store route information of a first virtual network; a second route information storage configured to store route information of a second virtual network; a VRF definition information storage configured to store VRF definition information that defines belongingness of each of the first processing apparatus, the second processing apparatus, and the client apparatus to either of the first virtual network and the second virtual network; a packet forwarding processor configured to, on detection of a packet, specify a virtual network which a source apparatus of the packet belongs to by referring to the VRF definition information and perform a route search based on route information corresponding to the specified virtual network; a status monitor configured to monitor a status of at least one of the first processing apparatus and the second processing apparatus specified as a monitor object apparatus and detect a state of the monitor object apparatus; and a failover processor configured to update at least one of the route information and the VRF definition information, based on the detected state of the monitor object apparatus.

In the network system of this application, one identical address is allocated to both the first processing apparatus and the second processing apparatus. The status monitor monitors the status of at least one of the first processing apparatus and the second processing apparatus specified as the monitor object apparatus and detects the state of the monitor object apparatus. The failover processor updates at least one of the route information and the VRF definition information, based on the detected state of the monitor object apparatus. This arrangement assures a failover within a short time period without any additional components in a server network system.

According to the first aspect of the present invention, the network system may include: the VRF definition information defines that: the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor updates the VRF definition information to change the belongingness of the client apparatus from the first virtual network to the second virtual network.

In the network system of this application, the status monitor monitors the status of the first processing apparatus that belongs to the first virtual network and provides the client apparatus with the specific service. On detection of a failure occurring in the first processing apparatus that falls into the state disabled to provide the specific service, the failover processor updates the VRF definition information to change the belongingness of the client apparatus from the first virtual network to the second virtual network. Even on the occurrence of a failure in the first processing apparatus functioning as a working server, a failover to the second processing apparatus functioning as a standby server is smoothly and easily implemented by simple update of the VRF definition information. This arrangement assures a failover within a short time period without any additional components in a server network system.

According to the first aspect of the present invention, the network system may include: the VRF definition information defines that: the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor updates the VRF definition information to change the belongingness of the second processing apparatus and the client apparatus to the first virtual network and change the belongingness of the first processing apparatus to the second virtual network.

In the network system of this application, the status monitor monitors the status of the first processing apparatus that belongs to the first virtual network and provides the client apparatus with the specific service. On detection of a failure occurring in the first processing apparatus that falls into the state disabled to provide the specific service, the failover processor updates the VRF definition information to change the belongingness of the second processing apparatus and the client apparatus to the first virtual network and change the belongingness of the first processing apparatus to the second virtual network. This application assures the same effects as those of the network system according to the above aspect of the invention described above. The failover processor updates the VRF definition information with regard to the processing apparatuses. This arrangement effectively reduces the required amount of update for the VRF definition information in a network configuration where the number of processing apparatuses connecting with the network relay apparatus is less than the number of client apparatuses connecting with the network relay apparatus.

According to the first aspect of the present invention, the network system may include: the VRF definition information defines that: the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor copies route information with regard to the client apparatus among the route information of the first virtual network onto the route information of the second virtual network and updates the route information of the first virtual network to change an output interface set for a received packet with the address of the first processing apparatus as a destination address, to the interface connecting with the second processing apparatus.

In the network system of this application, the status monitor monitors the status of the first processing apparatus that belongs to the first virtual network and provides the client apparatus with the specific service. On detection of a failure occurring in the first processing apparatus that falls into the state disabled to provide the specific service, the failover processor copies the route information with regard to the client apparatus among the route information of the first virtual network onto the route information of the second virtual network and updates the route information of the first virtual network to change an output interface set for a received packet with the address of the first processing apparatus as a destination address, to the interface connecting with the second processing apparatus. In a network configuration where multiple processing apparatuses with different addresses are connected to one identical interface of the network relay apparatus, this arrangement assures an effective failover without being affected by the status of the other processing apparatus.

According to the first aspect of the present invention, the network system may include: the VRF definition information defines that: the first processing apparatus belongs to the first virtual network; the second processing apparatus belongs to the second virtual network; and the client apparatus belongs to both the first virtual network and the second virtual network, on reception of a packet from the client apparatus, the packet forwarding processor performs a route search based on either one of the route information of the first virtual network and the route information of the second virtual network according to a predetermined rule, where selection of the route information is based on a source apparatus of the packet, the status monitor monitors both the first processing apparatus belonging to the first virtual network and the second processing apparatus belonging to the second virtual network specified as monitor object apparatuses, on detection of a failure occurring in one of the monitor object apparatuses that falls in a state disabled to provide the specific service, the failover processor updates the VRF definition information to exclude the client apparatus, which belongs to both the first virtual network and the second virtual network, from a virtual network which the monitor object apparatus having the failure belongs to.

In the network system of this application, on reception of a packet from the client apparatus, the packet forwarding processor performs a route search based on either one of the route information of the first virtual network and the route information of the second virtual network selected corresponding to the source apparatus of the packet according to the predetermined rule. This arrangement assures establishment of an efficient network system from the viewpoint of capital investment. The status monitor monitors both the first processing apparatus belonging to the first virtual network and the second processing apparatus belonging to the second virtual network specified as the monitor object apparatuses. On detection of a failure occurring in one of the monitor object apparatuses, the failover processor updates the VRF definition information to exclude the client apparatus, which belongs to both the first virtual network and the second virtual network, from the virtual network which the monitor object apparatus having the failure belongs to. This application assures the same effects as those of the network system according to the above aspect of the invention described above.

According to the first aspect of the present invention, the network system may further include: a management apparatus configured to manage the network relay apparatus, wherein the management apparatus includes: a failover manager configured to send a failover instruction to the failover processor to update at least one of the route information and the VRF definition information.

In the network system of this application, the failover manager of the management apparatus sends a failover instruction to the failover processor of the network relay apparatus to update at least one of the route information and the VRF definition information. In a network configuration where a management apparatus is provided as an external device outside the network relay apparatus, this application assures the same effects as those of the network system according to the above aspect of the invention described above. The management apparatus generally has the higher throughput capacity than the network relay apparatus. The management apparatus may thus perform the more advanced detection, for example, a CPU utilization rate of each processing apparatus, in addition to detection of a failure.

According to the first aspect of the present invention, the network system may include: after detection of the failure occurring in the monitor object apparatus, the status monitor continues monitoring the status of the monitor object apparatus, on detection of recovery from the failure in the monitor object apparatus that falls in a state enabled to provide the specific service, the failover processor selectively performs either of: a recovery operation of updating at least one of the route information and the VRF definition information to an original state before detection of the failure; and a lock operation of updating neither the route information nor the VRF definition information.

In the network system of this application, the status monitor continues monitoring the status of the monitor object apparatus after detection of the failure occurring in the monitor object apparatus. On detection of recovery from the failure in the monitor object apparatus that falls in the state enabled to provide the specific service, the failover processor selectively performs either the recovery operation of updating at least one of the route information and the VRF definition information to its original state before detection of the failure and the lock operation of updating neither the route information nor the VRF definition information. In one application, the system administrator may be allowed to make a selection between a recovery process of causing the network system to automatically perform a failover simultaneously with recovery from the failure in the monitor object apparatus and a lock process of causing the system administrator to confirm the recovery from the failure in the monitor object apparatus and manually perform a failover. This arrangement desirably enhances the versatility of the operations of the network system.

The invention is not restricted to the network system or the network relay apparatus having any of the configurations discussed above, but may be actualized by diversity of other applications, for example, a control method of the network system, a control method of the network relay apparatus, computer programs executed to implement the functions of the system or the apparatus or the functional steps of the method, and recording media in which such computer programs are recorded.

BRIEF DESCRIPTION OF THE DRAWINGS

FIG. 2 is an explanatory diagrammatic representation of one example of IP address information of the two servers;

FIG. 3 is an explanatory diagrammatic representation of one example of IP address information of the host;

FIG. 4 is an explanatory diagrammatic representation of one example of IP address information of the host;

FIG. 5 is an explanatory diagrammatic representation of one example of configuration information of the network apparatus;

FIG. 7 is an explanatory diagrammatic representation of one example of the VRF1 routing table in the state of registries in the interface database shown in FIG. 6;

FIG. 8 is an explanatory diagrammatic representation of one example of the VRF2 routing table in the state of registries in the interface database shown in FIG. 6;

FIG. 15 is an explanatory diagrammatic representation of the registries in the status monitor database updated at step S507 in the status monitor process of FIG. 14;

FIG. 18 is an explanatory diagrammatic representation of the registries in the VRF1 routing table updated at step S602 in the failover process of FIG. 16;

FIG. 19 is an explanatory diagrammatic representation of the registries in the VRF2 routing table updated at step S602 in the failover process of FIG. 16;

FIG. 22 is an explanatory diagrammatic representation of the registries in the interface database updated at step S651 in the recovery detection-time process of FIG. 21 performed on detection of recovery from a failure in the primary server;

FIG. 23 is an explanatory diagrammatic representation of the registries in the VRF1 routing table updated at step S652 in the recovery detection-time process of FIG. 21 performed on detection of recovery from a failure in the primary server;

FIG. 24 is an explanatory diagrammatic representation of the registries in the VRF2 routing table updated at step S652 in the recovery detection-time process of FIG. 21 performed on detection of recovery from a failure in the primary server;

FIG. 26 is an explanatory diagrammatic representation of one example of a command for initializing the registries in the interface database;

FIG. 27 is an explanatory diagrammatic representation of one example of configuration information of the network apparatus in the second embodiment;

FIG. 28 is an explanatory diagrammatic representation of one example of the failure changeover database in the second embodiment;

FIG. 30 is an explanatory diagrammatic representation of the registries in the interface database updated at step S601 in the failover process of FIG. 29;

FIG. 31 is an explanatory diagrammatic representation of the registries in the VRF1 routing table updated at step S602 in the failover process of FIG. 29;

FIG. 32 is an explanatory diagrammatic representation of the registries in the VRF2 routing table updated at step S602 in the failover process of FIG. 29;

FIG. 33 is an explanatory diagrammatic representation of the failure changeover database updated at step S611 in the failover process of FIG. 29;

FIG. 35 is an explanatory diagrammatic representation of one example of IP address information of the two servers to provide the second service in the third embodiment;

FIG. 36 is an explanatory diagrammatic representation of one example of configuration information of the network apparatus in the third embodiment;

FIG. 37 is an explanatory diagrammatic representation of one example of the VRF1 routing table in the third embodiment.

FIG. 38 is an explanatory diagrammatic representation of one example of the VRF2 routing table in the third embodiment;

FIG. 39 is an explanatory diagrammatic representation of one example of the status monitor database in the third embodiment;

FIG. 40 is an explanatory diagrammatic representation of one example of the failure changeover route database in the third embodiment;

FIG. 41 is an explanatory diagrammatic representation of the registries in the status monitor database updated at step S507 on the occurrence of a failure in the primary server in the status monitor process of FIG. 14;

FIG. 43 is an explanatory diagrammatic representation of the VRF1 routing table updated at step S701 in the failover process of FIG. 42;

FIG. 44 is an explanatory diagrammatic representation of the VRF2 routing table updated at steps S703 and S704 in the failover process of FIG. 42;

FIG. 45 is an explanatory diagrammatic representation of the failure changeover route database updated at step S706 in the failover process of FIG. 42;

FIG. 49 is an explanatory diagrammatic representation of one example of a command for deleting the contents of a routing table;

FIG. 50 is an explanatory diagrammatic representation of one example of a command for deleting arbitrary route information from a routing table;

FIG. 52 is an explanatory diagrammatic representation of one example of configuration information of the network apparatus in the fourth embodiment;

FIG. 53 is an explanatory diagrammatic representation of one example of an interface database in the fourth embodiment;

FIG. 54 is an explanatory diagrammatic representation of one example of the VRF load balance database in the fourth embodiment;

FIG. 56 is an explanatory diagrammatic representation of one example of a VRF1 routing table in the fourth embodiment;

FIG. 57 is an explanatory diagrammatic representation of one example of a VRF2 routing table in the fourth embodiment;

FIG. 58 is an explanatory diagrammatic representation of one example of the load balance changeover database in the fourth embodiment;

FIG. 61 is an explanatory diagrammatic representation of the VRF load balance database updated at step S801 in the failover process of FIG. 60;

FIG. 64 is an explanatory diagrammatic representation of the VRF load balance database updated at step S852 in response to detection of recovery from a failure in the recovery detection-time process of FIG. 63;

FIG. 65 is an explanatory diagrammatic representation of one example of a command;

FIG. 67 is an explanatory diagrammatic representation of one example of configuration information of the network apparatus in the fifth embodiment;

FIG. 68 is an explanatory diagrammatic representation of one example of an interface database in the fifth embodiment;

DESCRIPTION OF THE PREFERRED EMBODIMENT

Figure 1:
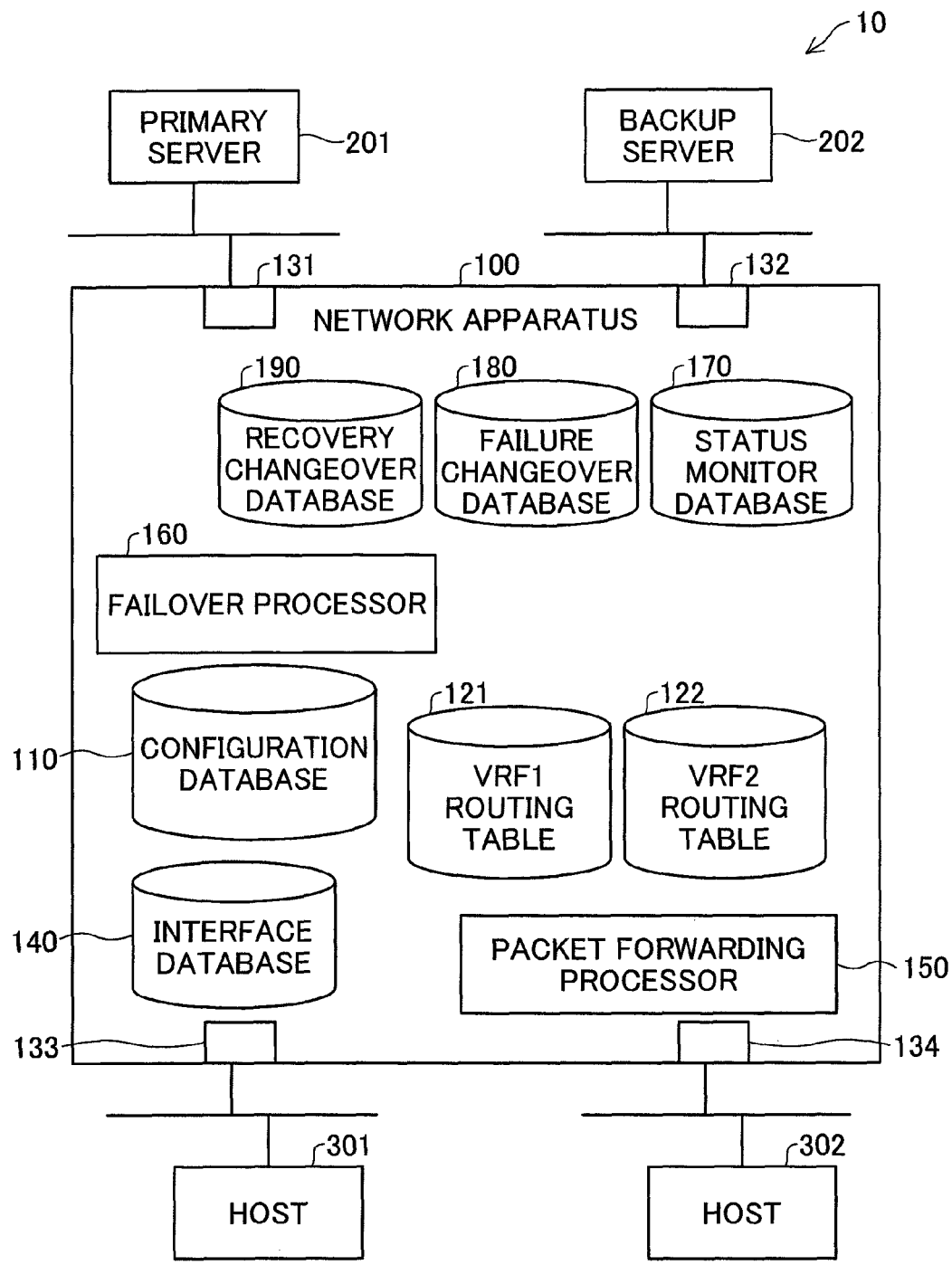
FIG. 1 is an explanatory diagrammatic representation of the general configuration of a network system according to a first embodiment of the invention.

Next, aspects of the present invention will be described in the following order on the basis of embodiments:
A. First Embodiment
(A-1) System Configuration FIG. 1 is an explanatory diagrammatic representation of the general configuration of a network system 10 according to a first embodiment of the invention. The network system 10 includes two servers (a primary server 201 and a backup server 202), a network apparatus 100, and two host computers (a host 301 and a host 302).

The primary server 201 corresponds to the first processing apparatus in the claims of the invention and is a server computer to provide the hosts with a specific service, for example, web service. The backup server 202 corresponds to the second processing apparatus in the claims of the invention. The backup server 202 stands by without providing the specific service in a normal state of the primary server 201 that is enabled to provide the service, while being activated to provide the specific service in place of the primary server 201 in an abnormal state of the primary server 201 that is disabled to provide the service. Namely the primary server 201 and the backup server 202 are respectively a working server and a standby server. In the description hereafter, the terms 'processing apparatus' and 'server' may be used as synonymous words.

The network apparatus 100 corresponds to the network relay apparatus in the claims of the invention and is a layer 3 network relay apparatus of relaying packet transmission between the two servers 201 and 202 and the two hosts 301 and 302. The network apparatus 100 has four interfaces 131 through 134, a configuration database 110, a VRF1 routing table 121 corresponding to the first route information storage in the claims of the invention, a VRF2 routing table 122 corresponding to the second route information storage in the claims of the invention, an interface database 140 corresponding to the VRF definition information storage in the claims of the invention, a packet forwarding processor 150, a failover processor 160, a status monitor database 170, a failure changeover database 180, and a recovery changeover database 190.

Each of the four interfaces 131 through 134 in the network apparatus 100 has the function of sending packets to an external device connecting with the network apparatus 100 and receiving packets from the external device. The interface 131 is connected to the primary server 201 via a line. Similarly the interface 132, the interface 133, and the interface 134 are respectively connected to the backup server 202 via a line, to the host 301 via a line, and to the host 302 via a line.

The configuration database 110 stores configuration information of the network apparatus 100. The interface database 140 stores configuration information of all the interfaces included in the network apparatus 100. The packet forwarding processor 150 receives a packet from one of the interfaces 131 through 134 included in the network apparatus 100, specifies an output interface for outputting the received packet, and forwards the received packet from the specified output interface.

The failover processor 160 monitors the status of the servers 201 and 202 (this operation is hereafter referred to as 'status monitoring process') and performs failover (this operation is hereafter referred to as 'failover process'). The status monitor database 170 stores information used for the status monitor process. The failure changeover database 180 stores information used for the failover process. The recovery changeover database 190 stores information used for changeover of the active server from the backup server 202 to the primary server 201 on recovery of the primary server 201 from a failure (this operation is hereafter referred to as 'recovery detection-time process').

The VRF1 routing table 121 is required for communication between the two servers 201 and 202 and the two hosts 301 and 302. Like the VRF1 routing table 121, the VRF2 routing table 122 is required for communication between the two servers 201 and 202 and the two hosts 301 and 302. The network apparatus 100 of the embodiment has the two routing tables 121 and 122. These two routing tables 121 and 122 are provided by the VRF (Virtual Routing and Forwarding) technology implemented on the network apparatus 100.

The VRF technology is generally implemented on the network relay apparatus having the layer 3 forwarding function and enables multiple routing tables to be provided and enabled simultaneously. Different routing tables provided in one identical apparatus have no interference with one another and are allowed to have independent operations. Namely one identical layer 3 address or an IP address may be allocated to the multiple different routing tables. The multiple different routing tables with the identical IP address mean establishment of separate networks or more specifically establishment of different virtual network.

The hosts 301 and 302 correspond to the client apparatus in the claims of the invention and are personal computers that utilize the specific service provided by the primary server 201 (or the backup server 202) via the network apparatus 100. For the simplicity of illustration, the other network apparatuses, lines, and internal components of the network apparatus 100 that are not directly involved in the explanation are omitted from FIG. 1. Such omission is similarly adopted for subsequent equivalent diagrams. In the description hereafter, the terms 'client apparatus' and the 'host' may be used as synonymous words.

FIG. 2 is an explanatory diagrammatic representation of one example of IP address information of the two servers 201 and 202. An IP address, a subnet mask length, and a default gateway shown in FIG. 2 are respectively set in the primary server 201 and in the backup server 202 of the embodiment. Namely the same IP address is allocated to the primary server 201 and to the backup server 202. In a general network system, an IP address is used as an identifier for unequivocally identifying each apparatus, device, or interface as a component in the network. Namely it is not allowed to allocate an identical IP address to multiple different components. In the configuration of this embodiment, however, the VRF technology-based setting makes a virtual network which the primary server 201 belongs to different from a virtual network which the backup server 202 belongs to and thereby enables an identical IP address to be allocated to the primary server 201 and the backup server 202.

FIG. 3 is an explanatory diagrammatic representation of one example of IP address information of the host 301. An IP address, a subnet mask length, and a default gateway shown in FIG. 3 are set in the host 301 of the embodiment.

FIG. 4 is an explanatory diagrammatic representation of one example of IP address information of the host 302. An IP address, a subnet mask length, and a default gateway shown in FIG. 4 are set in the host 302 of the embodiment.

FIG. 5 is an explanatory diagrammatic representation of one example of configuration information of the network apparatus 100. This configuration information is stored in the configuration database 110. A row C1 defines a first VRF network, and a row C2 defines a second VRF network.

A row C3 defines the interface 131. The interface 131 is an Ethernet (registered trademark) interface. All the other interfaces 132 through 134 (described later) are Ethernet (registered trademark) interfaces. A row C4 defines belongingness of the interface 131 to the first VRF network. A row C5 defines an IP address and a subnet mask length of the interface 131. A row C6 defines the interface 132. A row C7 defines belongingness of the interface 132 to the second VRF network. A row C8 defines an IP address and a subnet mask length of the interface 132.

The same information is registered as the definitions of the IP address of the interface (row C5) and the IP address of the interface 132 (row C8). As mentioned above, in a general network system, an IP address is used as an identifier for unequivocally identifying each apparatus, device, or interface as a component in the network, so that it is not allowed to allocate an identical IP address to multiple different components. The interface 131 and the interface 132 belong to different VRF networks (rows C4 and C7). The same IP address can thus be allocated to the interfaces 131 and the interface 132, which belong to the different VRF networks.

A row C9 defines the interface 133. A row C10 defines belongingness of the interface 133 to the first VRF network. A row C11 has definitions of a) and b) given below:

a) On detection of a failure in the primary server 201 according to a status monitor rule 50 (described below), the belongingness of the interface 133 is changed over to the second VRF network; and b) On detection of recovery of the primary server 201 according to the status monitor rule 50, the belongingness of the interface 133 is not changed over to the first VRF network but is kept or locked to the second VRF network.

A row C12 defines an IP address and a subnet mask length of the interface 133.

A row C13 defines the interface 134. A row C14 defines belongingness of the interface 134 to the first VRF network. A row C15 has definitions of c) and d) given below:

c) On detection of a failure in the primary server 201 according to the status monitor rule 50, the belongingness of the interface 134 is changed over to the second VRF network; and d) On detection of recovery of the primary server 201 according to the status monitor rule 50, the belongingness of the interface 134 is changed over or recovered to the first VRF network.

A row C16 defines an IP address and a subnet mask length of the interface 134.

A row C17 defines the status monitor rule 50 for monitoring the reachability of a packet to an apparatus with an IP address '10.1.1.1' as an identifier included in the first VRF network. Namely the row C17 defines the status monitor rule of the primary server 201. For the simplicity of illustration, the configuration information of the network apparatus 100 that is not directly involved in the explanation is omitted from FIG. 5. Such omission is similarly adopted for subsequent equivalent diagrams.

Figure 6:
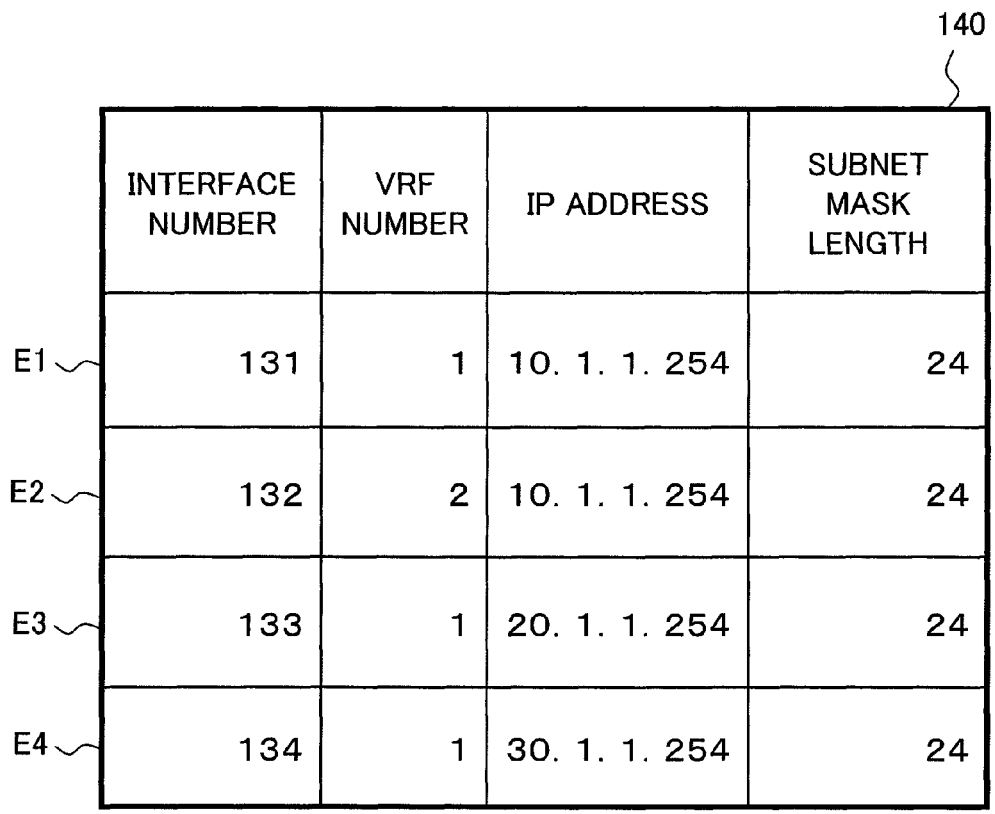
FIG. 6 is an explanatory diagrammatic representation of one example of the interface database.

FIG. 6 is an explanatory diagrammatic representation of one example of the interface database 140. The interface database 140 has an interface number field, a VRF number field, an IP address field, and a subnet mask length field. The interface number field has registries of identifiers of the interfaces 131 through 134 included in the network apparatus 100. The VRF number field has registries of identifiers of the VRF networks which the respective interfaces 131 through 134 belong to. The IP address field has registries of IP addresses of the respective interfaces 131 through 134. The subnet mask length field has registries of subnet masks as 32-bit numerical values representing how many bits out of the bits of the IP address are allocated to a network address.

The interface database 140 is provided, based on the configuration database 110 of defining the configuration information of the network apparatus 100 (FIG. 5). The information defined in the rows C3 through C5 in the configuration information described above with reference to FIG. 5 is registered in an entry E1 of the interface database 140. Similarly the information defined in the rows C6 through C8, the information defined in the rows C9, C10, and C12, and the information defined in the rows C13, C14, and C16 in the configuration information of FIG. 5 are registered respectively in an entry E2, in an entry E3, and in an entry E4. When receiving a packet from one of the interfaces 131 through 134, the packet forwarding processor 150 refers to the registries in the interface database 140 to specify a routing table as a search object for determining the forwarding destination of the packet. The details of this procedure will be described later.

FIG. 7 is an explanatory diagrammatic representation of one example of the VRF1 routing table 121 in the state of registries in the interface database 140 shown in FIG. 6. The VRF1 routing table 121 has a destination IP address field, a subnet mask length field, a next hop IP address field, and an output interface field. The destination IP address field has registries of destination IP addresses. The subnet mask length field has registries of subnet masks. The next hop IP address field has registries of IP addresses of apparatuses or devices as packet forwarding destinations to forward packets from the network apparatus 100. The output interface field has registries of identifiers of output interfaces to output packets by the packet forwarding processor 150.

The VRF1 routing table 121 stores information on specific interfaces having the registry of '1' in the VRF number field of the interface database 140 and information on apparatuses or devices connected to the specific interfaces via lines or via other network apparatuses. In the illustrated example of FIG. 7, information on the interfaces 131, 133, and 134 and information on the primary server 201, the host 301, and the host 302 are registered in the VRF1 routing table 121.

Information on the primary server 201 is registered in an entry E1. More specifically, the IP address of the primary server 201 is registered in the destination IP address field of the entry E1. A value '32' representing the primary server 201 as a destination is registered in the subnet mask length field of the entry E1. The IP address of the primary server 201 is registered in the next hop IP address field of the entry E1. This is because the network apparatus 100 is directly connected with the primary server 201 via the line without the presence of any intermediate apparatus. In a modified configuration where the network apparatus 100 is connected with the primary server 201 via a different apparatus, an IP address allocated to the different apparatus is registered in the next hop IP address field. The identifier of the interface connecting with the primary server 201 is registered in the output interface field of the entry E1.

Information on the interface 131 of the network apparatus 100 is registered in an entry E2. When the network apparatus 100 receives a packet with the IP address of the interface 131 as a destination IP address, the network apparatus 100 is not allowed to forward the received packet but is required to process the received packet. There are accordingly no registries (expressed by an symbol '-') in the next hop IP address field and the output interface field of the entry E2.

Information on the host 301 and information on the host 302 are respectively registered in an entry E3 and in an entry E5. The registries of the entries E3 and E5 are similar to the registries of the entry E1 with regard to the primary server 201 and are thus not specifically explained here. Information on the interface 133 and information on the interface 134 of the network apparatus 100 are respectively registered in an entry E4 and in an entry E6. The registries of the entries E4 and E6 are similar to the registries of the entry E2 with regard to the interface 131 and are thus not specifically explained here.

FIG. 8 is an explanatory diagrammatic representation of one example of the VRF2 routing table 122 in the state of registries in the interface database 140 shown in FIG. 6. The VRF2 routing table 122 has the same table structure as that of the VRF1 routing table 121. The VRF2 routing table 122 stores information on specific interfaces having the registry of '2' in the VRF number field of the interface database 140 and information on apparatuses or devices connected to the specific interfaces via lines or via other network apparatuses. In the illustrated example of FIG. 8, information on the interface 132 and information on the backup server 202 are registered in the VRF2 routing table 122.

Information on the backup server 202 is registered in an entry E1. The registries of the entry E1 are similar to the registries of the entry E1 with regard to the primary server 201 (FIG. 7) and are thus not specifically explained here. Information on the interface 132 is registered in an entry E2. The registries of the entry E2 are similar to the registries of the entry E2 with regard to the interface 131 (FIG. 7) and are thus not specifically explained here.

Figure 9:
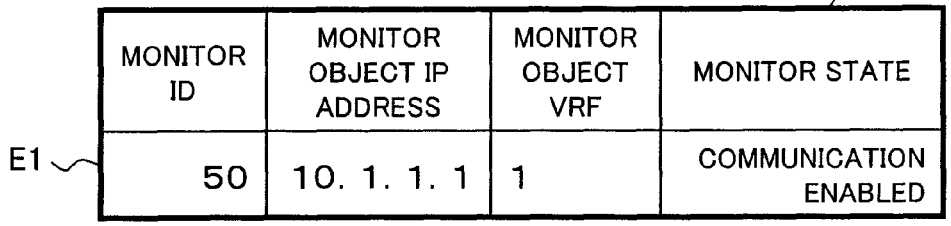
FIG. 9 is an explanatory diagrammatic representation of one example of the status monitor database.

FIG. 9 is an explanatory diagrammatic representation of one example of the status monitor database 170. The status monitor database 170 has a monitor ID field, a monitor object IP address field, a monitor object VRF field, and a monitor state field. The monitor ID field has registry of an identifier for identifying each monitor object group. The monitor object IP address field has registry of an IP address of each monitor object apparatus. The monitor object VRF field has registry of an identifier of a VRF network which the monitor object apparatus belongs to. The monitor state field has registry of a character string or a symbol representing the status of the monitor object apparatus.

In the configuration of this embodiment, the primary server 201 and the backup server 202 belong to the different VRF networks and have the identical IP address. The combination of the registry in the monitor object IP address field with the registry in the monitor object VRF field unequivocally identifies the monitor object apparatus. In the illustrated example of FIG. 9, the monitor object apparatus having a monitor ID of 50 has the combination of the registry of '10.1.1.1' in the monitor object IP address field and the registry of 'first VRF' in the monitor object VRF field, which identifies the primary server 201 as the monitor object apparatus. The registry in the monitor state field is 'communication enabled', which shows that the primary server 201 is currently in the normal state enabled to provide the service.

Figure 10:
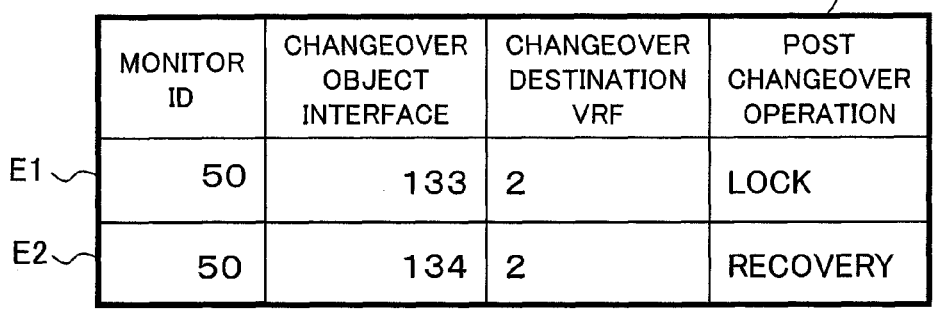
FIG. 10 is an explanatory diagrammatic representation of one example of the failure changeover database.

FIG. 10 is an explanatory diagrammatic representation of one example of the failure changeover database 180. The failure changeover database 180 has a monitor ID field, a changeover object interface field, a changeover destination VRF field, and a post changeover operation field. The monitor ID field has registry of an identifier for identifying each monitor object group. The changeover object interface field has registry of an identifier of an interface as an object of a failover process in the status monitor process. The changeover destination VRF field has registry of an identifier of a new VRF as a changeover destination by the failover process. The post changeover operation field has registry of a character string or a symbol representing whether the interface is to be returned to the original VRF on detection of recovery of an apparatus from a failure.

The failure changeover database 180 is provided, based on the configuration database 110 of defining the configuration information of the network apparatus 100 (FIG. 5). The information defined in the row C11 in the configuration information described above with reference to FIG. 5 is registered in an entry E1 of the failure changeover database 180. Similarly the information defined in the row C15 is registered in an entry E2.

Figure 11:
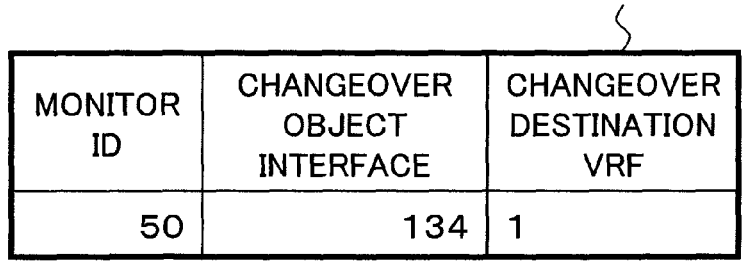
FIG. 11 is an explanatory diagrammatic representation of one example of the recovery changeover database.

FIG. 11 is an explanatory diagrammatic representation of one example of the recovery changeover database 190. The recovery changeover database 190 has a monitor ID field, a changeover object interface field, and a changeover destination VRF field. The monitor ID field has registry of an identifier for identifying each monitor object group. The changeover object interface field has registry of an identifier of an interface as a changeover object of the VRF by the recovery detection-time process. The changeover destination VRF field has registry of an identifier of a VRF as a changeover destination by the recovery detection-time process. Entries may be added to the recovery changeover database 190 by the failover process as described later. In the initial state, the recovery changeover database 190 has no entry.

(A-2) Operations before Detection of Failure

Figure 12:
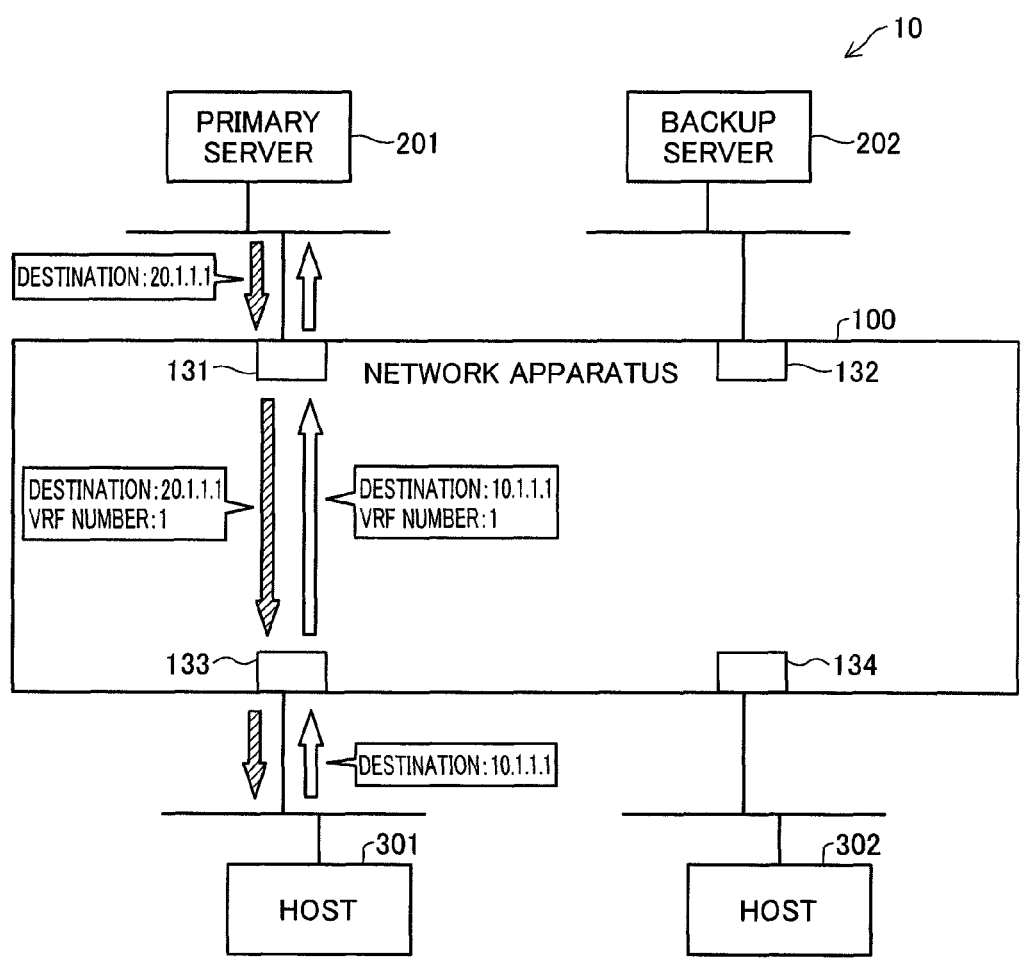
FIG. 12 is an explanatory diagrammatic representation of the operations of the network system in the normal state of the primary server enabled to provide the service.

FIG. 12 is an explanatory diagrammatic representation of the operations of the network system 10 in the normal state of the primary server 201 enabled to provide the service. In the state of FIG. 12, the host 301 sends a request packet with a destination IP address of '10.1.1.1', in order to have access to the server providing the service (either the primary server 201 or the backup server 202). The request packet is sent to an IP address specified in the own default gateway described above with reference to FIG. 3 (i.e., the IP address of the interface 133).

Figure 13:
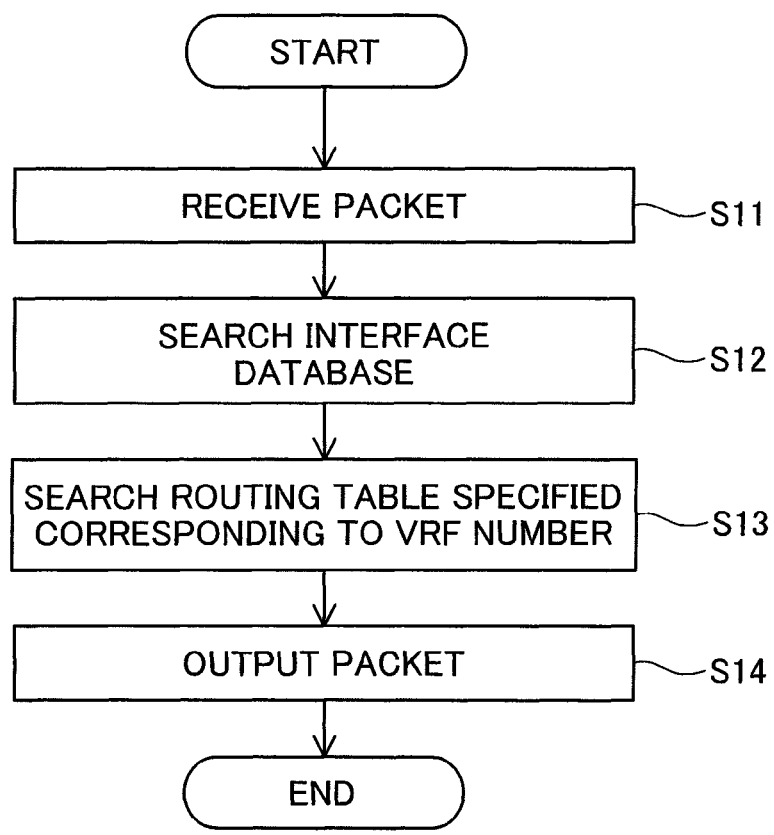
FIG. 13 is a flowchart showing a packet forwarding process performed in the network apparatus.

FIG. 13 is a flowchart showing a packet forwarding process performed in the network apparatus 100. The network apparatus 100 receives the packet sent from the host 301 via the interface 133 at step S11. The packet forwarding processor 150 searches the interface database 140 at subsequent step S12. More specifically, the packet forwarding processor 150 searches the interface database 140 for any matching entry having the registry in the interface number field identical with the identifier of the packet-receiving interface. The packet forwarding processor 150 then obtains the registry in the VRF number field of the matching entry. In the illustrated example of FIGS. 6 and 12, the packet forwarding processor 150 obtains the registry '1' in the VRF number field of the matching entry E3 corresponding to the interface identifier '133'.

At step S13, the packet forwarding processor 150 searches the routing table specified corresponding to the obtained VRF number and specifies an output interface. In this embodiment, when the obtained VRF number is '1', the first VRF routing table or the VRF1 routing table 121 is used. When the obtained VRF number is '2', the second VRF routing table or the VRF2 routing table 122 is used. In the illustrated example of FIG. 12, the VRF number obtained at step S12 is equal to '1', so that the packet forwarding processor 150 searches the VRF1 routing table 121 specified corresponding to the VRF number '1'. Namely the packet forwarding processor 150 performs a route search with route information corresponding to a VRF network or a virtual network which a packet source apparatus belongs to.

The packet forwarding processor 150 searches the specified VRF1 routing table 121 for any matching entry having the registry in the destination IP address field identical with information of a destination IP address included in a header of the received packet. The packet forwarding processor 150 then obtains the registry in the next hop IP address field and the registry in the output interface field of the matching entry. In the illustrated example of FIGS. 7 and 12, the packet forwarding processor 150 obtains the registry of '10.1.1.1' in the next hop IP address field and the registry of '131' in the output interface field of the matching entry E1 corresponding to the destination IP address '10.1.1.1'. At step S14, the packet forwarding processor 150 outputs the packet via the output interface specified at step S13.

In this manner, the request packet sent from the host 301 is forwarded to the primary server 201. The primary server 201 provides a required service based on the request packet received from the host 301 and sends back a replay packet to the host 301. A destination IP address of the replay packet is the IP address '20.1.1.1' of the host 301. This reply packet is sent to an IP address specified in the own default gateway described above with reference to FIG. 2 (i.e., the IP address of the interface 131).

The network apparatus 100 receives the reply packet sent from the primary server 201 via the interface 131. The packet forwarding processor 150 performs the same series of packet forwarding process described above with reference to the flowchart of FIG. 13 with regard to the received reply packet and outputs the reply packet from a specified output interface. The replay packet sent from the primary server 201 is accordingly forwarded to the host 301. In the diagram of FIG. 12, open arrows represent a request from the host, and hatched arrows represent a reply from the server. These expressions are similarly adopted for subsequent equivalent diagrams. The bidirectional communication between the host 301 and the primary server 201 enables the primary server 201 to provide the host 301 with a required service. The host 302 has similar series of operations to those described above with regard to the host 301.

As described above, the primary server 201 functions as the working server before detection of a failure in the primary server 201.

The interface 132 connecting with the backup server 202 has the registry of '2' in the VRF number field of the interface database 140 shown in FIG. 6. This means that the interface 132 belongs to the second VRF network. The primary server 201, the host 301, and the host 302, which respectively connect with the interfaces 131, 133, and 134 belonging to the first VRF network, belong to the same first VRF network. The backup server 202, which connects with the interface 132 belonging to the second VRF network, belongs to the second VRF network. In the state of the registries of the interface database 140 shown in FIG. 6, the host 301 and the host 302 belong to the different VRF network from the VRF network of the backup server 202 and accordingly do not make communication with the backup server 202. The backup server 202 functions as the standby server before detection of a failure.

As described above, giving an identical setting to the VRF number of an interface connecting with a server via a line and to the VRF number of an interface connecting with a host via a line specifies the server as a working server. Giving different settings to the VRF number of an interface connecting with a server via a line and to the VRF number of an interface connecting with a host via a line specifies the server as a standby server.

(A-3) Status Monitor Process

Figure 14:
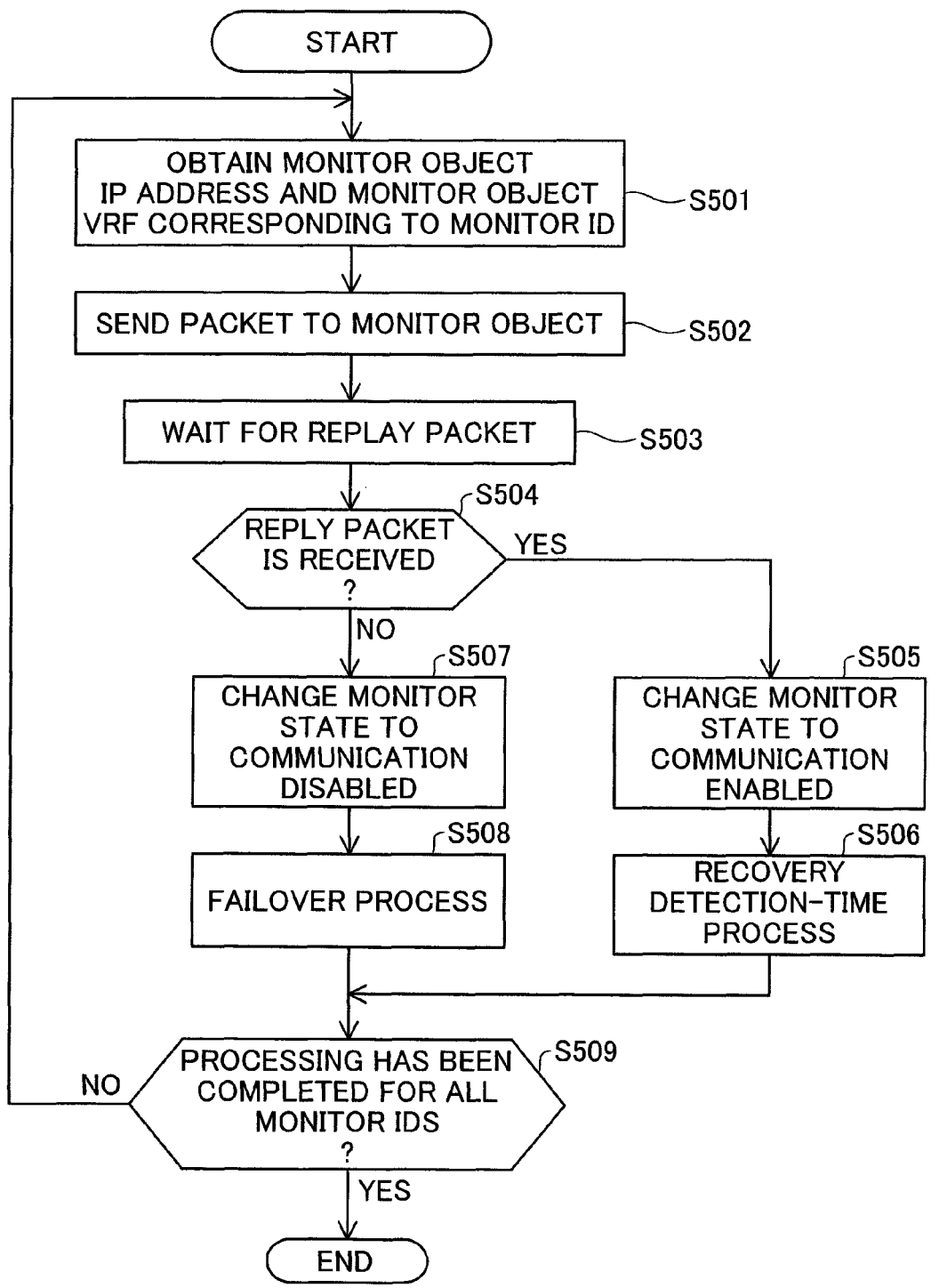
FIG. 14 is a flowchart showing the status monitor process.

FIG. 14 is a flowchart showing the status monitor process. The failover processor 160 corresponding to the status monitor in the claims of the invention refers to the registries in the status monitor database 170 and monitors the operation status of a server according to the flowchart of FIG. 14. The failover processor 160 obtains the registries in the monitor object IP address field and in the monitor object VRF field corresponding to each monitor ID recorded in the status monitor database 170 at step S501.

The failover processor 160 identifies a monitor object based on the combination of the obtained monitor object IP address and monitor object VRF and sends a packet to the identified monitor object at step S502. More specifically, the failover processor 160 searches the routing table corresponding to the monitor object VRF number obtained at step S501 for any matching entry with the monitor object IP address obtained at step S501 as a key to specify an output interface and outputs a packet from the specified output interface. The details of this processing are described previously with reference to steps S13 and S14 in the flowchart of FIG. 13.

In the illustrated example of FIG. 9, the entry E1 of the monitor ID '50' has the registry of '1' in the monitor object VRF field. The failover processor 160 then searches the VRF1 routing table 121 of FIG. 7 for any matching entry having the registry in the destination IP address field identical with the registry of '10.1.1.1' in the monitor object IP address field of the status monitor database 170. The failover processor 160 obtains the registry of '10.1.1.1' in the next hop IP address field and the registry '131' in the output interface field of the matching entry E1 from the VRF1 routing table 121. The failover processor 160 accordingly sends a packet to the primary server 201 via the interface 131.

A preferable example of the packet sent to the primary server 201 at step S502 is an ICMP (Internet Control Message Protocol) Echo Request packet. This example is, however, not restrictive, and a BFD (bidirectional forwarding detection) Echo packet or any unique packet suitable for such packet transmission may be sent to the primary server 201 at step S502.

At subsequent step S503, the failover processor 160 waits for a replay packet to the packet sent at step S502. When the packet sent at step S502 is an ICMP Echo Request packet, the replay packet is an ICMP Echo Reply packet. In the event of no reception of the reply packet, the failover processor 160 detects a failure occurring in the monitor object apparatus, which falls in the abnormal state disabled to provide the specific service.

The failover processor 160 detects reception or no reception of the reply packet at step S504. On reception of the reply packet (step S504: Yes), the failover processor 160 updates the status monitor database 170 at step S505. More specifically, the failover processor 160 searches the status monitor database 170 of FIG. 9 for any matching entry having the registry in the monitor ID field identical with the monitor ID of the current monitor object and having the registry in the monitor object IP address field identical with an IP address of a source apparatus sending the reply packet at step S504 and changes the registry in the monitor state field of the matching entry to 'communication enabled'. The failover processor 160 subsequently performs the recovery detection-time process at step S506. The details of the recovery detection-time process will be described later.

In the event of no reception of the replay packet (step S504: No), on the other hand, the failover processor 160 updates the status monitor database 170 at step S507. More specifically, the failover processor 160 searches the status monitor database 170 of FIG. 9 for any matching entry having the registry in the monitor ID field identical with the monitor ID of the current monitor object and having the registry in the monitor object IP address field identical with an IP address of an apparatus sending no reply packet at step S504 and changes the registry in the monitor state field of the matching entry to 'communication disabled'. The failover processor 160 subsequently performs the failover process at step S508. The details of the failover process will be described later.

FIG. 15 is an explanatory diagrammatic representation of the registries in the status monitor database 170 updated at step S507 in the status monitor process of FIG. 14. The difference from the status monitor database 170 of FIG. 9 before detection of a failure is that the registry in the monitor state field has been changed to 'communication disabled' in the entry E1 having the registry of '50' in the monitor ID field and the registry of '10.1.1.1' in the monitor object IP address field.

The failover processor 160 performs the status monitor process of monitoring the status of one monitor object specified by the monitor ID as described above. At step S509, the failover processor 160 determines whether the status monitor process has been completed for all the monitor IDs recorded in the status monitor database 170. When the status monitor process has been completed for all the recorded monitor IDs (step S509: Yes), the status monitor process is terminated. When the status monitor process has not yet been completed for all the recorded monitor IDs (step S509: No), on the other hand, the processing flow goes back to step S501 and repeats the same series of processing with regard to a next monitor ID.

(A-4) Failover Process

Figure 16:
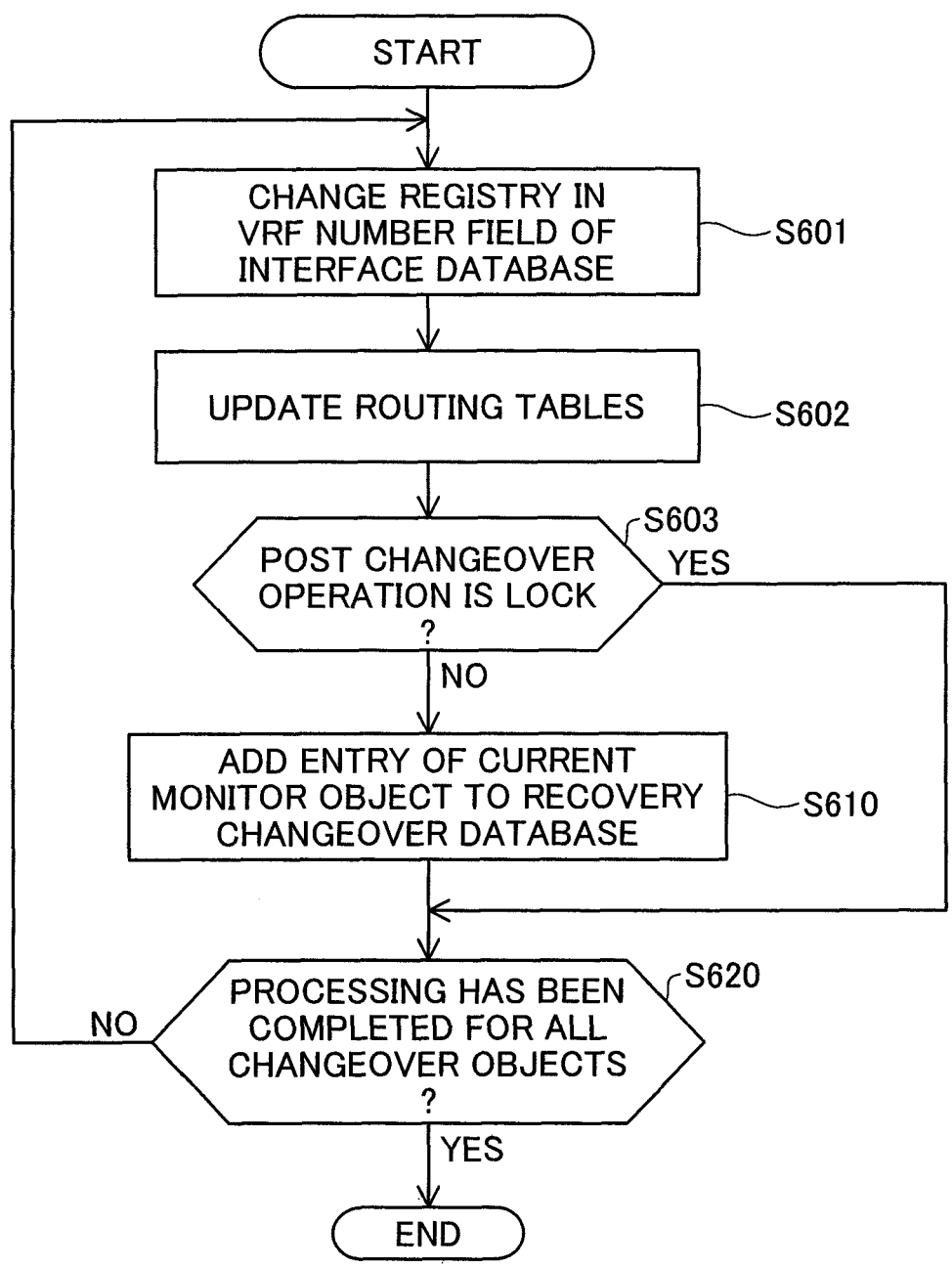
FIG. 16 is a flowchart showing the details of the failover process performed at step S508 (FIG. 14)

FIG. 16 is a flowchart showing the details of the failover process performed at step S508 (FIG. 14). The failover processor 160 refers to the monitor ID having detection of a failure in the status monitor process of FIG. 14 and the registries in the failure changeover database 180 described above with reference to FIG. 10, and performs the failover process in response to detection of a failure according to the flowchart of FIG. 16.

The failover processor 160 changes the registry in the VRF number field in the interface database 140 of FIG. 6 at step S601. More specifically, the failover processor 160 searches the failure changeover database 180 of FIG. 10 for any matching entry having the registry in the monitor ID field identical with the monitor ID having detection of a failure in the status monitor process. The failover processor 160 then obtains the registries in the changeover object interface field, the changeover destination VRF field, and the post changeover operation field of the matching entry. The failover processor 160 subsequently searches the interface database 140 for any matching entry having the registry in the interface number field identical with the obtained registry in the changeover object interface field of the failure changeover database 180. The failover processor 160 changes the registry in the VRF number field of the matching entry in the interface database 140 to the obtained registry in the changeover destination VRF field.

The failover processor 160 subsequently updates the registries in the routing tables based on the updated interface database 140 at step S602. More specifically, the failover processor 160 updates the registries in the VRF1 routing table 121 to store information of only entries having the registry of '1' in the VRF number field of the interface database 140. The failover processor 160 also updates the registries in the VRF2 routing table 122 to store information of only entries having the registry of '2' in the VRF number field of the interface database 140.

At subsequent step S603, the failover processor 160 identifies whether the post changeover operation is a 'lock' operation. This identification is based on the registry in the post changeover operation field of the failure changeover database 180 obtained at step S601. When the registry in the post changeover operation field is 'lock' (step S603: Yes), the processing flow goes to step S620. When the registry in the post changeover operation field is not 'lock' (step S603: No), on the other hand, the failover processor 160 adds information on an entry of the current monitor object to the recovery changeover database 190 of FIG. 11 at step S610.

The failover processor 160 determines whether the processing has been completed for all the changeover objects at step S620. More specifically, it is determined whether the processing has been completed for all the changeover object interfaces of the matching entries (having the registries in the monitor ID field identical with the monitor ID having detection of a failure in the status monitor process) in the failure changeover database 180 searched at step S601. When the processing has been completed for all the changeover objects (step S620: Yes), the failover process is terminated. When the processing has not yet been completed for all the changeover objects (step S620: No), on the other hand, the processing flow goes back to step S601 and repeats the same series of processing with regard to a next changeover object.

Figure 17:
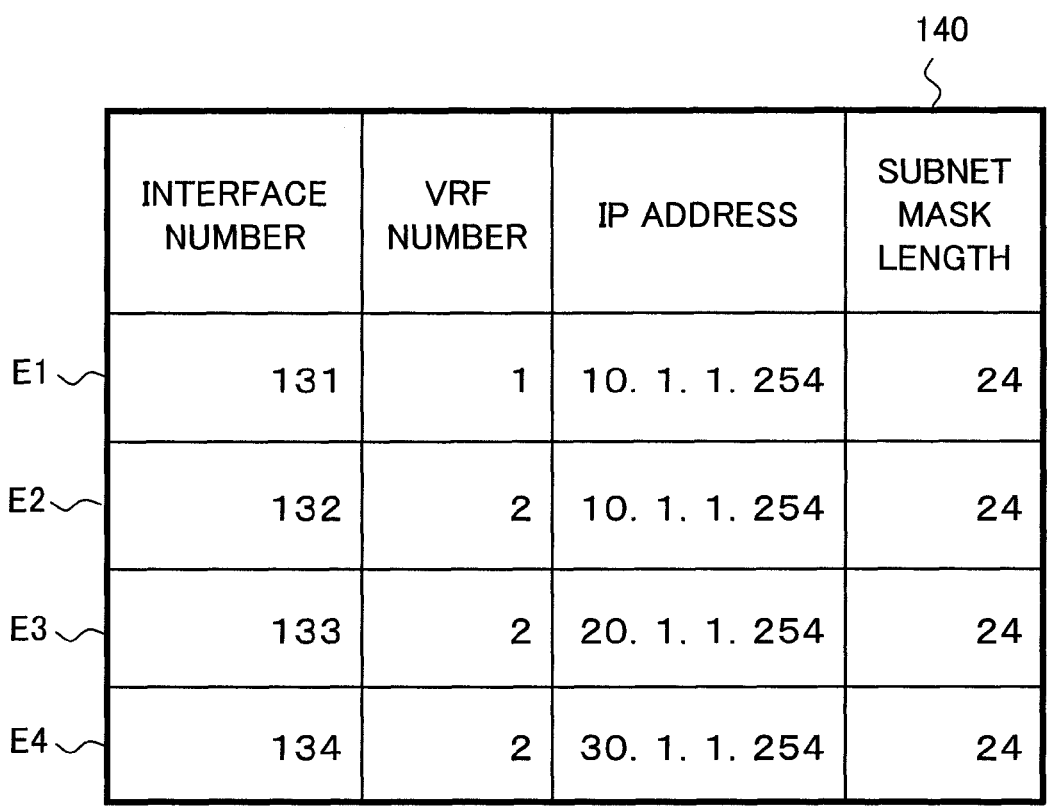
FIG. 17 is an explanatory diagrammatic representation of the registries in the interface database updated at step S601 in the failover process of FIG. 16.

FIG. 17 is an explanatory diagrammatic representation of the registries in the interface database 140 updated at step S601 in the failover process of FIG. 16. The difference from the interface database 140 of FIG. 6 before detection of a failure is that the registries in the VRF number field have been changed to '2' in the entries E3 and E4 having the registries of '133' and '134' in the interface number field.

FIG. 18 is an explanatory diagrammatic representation of the registries in the VRF1 routing table 121 updated at step S602 in the failover process of FIG. 16. The VRF1 routing table 121 of FIG. 7 has been updated, based on the registries in the interface database 140 of FIG. 17 updated at step S601. The difference from the VRF1 routing table 121 of FIG. 7 before detection of a failure is that entries having the registries of the IP addresses of the interfaces 133 and 134 in the destination IP address field and entries having the registries of the IP addresses of the hosts 301 and 302 (apparatuses connecting with the interfaces 133 and 134) in the destination IP address field have been deleted.

FIG. 19 is an explanatory diagrammatic representation of the registries in the VRF2 routing table 122 updated at step S602 in the failover process of FIG. 16. The VRF2 routing table 122 of FIG. 8 has been updated, based on the registries in the interface database 140 of FIG. 17 updated at step S601. The difference from the VRF2 routing table 122 of FIG. 8 before detection of a failure is that entries having the registries of the IP addresses of the interfaces 133 and 134 in the destination IP address field and entries having the registries of the IP addresses of the hosts 301 and 302 (apparatuses connecting with the interfaces 133 and 134) in the destination IP address field, i.e., entries E3 through E6, have been added.

(A-5) Operations after Detection of Failure

Figure 20:
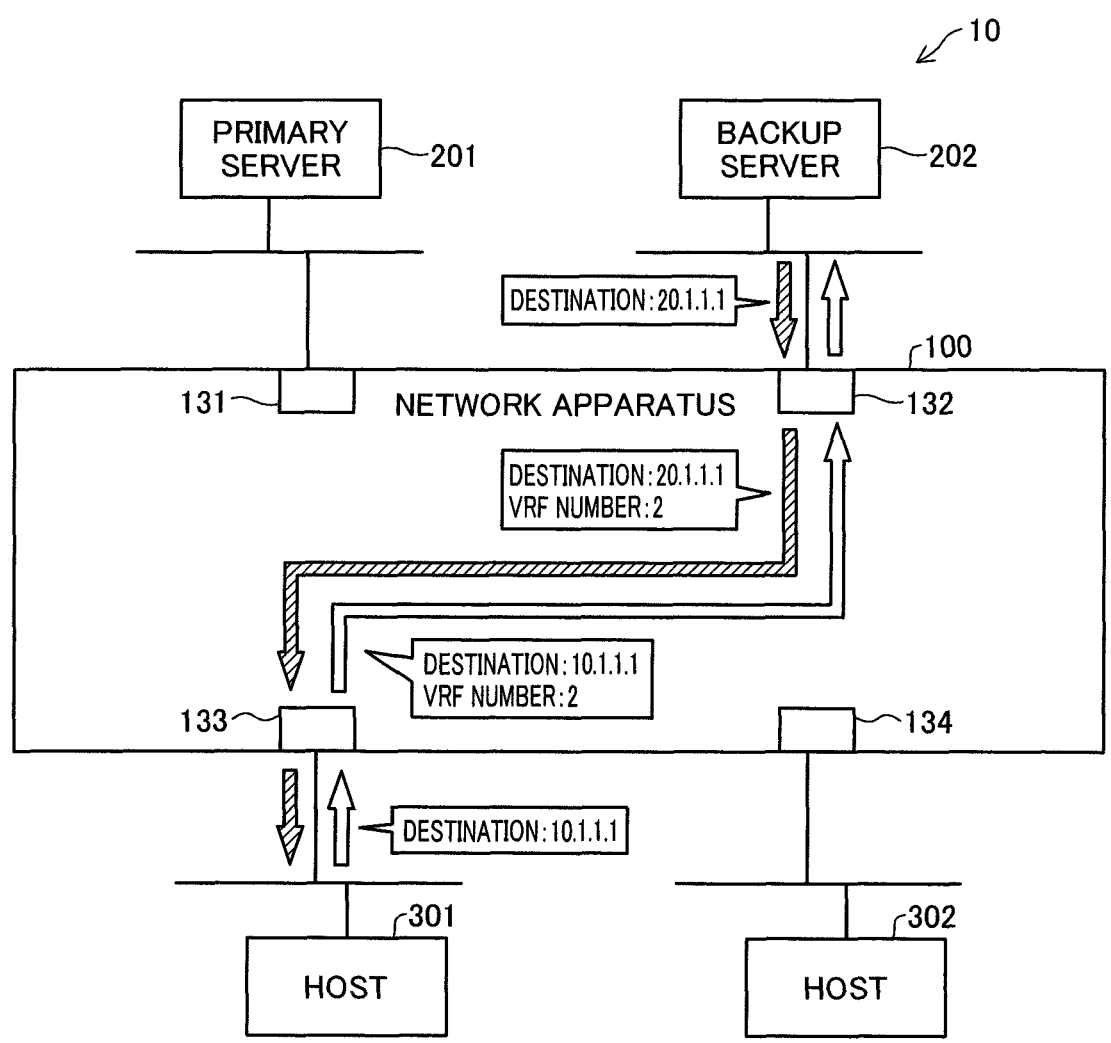
FIG. 20 is an explanatory diagrammatic representation of the operations of the network system after detection of a failure in the primary server.

FIG. 20 is an explanatory diagrammatic representation of the operations of the network system 10 after detection of a failure in the primary server 201. In the state of FIG. 20, the host 301 sends a request packet with a destination IP address of '10.1.1.1', in order to have access to the server providing the service (either the primary server 201 or the backup server 202). The packet is sent to an IP address specified in the own default gateway described above with reference to FIG. 3 (i.e., the IP address of the interface 133).

The network apparatus 100 receives the packet sent from the host 301 via the interface 133 (step S11 in FIG. 13). The packet forwarding processor 150 searches the interface database 140 shown in FIG. 17 for a matching entry E3 corresponding to the interface identifier of '133' and obtains the registry of '2' in the VRF number field of the matching entry E3 (step S12 in FIG. 13). The packet forwarding processor 150 searches the VRF2 routing table 122 of FIG. 19 specified corresponding to the obtained VRF number of '2' and specifies an output interface (step S13 in FIG. 13). The packet forwarding processor 150 then outputs the packet via the output interface 132 specified at step S13 (step S14 in FIG. 13).

In this manner, the request packet sent from the host 301 is forwarded to the backup server 202. The backup server 202 provides a required service based on the request packet received from the host 301 and sends back a replay packet to the host 301. A destination IP address of the replay packet is the IP address '20.1.1.1' of the host 301. This reply packet is sent to an IP address specified in the own default gateway described above with reference to FIG. 2 (i.e., the IP address of the interface 132).

The network apparatus 100 receives the reply packet sent from the backup server 202 via the interface 132. The packet forwarding processor 150 performs the same series of packet forwarding process described above with reference to the flowchart of FIG. 13 with regard to the received reply packet and outputs the reply packet from a specified output interface. The replay packet sent from the backup server 202 is accordingly forwarded to the host 301. The host 302 has similar series of operations to those described above with regard to the host 301.

As described above, the backup server 202 functions as the working server after detection of a failure in the primary server 201.

(A-6) Recovery Detection-Time Process

Figure 21:
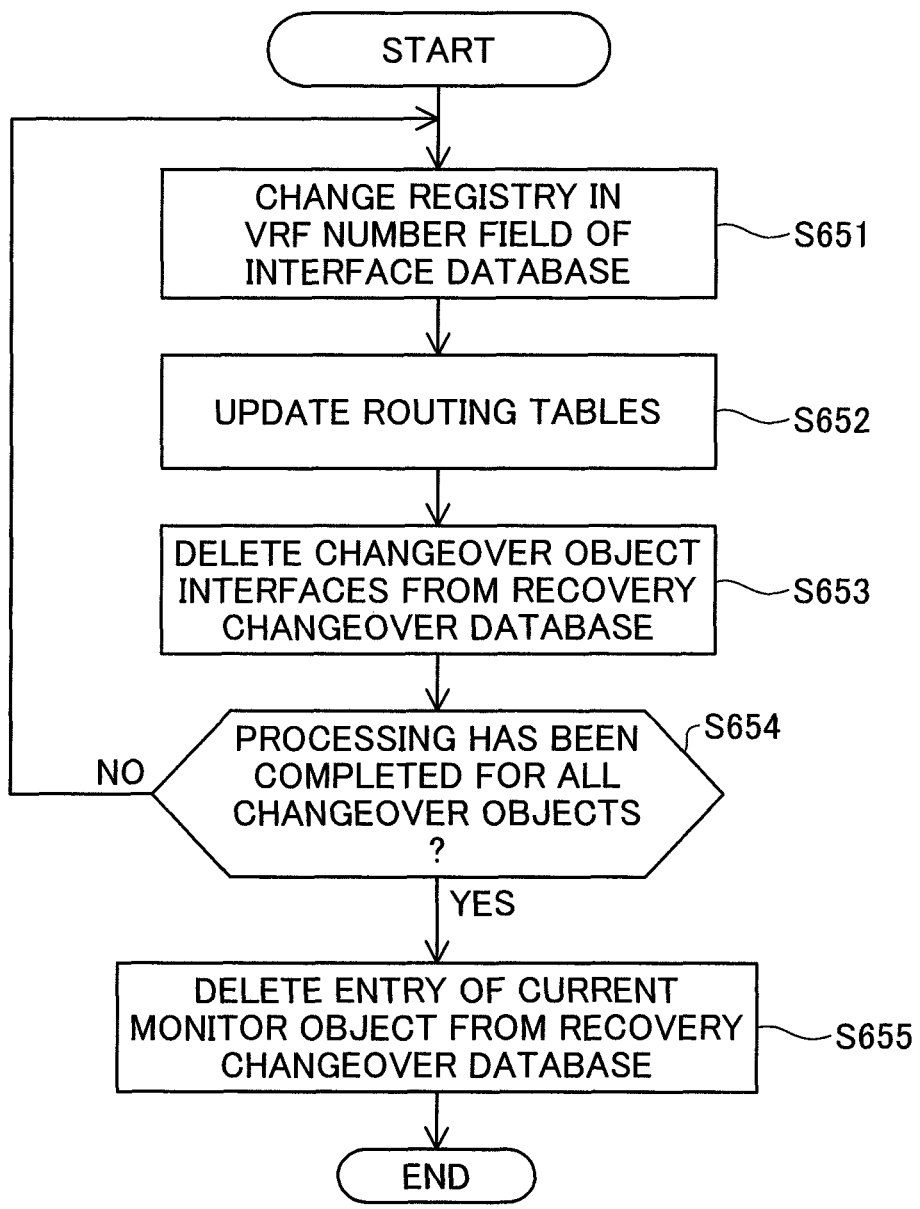
FIG. 21 is a flowchart showing the details of the recovery detection-time process performed at step S506 (FIG. 14)

FIG. 21 is a flowchart showing the details of the recovery detection-time process performed at step S506 (FIG. 14). The failover processor 160 refers to the monitor ID having detection of recovery from a failure in the status monitor process of FIG. 14 and the registries in the recovery changeover database 190 described above with reference to FIG. 11, and performs the recovery detection-time process in response to detection of recovery from a failure according to the flowchart of FIG. 21.

The failover processor 160 changes the registry in the VRF number field in the interface database 140 of FIG. 6 at step S651. More specifically, the failover processor 160 searches the recovery changeover database 190 of FIG. 11 for any matching entry having the registry in the monitor ID field identical with the monitor ID having detection of recovery from a failure in the status monitor process. The failover processor 160 then obtains the registries in the changeover object interface field and the changeover destination VRF field of the matching entry. The failover processor 160 subsequently searches the interface database 140 for any matching entry having the registry in the interface number field identical with the obtained registry in the changeover object interface field of the recovery changeover database 190. The failover processor 160 changes the registry in the VRF number field of the matching entry in the interface database 140 to the obtained registry in the changeover destination VRF field.

The failover processor 160 subsequently updates the registries in the routing table at step S652. More specifically, the failover processor 160 selects the routing table that is to be used after the changeover, based on the registry in the changeover destination VRF field retrieved at step S651. The failover processor 160 adds information of: i) any entry having the registry in the destination IP address field identical with an IP address of the changeover object interface retrieved at step S651; and ii) any entry having the registry in the destination IP address field identical with an IP address of an apparatus connecting with the changeover object interface retrieved at step S651, to the selected routing table that is to be used after the changeover. The failover processor 160 deletes the entries i) and ii) from the other routing table that is not used after the changeover.

At subsequent step S653, the failover processor 160 deletes the changeover object interfaces as the processing objects of steps S651 and S652 from the recovery changeover database 190.

The failover processor 160 determines whether the processing has been completed for all the changeover objects at step S654. More specifically, it is determined whether all the changeover object interfaces of the matching entries (having the registries in the monitor ID field identical with the monitor ID having detection of recovery from a failure in the status monitor process) in the recovery changeover database 190 searched at step S651 have been subjected to the processing of steps S651 through S653. When the processing has been completed for all the changeover objects (step S654: Yes), the failover processor 160 deletes an entry of the monitor ID having detection of recovery from a failure in the status monitor process from the recovery changeover database 190 at step S655 and terminates the recovery detection-time process. When the processing has not yet been completed for all the changeover objects (step S654: No), on the other hand, the processing flow goes back to step S651 and repeats the same series of processing with regard to a next changeover object.

FIG. 22 is an explanatory diagrammatic representation of the registries in the interface database 140 updated at step S651 in the recovery detection-time process of FIG. 21 performed on detection of recovery from a failure in the primary server 201. The difference from the interface database 140 of FIG. 17 before the recovery is that the registry in the VRF number field has been changed to '1' in the entry E4 having the registry of '134' in the interface number field.

FIG. 23 is an explanatory diagrammatic representation of the registries in the VRF1 routing table 121 updated at step S652 in the recovery detection-time process of FIG. 21 performed on detection of recovery from a failure in the primary server 201. The difference from the VRF1 routing table 121 of FIG. 18 before detection of the recovery is that i) entry having the registry of an IP address of the changeover object interface (interface 134) retrieved at step S651 in the destination IP address field and ii) entry having the registry of an IP address of an apparatus (host 302) connecting with the changeover object interface retrieved at step S651 in the destination IP address field, i.e., entries E3 and E4, have been added.

FIG. 24 is an explanatory diagrammatic representation of the registries in the VRF2 routing table 122 updated at step S652 in the recovery detection-time process of FIG. 21 performed on detection of recovery from a failure in the primary server 201. The difference from the VRF2 routing table 122 of FIG. 19 before detection of the recovery is that i) entry having the registry of an IP address of the changeover object interface (interface 134) retrieved at step S651 in the destination IP address field and ii) entry having the registry of an IP address of an apparatus (host 302) connecting with the changeover object interface retrieved at step S651 in the destination IP address field, i.e., entries E5 and E6, have been deleted.

The registries in the status monitor database 170 after detection of recovery from a failure in the primary server 201 are identical with those shown in FIG. 9.

(A-7) Operations after Detection of Recovery

Figure 25:
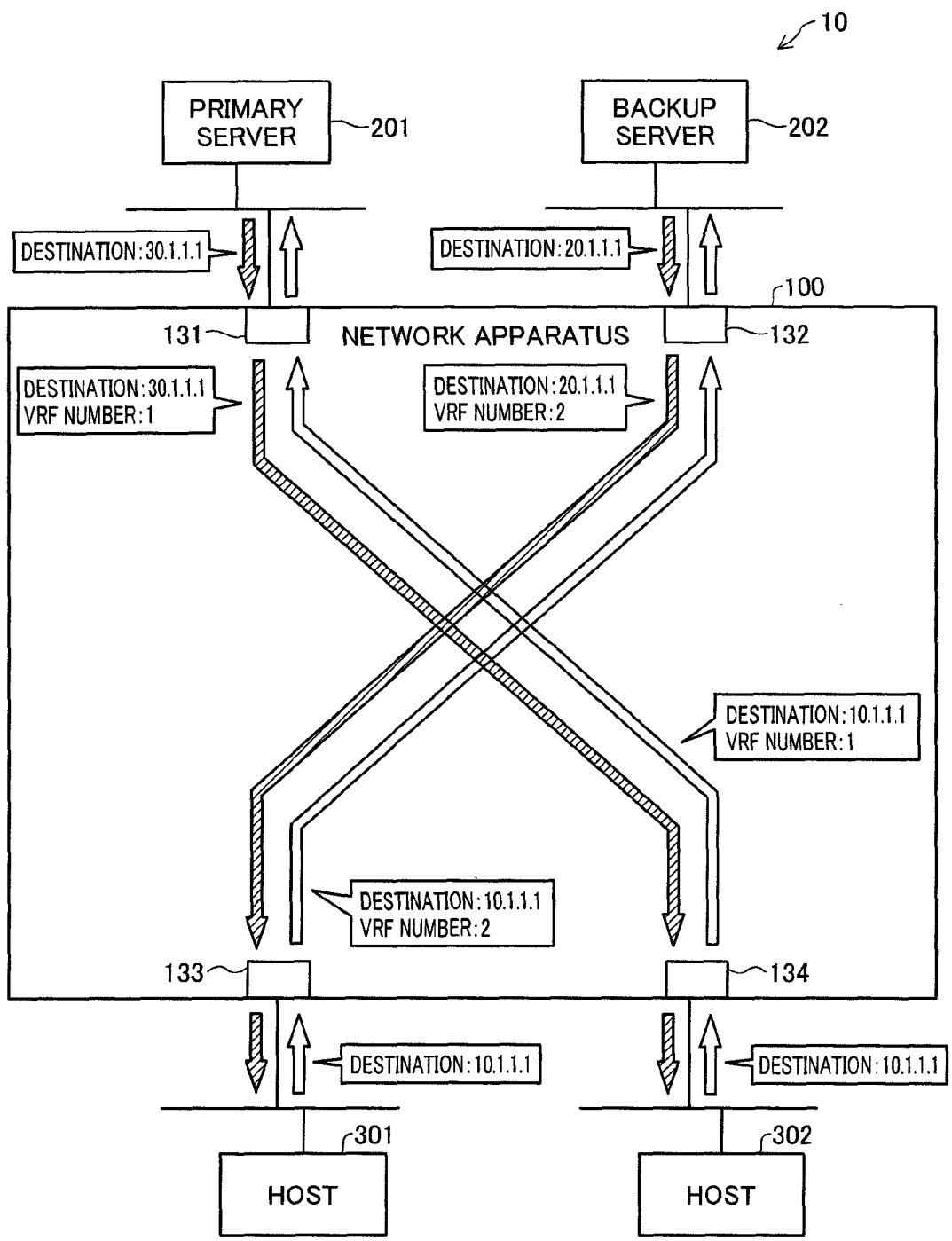
FIG. 25 is an explanatory diagrammatic representation of the operations of the network system after detection of recovery from a failure in the primary server.

FIG. 25 is an explanatory diagrammatic representation of the operations of the network system 10 after detection of recovery from a failure in the primary server 201. In the state of FIG. 25, the network apparatus 100 forwards a request packet sent from the host 301 to the backup server 202. The backup server 202 provides a required service based on the request packet received from the host 301 and sends back a replay packet to the host 301. The detailed packet flow is similar to that discussed above with reference to FIG. 20. Even after the recovery from a failure in the primary server 201, the host 301 keeps communication with the backup server 202. This is ascribed to the registry of 'lock' in the post changeover operation field of a corresponding entry having the registry of '133' in the changeover object interface field in the failure changeover database 180 of FIG. 10.

The network apparatus 100 forwards a request packet sent from the host 302 to the primary server 201. The primary server 201 provides a required service based on the request packet received from the host 302 and sends back a replay packet to the host 302. The detailed packet flow is similar to that discussed above with reference to FIG. 12. After the recovery from a failure in the primary server 201, the host 302 establishes communication with the primary server 201. This is ascribed to the registry of 'recovery' in the post changeover operation field of a corresponding entry having the registry of '134' in the changeover object interface field in the failure changeover database 180 of FIG. 10.

FIG. 26 is an explanatory diagrammatic representation of one example of a command for initializing the registries in the interface database 140. Execution of this operational command initializes the registries with regard to the interface 133 in the interface database 140 (to the state of FIG. 6). The administrator of the network apparatus 100 operates a management terminal (not shown) of the network apparatus 100 to execute this operational command. Other commands discussed later are executed in the similar manner.

Accompanied with such a change of the registries in the interface database 140, the registries in the VRF1 routing table 121 and the VRF2 routing table 122 are changed to the state of FIG. 7 and to the state of FIG. 8, respectively. This series of operations restores the status of the network system 10 to the state before the occurrence of a failure in the primary server 201.

The configuration of the first embodiment enables both the first processing apparatus and the second processing apparatus (i.e., primary server 201 and backup server 202) to provide a specific service, while allowing an identical layer 3 address or IP address to be set to both the primary server 201 and the backup server 202. The failover processor 160 monitors the status of the primary server 201 that belongs to the first virtual network VRF1 and is enabled to provide the hosts with the service. In response to detection of a failure in the primary server 201 that falls into the abnormal state disabled to provide the service, the failover processor 160 updates the registries in the interface database 140 as VRF definition information to change the belongingness of the client apparatuses (hosts 301 and 302) from the first virtual network VRF1 to the second virtual network VRF2. Accompanied with the update of the registries in the interface database 140, the registries in the VRF1 routing table 121 and the VRF2 routing table 122 for storing route information are updated.

As described above, on the occurrence of a failure in the primary server 201 functioning as the working server, the configuration of the first embodiment allows for a smooth failover to the backup server 202 as the standby server by simply updating the registries in the interface database 140. This arrangement overcomes the disadvantage of long-time stop of the service in the cold standby failover technique. The failover processor 160 in the network apparatus 100 performs the failover. This arrangement does not require introduction of a load balancer or a DNS, which is required in the hot standby failover technique. The network configuration of this embodiment accomplishes a failover within a short time period without requiring any additional components.

In the status monitor process, the failover processor 160 functioning as the status monitor uses the lines actually used for communications between the primary server 201 and the hosts to monitor the operation status of the primary server 201. This arrangement enables a failover to be performed on the occurrence of a failure in a communication line between the network apparatus 100 and the primary server 201, as well as on the occurrence of a failure in the primary server 201.

The failover processor 160 functioning as the status monitor continues monitoring the status of the primary server 201 even after detection of a failure in the primary server 201 and is thus able to detect recovery of the primary server 201 to the normal state enabled to provide the service. On detection of the recovery of the primary server 201, the failover processor 160 selectively performs either the recovery process of updating the registries in the interface database 140 as the VRF definition information to the state before detection of a failure or the lock operation without such update.

In one application, the system administrator may be allowed to make a selection between a recovery process of causing the network system 10 to automatically perform a failover simultaneously with recovery from a failure in the primary server 201 and a lock process of causing the system administrator to confirm the recovery from a failure in the primary server 201 and manually perform a failover. This arrangement desirably enhances the versatility of the operations of the network system.

B. Second Embodiment

In a network configuration according to a second embodiment of the invention, a failover is implemented by changing the registry of a VRF number of an interface connecting with a server via a line. The general configuration of a network system 10 in the second embodiment is identical with that of the network system 10 of the first embodiment shown in FIG. 1, except no use of the recovery changeover database 190. The like components in the configuration of the second embodiment to those in the configuration of the first embodiment are expressed by the like symbols and numerals and are not specifically described here. Only the differences from the structures and the operations of the first embodiment are described below.

(B-1) System Configuration of Second Embodiment

FIG. 27 is an explanatory diagrammatic representation of one example of configuration information of the network apparatus 100 in the second embodiment. The difference from the configuration information of the first embodiment shown in FIG. 5 is deletion of the rows C11, C15, and C17 and addition of rows C201, C202, and C203. Otherwise the configuration information of the second embodiment is similar to the configuration information of the first embodiment.

The row C201 has definitions of e) and f) given below:

e) On detection of a failure in the primary server 201 according to a status monitor rule 50 (described below), the belongingness of the interface 131 is changed over to the second VRF network; and f) On detection of a failure in the backup server 202 according to the status monitor rule 50, the belongingness of the interface 131 is returned or switched back to the original state.

The row C202 has definitions of g) and h) given below:

g) On detection of a failure in the primary server 201 according to the status monitor rule 50, the belongingness of the interface 132 is changed over to the first VRF network; and h) On detection of a failure in the backup server 202 according to the status monitor rule 50, the belongingness of the interface 132 is returned or switched back to the original state.

The row C203 defines the status monitor rule 50 for monitoring the reachability of a packet to an apparatus with an IP address '10.1.1.1' as an identifier included in the first VRF network. Namely the row C203 defines the status monitor rule of the primary server 201.

FIG. 28 is an explanatory diagrammatic representation of one example of the failure changeover database 180 in the second embodiment. The difference from the failure changeover database 180 of the first embodiment shown in FIG. 10 is only entries registered in the failure changeover database 180. The information defined in the row C201 in the configuration information described above with reference to FIG. 27 is registered in an entry E21 in the failure changeover database 180. The information defined in the row C202 in the configuration information of FIG. 27 is registered in an entry E22.

(B-2) Status Monitor Process in Second Embodiment (1)

The status monitor process of the second embodiment follows the processing flow of the first embodiment described above with reference to FIG. 14. Unlike the status monitor process of the first embodiment, however, the status monitor process of the second embodiment repeatedly changes over the monitor object, such as the primary server 201 to the backup server 202 to the primary server 201 and so on, in response to detection of a failure and execution of the failover process. The changeover of the monitor object will be described later in detail.

(B-3) Failover Process in Second Embodiment (1)

Figure 29:
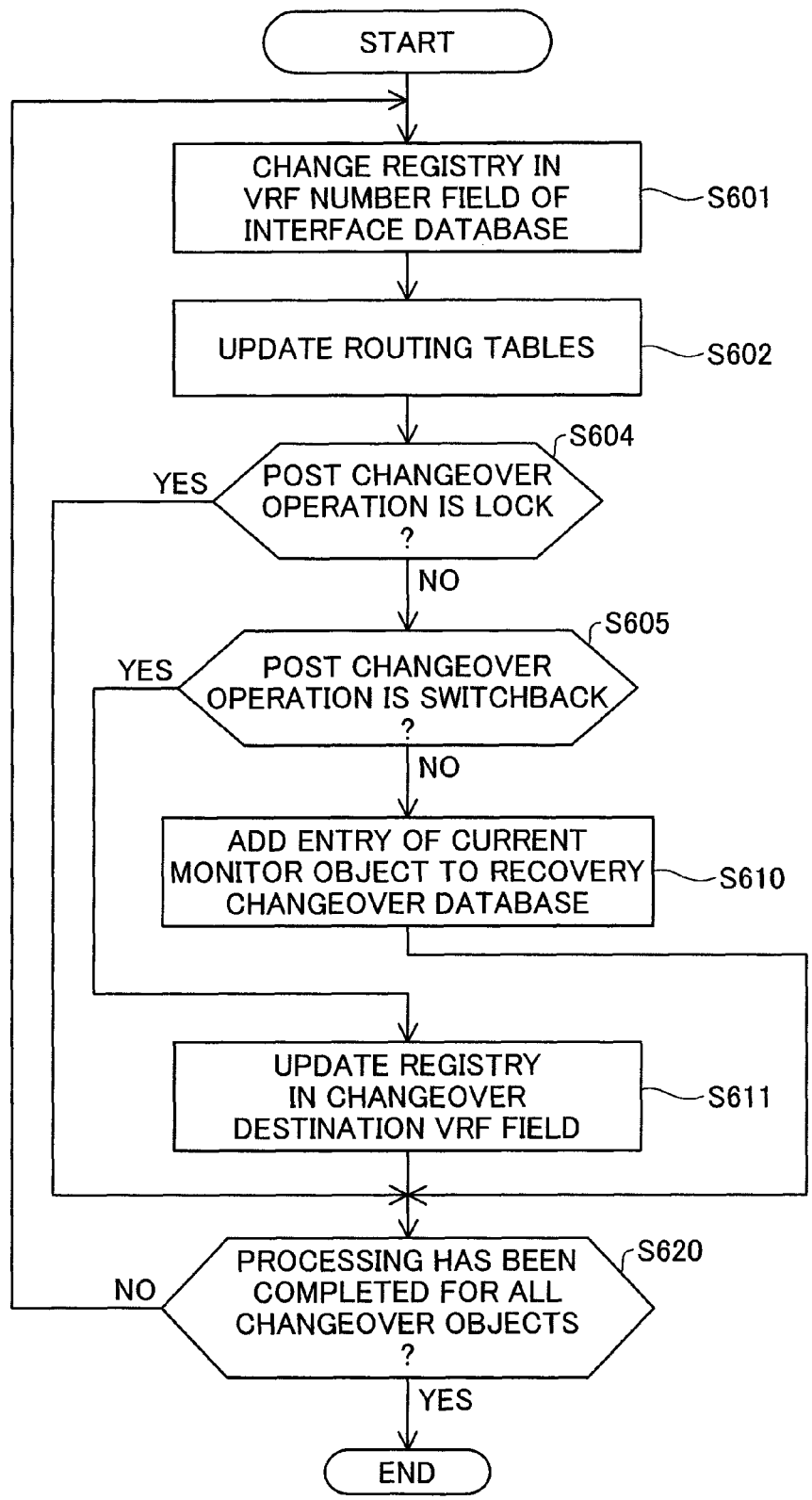
FIG. 29 is a flowchart showing the details of the failover process performed at step S508 (FIG. 14) in the second embodiment.

FIG. 29 is a flowchart showing the details of the failover process performed at step S508 (FIG. 14) in the second embodiment. The difference from the failover process of the first embodiment shown in FIG. 16 is replacement of step S603 with steps S604 and 5605 and addition of step S611. Otherwise the processing flow of the failover process of the second embodiment is similar to that of the first embodiment. Only the difference from the failover process of the first embodiment is described below.

At step S604, the failover processor 160 identifies whether the post changeover operation is a lock operation. This identification is based on the registry in the post changeover operation field of the matching entry (having the registry in the monitor ID field in the failure changeover database 180 of FIG. 28 identical with the monitor ID having detection of a failure in the status monitor process) retrieved at step S601. When the registry in the post changeover operation field is 'lock' (step S604: Yes), the processing flow goes to step S620.

When the registry in the post changeover operation field is not 'lock' (step S604: No), on the other hand, the failover processor 160 identifies whether the post changeover operation is a switchback operation at step S605. This identification is based on the registry in the post changeover operation field of the failure changeover database 180 obtained at step S601. When the registry in the post changeover operation field is not 'switchback' (step S605: No), the failover processor 160 goes to step S610 to add an entry of the current monitor object to the recovery changeover database 190. The second embodiment, however, does not use the recovery changeover database 190, so that the failover processor 160 actually does not perform the processing of step S610. The processing flow then goes to step S620.

When the registry in the post changeover operation field is 'switchback' (step S605: Yes), the processing flow goes to step S611. The failover processor 160 updates the registry in the changeover destination VRF field in the failure changeover database 180 of FIG. 28 at step S611. More specifically, the failover processor 160 updates the registry in the changeover destination VRF field to the original registry (before the update at step S601) in the VRF number field of a corresponding entry of the same interface number in the interface database 140.

FIG. 30 is an explanatory diagrammatic representation of the registries in the interface database 140 updated at step S601 in the failover process of FIG. 29. The difference from the interface database 140 of FIG. 6 before detection of a failure is that the registry in the VRF number field has been changed to '2' in an entry E21 having the registry of '131' in the interface number field and that the registry in the VRF number field has been changed to '1' in an entry E22 having the registry of '132' in the interface number field.

FIG. 31 is an explanatory diagrammatic representation of the registries in the VRF1 routing table 121 updated at step S602 in the failover process of FIG. 29. The VRF1 routing table 121 of FIG. 7 has been updated, based on the registries in the interface database 140 of FIG. 30 updated at step S601. The difference from the VRF1 routing table 121 of FIG. 7 before detection of a failure is that the entry E1 representing the interface 131 and the entry E2 representing the primary server 201 (apparatus connecting with the interface 131) (FIG. 7) have been deleted and that an entry E21 representing the interface 132 and an entry E22 representing the backup server 202 (apparatus connecting with the interface 132) have been added.

FIG. 32 is an explanatory diagrammatic representation of the registries in the VRF2 routing table 122 updated at step S602 in the failover process of FIG. 29. The VRF2 routing table 122 of FIG. 8 has been updated, based on the registries in the interface database 140 of FIG. 30 updated at step S601. The difference from the VRF2 routing table 122 of FIG. 8 before detection of a failure is that the entry E1 representing the interface 132 and the entry E2 representing the backup server 202 (apparatus connecting with the interface 132) (FIG. 8) have been deleted and that an entry E21 representing the interface 131 and an entry E22 representing the primary server 201 (apparatus connecting with the interface 131) have been added.

FIG. 33 is an explanatory diagrammatic representation of the failure changeover database 180 updated at step S611 in the failover process of FIG. 29. The difference from the failure changeover database 180 of FIG. 28 before detection of a failure is that the registry in the changeover destination VRF field has been changed to '1' in the entry E21 having the registry of '131' in the changeover object interface field and that the registry in the changeover destination VRF field has been changed to '2' in the entry E22 having the registry of '132' in the changeover object interface field.

(B-4) Status Monitor Process in Second Embodiment (2)

As explained above with reference to FIG. 9, the monitor object apparatus having the monitor ID of 50 has the registry of '10.1.1.1' in the monitor object IP address field and the registry of 'first VRF' in the monitor object VRF field in the status monitor database 170. Namely the monitor object apparatus was the primary server 201 before detection of a failure in the primary server 201.

The status monitor process of the second embodiment in the event of detection of a failure in the primary server 201 is described. In response to detection of a failure in the primary server 201 (step S504: No) in the status monitor process of FIG. 14, the failover process is performed (step S508). The failover process of FIG. 29 updates the registries in the interface database 140 to the state of FIG. 30, based on the registries in the failure changeover database 180 of FIG. 28. Accompanied with the update of the registries in the interface database 140, the registries in the VRF1 routing table 121 and the VRF2 routing table 122 are updated to the state of FIG. 31 and to the state of FIG. 32, respectively.

In the status monitor database 170 in the state of FIG. 9, the entry E1 having the monitor ID of 50 has the registry of '1' in the monitor object VRF field. In the status monitor process of FIG. 14, the failover processor 160 then searches the VRF1 routing table 121 of FIG. 31 for any matching entry having the registry in the destination IP address field identical with the registry of '10.1.1.1' in the monitor object IP address field of the status monitor database 170. The failover processor 160 obtains the registry of '10.1.1.1' in the next hop IP address field and the registry '132' in the output interface field of the matching entry E21 from the VRF1 routing table 121.

The failover processor 160 accordingly sends a packet to the backup server 202 via the interface 132. This means that the monitor object apparatus having the monitor ID of 50 (FIG. 9) has been changed from the primary server 201 to the backup server 202.

The backup server 202 as the new monitor object apparatus normally works. In the status monitor process of FIG. 14, the failover processor 160 receives a reply packet (step S503). In order to receive the reply packet, the failover processor 160 updates the registry in the monitor state field of the status monitor database 170 to 'communication enabled' and performs the recovery detection-time process at step S506. In the second embodiment, however, there is no information registered in the recovery changeover database 190, so that the failover processor 160 actually performs no operation in the recovery detection-time process.

(B-5) Failover Process in Second Embodiment (2)

The failover process of the second embodiment in the event of detection of a failure in the backup server 202 is described. In response to detection of a failure in the backup server 202 (step S504: No) in the status monitor process of FIG. 14, the failover process is performed (step S508). The failover process of FIG. 29 updates the registries in the interface database 140 to the state of FIG. 6, based on the registries in the failure changeover database 180 of FIG. 33. Accompanied with the update of the registries in the interface database 140, the registries in the VRF1 routing table 121 and the VRF2 routing table 122 are updated to the state of FIG. 7 and to the state of FIG. 8, respectively. This returns or switches back the registries in the interface database 140, in the VRF1 routing table 121, and in the VRF2 routing table 122 to the initial conditions.

The status monitor process then follows the processing flow of FIG. 14 with the changeover of the monitor object apparatus having the monitor ID of 50 to the primary server 201. The failover processor 160 of the second embodiment changes over the monitor object apparatus to the backup server 202 on detection of a failure in the primary server 201 and starts monitoring the status of the backup server 202. The failover processor changes over the monitor object apparatus to the primary server 201 on detection of a failure in the backup server 202 and starts monitoring the status of the primary server 201. Namely the status monitor process of the second embodiment sets the working server currently enabled to provide the service as the monitor object apparatus.

As described above, the failover processor 160 of the second embodiment functioning as the status monitor monitors the status of the first processing apparatus (primary server 201) that belongs to the first virtual network VRF1 and is enabled to provide the client apparatuses (hosts 301 and 302) with the service. In response to detection of a failure in the first processing apparatus (primary server 201) that falls into the abnormal state disabled to provide the service, the failover processor 160 updates the registries in the interface database 140 as the VRF definition information to change the belongingness of the second processing apparatus (backup server 202) and the client apparatuses (hosts 301 and 302) to the first virtual network VRF1 and to change the belongingness of the first processing apparatus (primary server 201) to the second virtual network VRF2. This arrangement assures the similar effects to those of the first embodiment described above.

The failover process of the second embodiment updates the VRF definition information with regard to the first and the second processing apparatuses (i.e., primary server 201 and backup server 202). This arrangement effectively reduces the required amount of update for the VRF definition information in a network configuration where the number of servers connecting with the network apparatus 100 is less than the number of hosts connecting with the network apparatus 100. Namely the time period required for the failover process may be shortened.

C. Third Embodiment (C-1) System Configuration of Third Embodiment

Figure 34:
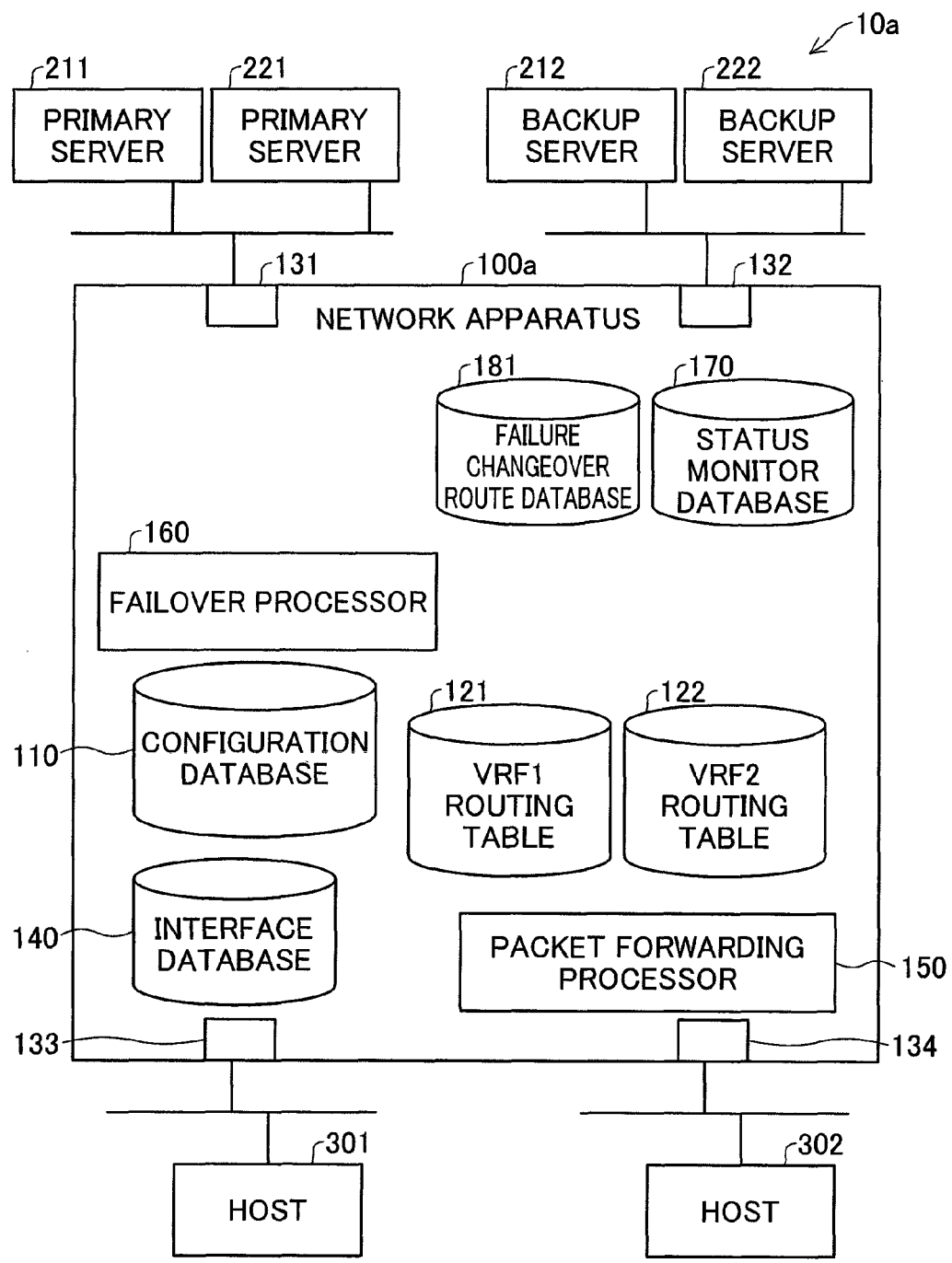
FIG. 34 is an explanatory diagrammatic representation of the general configuration of a network system according to a third embodiment of the invention.

FIG. 34 is an explanatory diagrammatic representation of the general configuration of a network system 10a according to a third embodiment of the invention. The general configuration of the network system 10a in the third embodiment is similar to that of the network system 10 of the first embodiment shown in FIG. 1, except replacement of the primary server 201 with two primary servers 211 and 221, replacement of the backup server 202 with two backup servers 212 and 222, replacement of the failure changeover database 180 with a failure changeover route database 181, and omission of the recovery changeover database 190. The like components in the configuration of the third embodiment to those in the configuration of the first embodiment are expressed by the like symbols and numerals and are not specifically described here. Only the differences from the structures and the operations of the first embodiment are described below.

The primary server 211 is a working server computer to provide hosts with a first service (for example, web service), and the primary server 221 is a working server computer to provide hosts with a second service (for example, mail service). The backup server 212 is a standby server computer to provide the first service, when the primary server 211 falls into an abnormal state disabled to provide the first service. The backup server 222 is a standby server computer to provide the second service, when the primary server 221 falls into an abnormal state disabled to provide the second service.

A network apparatus 100a is a layer 3 network relay apparatus of relaying packet transmission between the four servers 211, 221, 212, and 222 and the two hosts 301 and 302. The network apparatus 100a has four interfaces 131 through 134, a configuration database 110, a VRF1 routing table 121, a VRF2 routing table 122, an interface database 140, a packet forwarding processor 150, a failover processor 160, a status monitor database 170, and a failure changeover route database 181.

The interface 131 is connected to the primary server 211 and to the primary server 221 via lines. The interface 132 is connected to the backup server 212 and to the backup server 222 via lines. The interface 133 and the interface 134 are respectively connected to the host 301 via a line and to the host 302 via a line. The failure changeover route database 181 stores information used for a failover process.

In the third embodiment, an IP address, a subnet mask length, and a default gateway shown in FIG. 2 are respectively set in the two servers to provide the first service (i.e., in the primary server 211 and the backup server 212). Namely the same IP address is allocated to the primary server 211 and to the backup server 212.

FIG. 35 is an explanatory diagrammatic representation of one example of IP address information of the two servers to provide the second service in the third embodiment. An IP address, a subnet mask length, and a default gateway shown in FIG. 35 are respectively set in the two servers to provide the second service (i.e., in the primary server 221 and the backup server 222). Namely the same IP address is allocated to the primary server 221 and to the backup server 222.

FIG. 36 is an explanatory diagrammatic representation of one example of configuration information of the network apparatus 100*a* in the third embodiment. The difference from the configuration information of the first embodiment shown in FIG. 5 is deletion of the rows C11 and C15 and addition of rows C301, C302, and C303. Otherwise the configuration information of the third embodiment is similar to the configuration information of the first embodiment.

The row C17 defines a status monitor rule 50 for monitoring the reachability of a packet to an apparatus with an IP address '10.1.1.1' as an identifier included in a first VRF network. Namely the row C17 defines the status monitor rule of the primary server 211. The row C301 defines a status monitor rule 51 for monitoring the reachability of a packet to an apparatus with an IP address '10.1.1.2' as an identifier included in the first VRF network. Namely the row C301 defines the status monitor rule of the primary server 221.

The row C302 defines route information having a destination of the IP address '10.1.1.1' in the first VRF network to change over the output interface to the interface 132 on the occurrence of a failure in the monitor object defined by the status monitor rule 50. The row C303 defines route information having a destination of the IP address '10.1.1.2' in the first VRF network to change over the output interface to the interface 132 on the occurrence of a failure in the monitor object defined by the status monitor rule 51.

FIG. 37 is an explanatory diagrammatic representation of one example of the VRF1 routing table 121 in the third embodiment. The difference from the VRF1 routing table 121 of the first embodiment shown in FIG. 7 is that information on the primary server 211 is registered in an entry E31 and that information on the primary server 221 is registered in an entry E32, in place of the entry E1.

FIG. 38 is an explanatory diagrammatic representation of one example of the VRF2 routing table 122 in the third embodiment. The difference from the VRF2 routing table 122 of the first embodiment shown in FIG. 8 is that information on the backup server 212 is registered in an entry E31 and that information on the backup server 222 is registered in an entry E32, in place of the entry E1.

FIG. 39 is an explanatory diagrammatic representation of one example of the status monitor database 170 in the third embodiment. The difference from the status monitor database 170 of the first embodiment shown in FIG. 9 is addition of an entry E32 defining a monitor ID of 51. In the illustrated example of FIG. 39, the monitor object apparatus having a monitor ID of 50 in an entry E31 has the combination of the registry of '10.1.1.1' in the monitor object IP address field and the registry of 'first VRF' in the monitor object VRF field, which identifies the primary server 211 as the monitor object apparatus. The monitor object apparatus having the monitor ID of 51 in the entry E32 has the combination of the registry of '10.1.1.2' in the monitor object IP address field and the registry of 'first VRF' in the monitor object VRF field, which identifies the primary server 221 as the monitor object apparatus. The registries in the monitor state field of both the entries E31 and E32 are 'communication enabled', which show that both the primary servers 211 and 221 are currently in the normal state enabled to provide the service.

FIG. 40 is an explanatory diagrammatic representation of one example of the failure changeover route database 181 in the third embodiment. The failure changeover route database 181 has a monitor ID field, a changeover object VRF field, a changeover object route field, and a changeover destination output interface field. The monitor ID field has registry of an identifier for identifying each monitor object group. The changeover object VRF field has registry of an identifier of a VRF network as an object of a failover process in the status monitor process. The changeover object route field has registry of a destination IP address representing a changeover object route by the failover process. The changeover destination output interface field has registry of an identifier of a new output interface as a changeover destination by the failover process.

The failure changeover route database 181 is provided, based on the configuration database 110 of defining the configuration information of the network apparatus 100*a* (FIG. 36). The information defined in the row C302 in the configuration information described above with reference to FIG. 36 is registered in an entry E31 of the failure changeover route database 181. The information defined in the row C303 is registered in an entry E32.

(C-2) Status Monitor Process in Third Embodiment (1)

A status monitor process of the third embodiment follows the processing flow of the first embodiment described above with reference to FIG. 14.

FIG. 41 is an explanatory diagrammatic representation of the registries in the status monitor database 170 updated at step S507 on the occurrence of a failure in the primary server 211 in the status monitor process of FIG. 14. The difference from the status monitor database 170 of FIG. 39 before detection of a failure is that the registry in the monitor state field has been changed to 'communication disabled' in the entry E31 having the registry of '50' in the monitor ID field and the registry of '10.1.1.1' in the monitor object IP address field.

(C-3) Failover Process in Third Embodiment (1)

Figure 42:
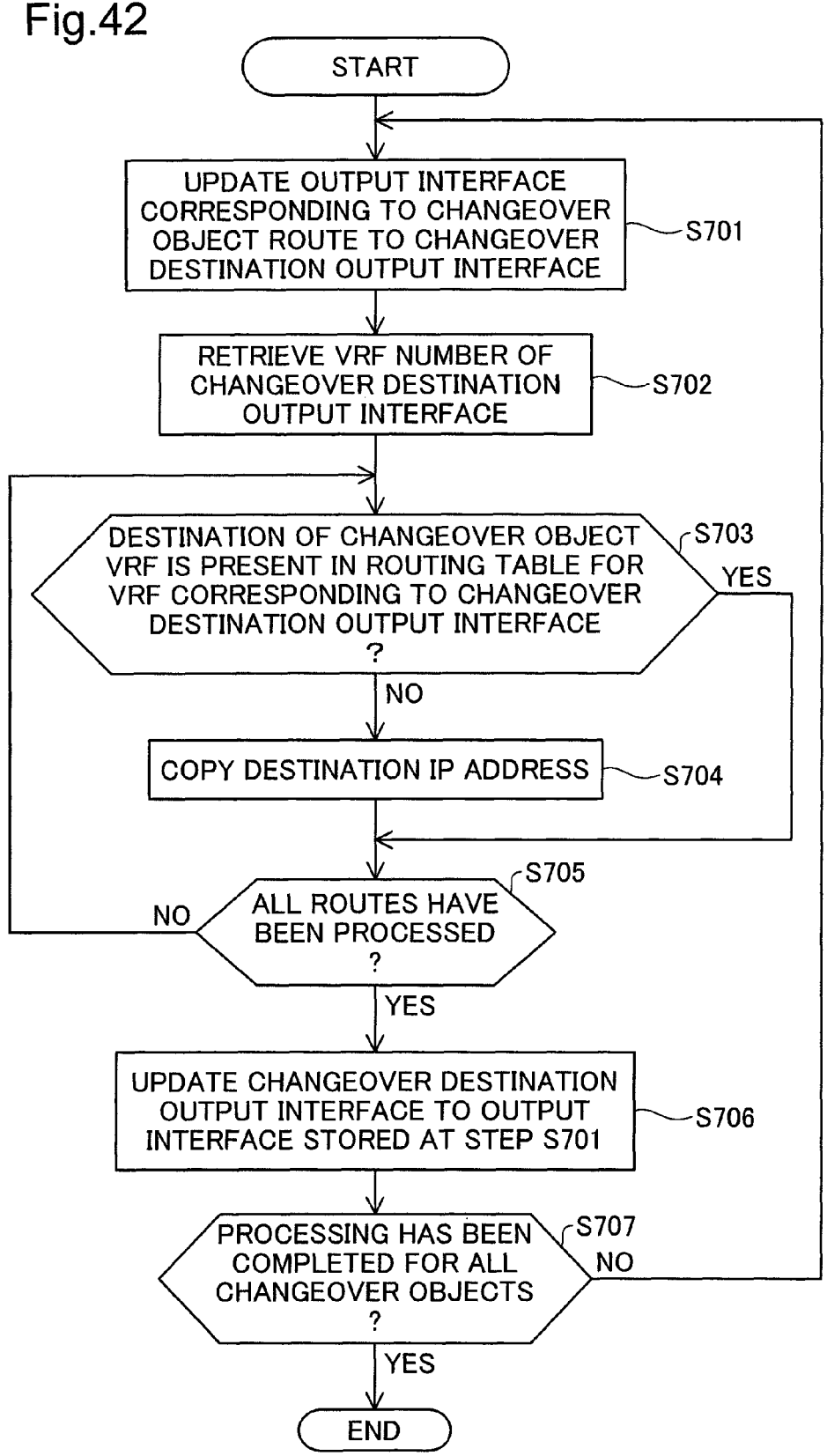
FIG. 42 is a flowchart showing the details of the failover process performed at step S508 (FIG. 14) in the third embodiment.

FIG. 42 is a flowchart showing the details of the failover process performed at step S508 (FIG. 14) in the third embodiment. The failover processor 160 refers to the monitor ID having detection of a failure in the status monitor process of FIG. 14 and the registries in the failure changeover route database 181 described above with reference to FIG. 40, and performs the failover process in response to detection of a failure according to the flowchart of FIG. 42.

The failover processor 160 changes the registry of an output interface corresponding to a changeover object route to the registry of a changeover destination output interface at step S701. More specifically, the failover processor 160 searches the failure changeover route database 181 of FIG. 40 for any matching entry having the registry in the monitor ID field identical with the monitor ID having detection of a failure in the status monitor process. The failover processor 160 then obtains the registries in the changeover object VRF field, the changeover object route field, and the changeover destination output interface field of the matching entry.

The failover processor 160 subsequently searches the routing table for any matching entry having the registry in the destination IP address field identical with the obtained registry in the changeover object route field. The routing table to be searched is specified by the obtained registry in the changeover object VRF field. When the obtained registry in the changeover object VRF field is '1', the VRF1 routing table 121 is searched. When the obtained registry is '2', on the other hand, the VRF2 routing table 122 is searched. The failover processor 160 temporarily stores the registry in the output interface field of the matching entry and updates the registry in the output interface field of the matching entry to the obtained registry in the changeover destination output interface field of the failure changeover route database 181.

The failover processor 160 subsequently retrieves the registry of a VRF number corresponding to the obtained changeover destination output interface at step S702. More specifically, the failover processor 160 searches the interface database 140 of FIG. 6 for any matching entry having the registry in the interface number field identical with the obtained registry in the changeover destination output interface field and obtains the registry in the VRF number field of the matching entry.

At subsequent step S703, the failover processor 160 determines whether the destination of the obtained changeover object VRF is present in the routing table for the VRF corresponding to the obtained changeover destination output interface. More specifically, it is determined whether the destination IP address of each entry registered in the routing table (i) specified corresponding to the registry in the changeover object VRF field obtained at step S701 is present in the routing table (ii) specified corresponding to the registry in the VRF number field obtained at step S702.

On determination of the absence at step S703, the failover processor 160 copies route information of the destination IP address registered in the routing table (i) onto the routing table (ii) at step S704. On determination of the presence at step S703, on the other hand, the processing flow goes to step S705.

The failover processor 160 determines whether all the routes have been processed at step S705. More specifically, the failover processor 160 determines whether all the entries registered in the routing table (i) have been subjected to the processing of steps S703 and S704. When the processing has not yet been completed for all the routes (step S705: No), the processing flow goes back to step S703 and repeats the processing of steps S703 and S704.

When the processing has been completed for all the routes (step S705: Yes), on the other hand, the processing flow goes to step S706 where the failover processor 160 changes the registry in the changeover destination output interface field to the output interface stored at step S701. More specifically, the failover processor 160 updates the registry in the changeover destination output interface field of the failure changeover route database 181 to the registry in the output interface field of the routing table temporarily stored at step S701.

The failover processor 160 determines whether the processing has been completed for all the changeover objects at step S707. More specifically, it is determined whether the processing has been completed for all the changeover objects, i.e., the changeover destination output interfaces of the matching entries (having the registries in the monitor ID field identical with the monitor ID having detection of a failure in the status monitor process) in the failure changeover route database 181 searched at step S701. When the processing has been completed for all the changeover objects (step S707: Yes), the failover process is terminated. When the processing has not yet been completed for all the changeover objects (step S707: No), on the other hand, the processing flow goes back to step S701 and repeats the same series of processing with regard to a next changeover object.

The failover process of the third embodiment in the event of detection of a failure in the primary server 211 is described with reference to FIG. 42. The failover processor 160 searches the failure changeover route database 181 for any matching entry having the registry of '50' in the monitor ID field, and obtains the changeover object VRF of '1', the changeover object route of '10.1.1.1', and the changeover destination output interface of '132' (step S701).

The failover processor 160 subsequently retrieves the matching entry E31 corresponding to the changeover object route of '10.1.1.1' from the VRF1 routing table 121 specified corresponding to the changeover object VRF of '1'. The failover processor 160 temporarily stores the registry of '131' in the output interface field of the matching entry E31 and updates the registry in the output interface field to the obtained changeover destination output interface of '132'.

The failover processor 160 retrieves the matching entry E2 corresponding to the obtained changeover destination output interface of '132' from the interface database 140 of FIG. 6 and obtains the registry of '2' in the VRF number field of the matching entry E2 (step S702).

The failover processor 160 determines whether the destination IP address of each entry registered in the VRF1 routing table 121 (i) specified corresponding to the changeover object VRF of '1' obtained at step S701 is present in the VRF2 routing table 122 (ii) specified corresponding to the VRF number of '2' obtained at step S702 (step S703). The failover processor 160 copies route information of the destination IP address, which is present in the VRF1 routing table 121 (i) but is not present in the VRF2 routing table 122 (ii), onto the VRF2 routing table 122 (ii) (step S704).

FIG. 43 is an explanatory diagrammatic representation of the VRF1 routing table 121 updated at step S701 in the failover process of FIG. 42. The difference from the VRF1 routing table 121 of FIG. 37 before detection of a failure is that the registry in the output interface field has been updated to '132' in the entry E31.

FIG. 44 is an explanatory diagrammatic representation of the VRF2 routing table 122 updated at steps S703 and S704 in the failover process of FIG. 42. The difference from the VRF2 routing table 122 of FIG. 38 before detection of a failure is addition of entries E34 through E37. The entries E34 through E37 define route information of the destination IP addresses that are present in the VRF1 routing table 121 before detection of a failure but are not present in the VRF2 routing table 122 before detection of a failure.

FIG. 45 is an explanatory diagrammatic representation of the failure changeover route database 181 updated at step S706 in the failover process of FIG. 42. The difference from the failure changeover route database 181 of FIG. 40 before detection of a failure is that the registry in the changeover destination output interface field has been updated to '131' in the entry E31 with the monitor ID of '50'.

(C-4) Operations after Detection of Failure in Third Embodiment

Figure 46:
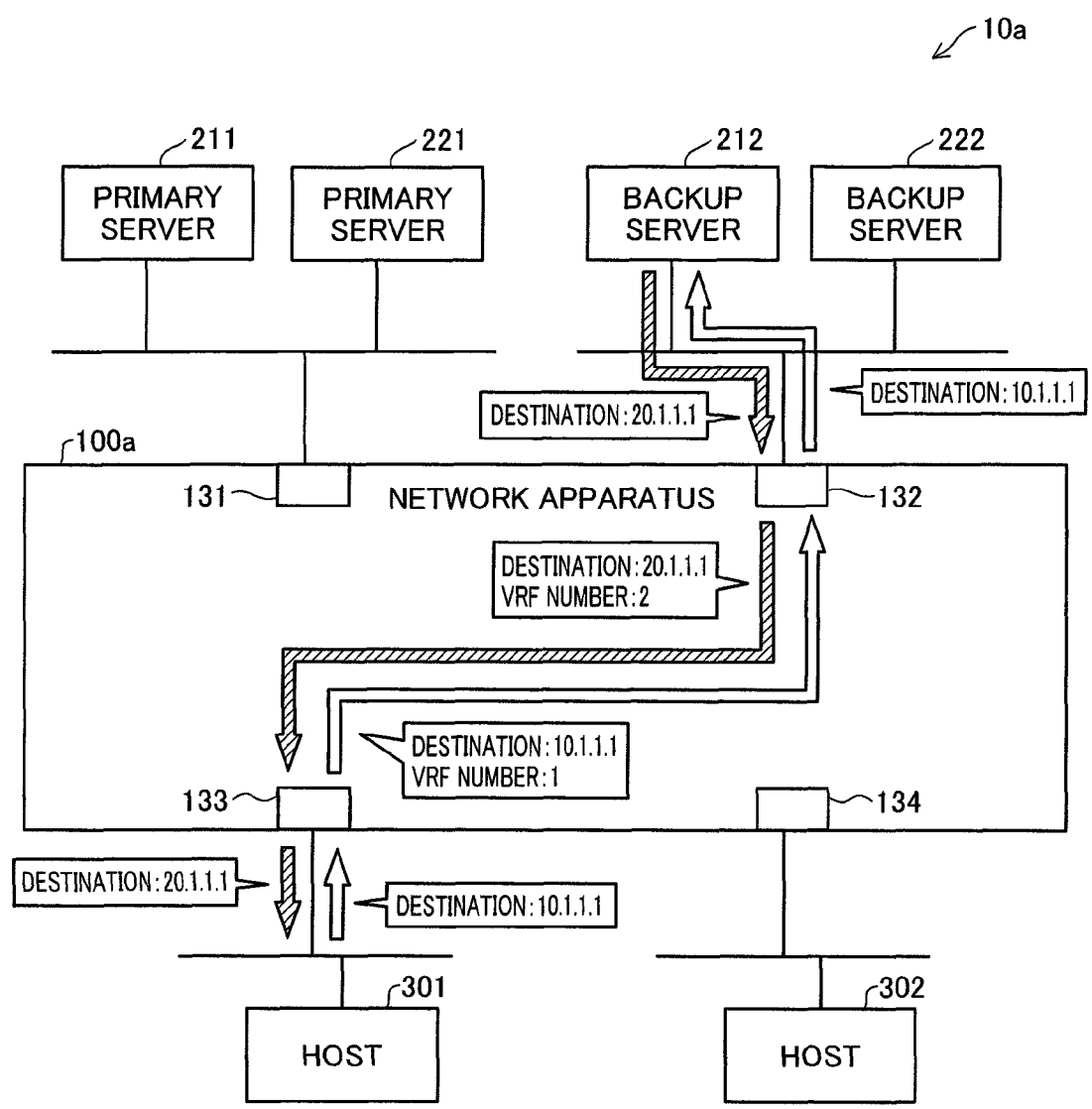
FIG. 46 is an explanatory diagrammatic representation of the operations of the network system of the third embodiment on the occasion of providing the first service after detection of a failure in the primary server.

FIG. 46 is an explanatory diagrammatic representation of the operations of the network system 10a of the third embodiment on the occasion of providing the first service after detection of a failure in the primary server 211. In the state of FIG. 46, the host 301 sends a request packet with a destination IP address of '10.1.1.1', in order to have access to the server providing the first service (either the primary server 211 or the backup server 212).

The network apparatus 100a receives the packet sent from the host 301 via the interface 133 (step S11 in FIG. 13). The packet forwarding processor 150 searches the interface database 140 of FIG. 6 for a matching entry E3 corresponding to the interface identifier of '133' and obtains the registry of '1' in the VRF number field of the matching entry E3 (step S12 in FIG. 13). The packet forwarding processor 150 searches the VRF1 routing table 121 of FIG. 43 specified corresponding to the obtained VRF number of '1' and specifies an output interface (step S13 in FIG. 13). The packet forwarding processor 150 then outputs the packet via the output interface 132 specified at step S13 (step S14 in FIG. 13).

In this manner, the request packet sent from the host 301 is forwarded to the backup server 212. The backup server 212 provides a required service based on the request packet received from the host 301 and sends back a replay packet to the host 301. A destination IP address of the replay packet is the IP address '20.1.1.1' of the host 301.

The network apparatus 100a receives the reply packet sent from the backup server 212 via the interface 132. The packet forwarding processor 150 performs the same series of packet forwarding process described above with regard to the received reply packet. In this case, the registry '2' in the VRF number field is obtained from a matching entry E2 retrieved corresponding to the interface identifier '132' from the interface database 140, so that the packet forwarding processor 150 searches the VRF2 routing table 122 and specifies an output interface. The reply packet sent from the backup server 212 is accordingly forwarded to the host 301. The host 302 has similar series of operations to those described above with regard to the host 301.

As described above, the backup server 212 functions as the working server providing the first service after detection of a failure in the primary server 211 providing the first service.

Figure 47:
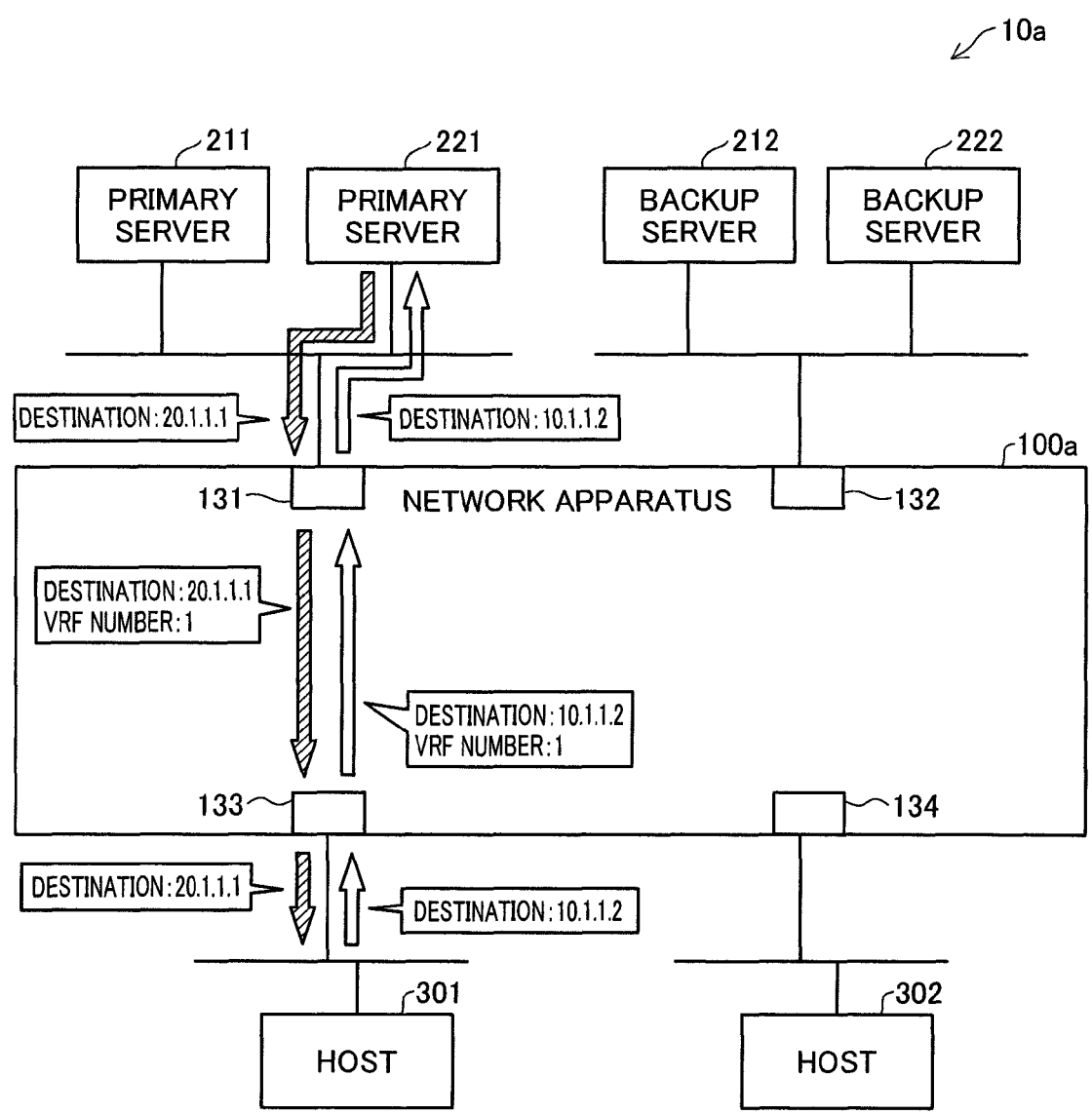
FIG. 47 is an explanatory diagrammatic representation of the operations of the network system of the third embodiment on the occasion of providing the second service after detection of a failure in the primary server.

FIG. 47 is an explanatory diagrammatic representation of the operations of the network system 10a of the third embodiment on the occasion of providing the second service after detection of a failure in the primary server 211. In the state of FIG. 47, the host 301 sends a request packet with a destination IP address of '10.1.1.2', in order to have access to the server providing the second service (either the primary server 221 or the backup server 222).

The network apparatus 100a receives the packet sent from the host 301 via the interface 133 (step S11 in FIG. 13). As in the state of FIG. 46, the packet forwarding processor 150 searches the interface database 140 of FIG. 6 for a matching entry E3 corresponding to the interface identifier of '133' and obtains the registry of '1' in the VRF number field of the matching entry E3 (step S12 in FIG. 13). The packet forwarding processor 150 searches the VRF1 routing table 121 of FIG. 43 specified corresponding to the obtained VRF number of '1' and specifies an output interface (step S13 in FIG. 13). The packet forwarding processor 150 then outputs the packet via the output interface 131 specified at step S13 (step S14 in FIG. 13).

In this manner, the request packet sent from the host 301 is forwarded to the primary server 221. The primary server 221 provides a required service based on the request packet received from the host 301 and sends back a replay packet to the host 301. A destination IP address of the replay packet is the IP address '20.1.1.1' of the host 301.

The network apparatus 100a receives the reply packet sent from the primary server 221 via the interface 131. The packet forwarding processor 150 performs the same series of packet forwarding process described above with regard to the received reply packet. In this case, the registry '1' in the VRF number field is obtained from a matching entry E1 retrieved corresponding to the interface identifier '131' from the interface database 140, so that the packet forwarding processor 150 searches the VRF1 routing table 121 and specifies an output interface. The reply packet sent from the primary server 221 is accordingly forwarded to the host 301. The host 302 has similar series of operations to those described above with regard to the host 301.

As described above, even after detection of a failure in the primary server 211 providing the first service, the primary server 221 without a failure is not affected by the failure in the primary server 211 but continuously functions as the working server providing the second service.

(C-5) Status Monitor Process in Third Embodiment (2)

As explained above with reference to FIG. 39, the monitor object apparatus having the monitor ID of 50 has the registry of '10.1.1.1' in the monitor object IP address field and the registry of 'first VRF' in the monitor object VRF field in the status monitor database 170. Namely the monitor object apparatus was the primary server 211 before detection of a failure in the primary server 211.

The status monitor process of the third embodiment in the event of detection of a failure in the primary server 211 is described. In response to detection of a failure in the primary server 211 (step S504: No) in the status monitor process of FIG. 14, the failover process is performed (step S508). The failover process of FIG. 42 updates the registries in the VRF1 routing table 121 and the VRF2 routing table 122 respectively to the state of FIG. 43 and to the state of FIG. 44, based on the registries in the failure changeover route database 181 shown in FIG. 40.

In the status monitor database 170 in the state of FIG. 39, the entry E31 having the monitor ID of 50 has the registry of '1' in the monitor object VRF field. In the status monitor process of FIG. 14, the failover processor 160 then searches the VRF1 routing table 121 of FIG. 43 for any matching entry having the registry in the destination IP address field identical with the registry of '10.1.1.1' in the monitor object IP address field of the status monitor database 170. The failover processor 160 obtains the registry of '10.1.1.1' in the next hop IP address field and the registry '132' in the output interface field of the matching entry E31 from the VRF1 routing table 121.

The failover processor 160 accordingly sends a packet to the backup server 212 via the interface 132. This means that the monitor object apparatus having the monitor ID of 50 in the entry E31 (FIG. 39) has been changed from the primary server 211 to the backup server 212.

The backup server 212 as the new monitor object apparatus normally works. In the status monitor process of FIG. 14, the failover processor 160 receives a reply packet (step S503). In order to receive the reply packet, the failover processor 160 updates the registry in the monitor state field of the status monitor database 170 to 'communication enabled' and performs the recovery detection-time process at step S506. The network apparatus 100a of the third embodiment, however, does not have the recovery changeover database 190, so that the failover processor 160 actually performs no operation in the recovery detection-time process. The status monitor database 170 after the series of operations in the status monitor process is in the state of FIG. 39.

(C-6) Failover Process in Third Embodiment (2)

The failover process of the third embodiment in the event of detection of a failure in the backup server 212 is described. In response to detection of a failure in the backup server 212 (step S504: No) in the status monitor process of FIG. 14, the failover process is performed (step S508). In the failover process of FIG. 42, the failover processor 160 searches the failure changeover route database 181 of FIG. 45 for any matching entry corresponding to the monitor ID of '50' and obtains the changeover object VRF of '1', the changeover object route of '10.1.1.1', and the changeover destination output interface of '131' of the matching entry (step S701).

The failover processor 160 subsequently searches the VRF1 routing table 121 for any matching entry corresponding to the changeover object route of '10.1.1.1', temporarily stores the output interface '132' of the matching entry, and updates the registry in the output interface field of the VRF1 routing table 121 to the obtained changeover destination output interface of '131'.

The failover processor 160 searches the interface database 140 of FIG. 6 for any matching entry corresponding to the changeover destination output interface of '131' and obtains the VRF number of '1' of the matching entry (step S702).

The failover processor 160 determines whether the destination IP address of each entry registered in the VRF1 routing table 121 (i) specified corresponding to the changeover object VRF of '1' obtained at step S701 is present in the VRF1 routing table 121 (ii) specified corresponding to the VRF number of '1' obtained at step S702 (step S703). Since both the routing tables (i) and (ii) are the VRF1 routing table 122, the decision point of step S703 always gives an affirmative answer 'Yes'. Namely the operation of copying the route information of the destination IP address at step S704 is skipped.

The failover processor 160 updates the registry of the changeover destination output interface in the failure changeover route database 181 to the temporarily stored output interface of '132' (step S706). The failover processor 160 determines completion of the processing with regard to all the changeover objects (step S707) and terminates the failover process.

The VRF1 routing table 121 updated at step S701 is in the state of FIG. 37. Due to the skip of step S704, the VRF2 routing table 122 is kept in the state of FIG. 44. The failure changeover route database 181 updated at step S706 is in the state of FIG. 40.

(C-7) Status Monitor Process in Third Embodiment (3)

As explained above with reference to FIG. 39, the monitor object apparatus having the monitor ID of 50 has the registry of '10.1.1.1' in the monitor object IP address field and the registry of 'first VRF' in the monitor object VRF field in the status monitor database 170. In the status monitor process of FIG. 14, the failover processor 160 accordingly searches the VRF1 routing table 121 of FIG. 37 for any matching entry corresponding to the registry of '10.1.1.1' in the monitor object IP address field in the status monitor database 170 and obtains the output interface of '131' from the matching entry E31. The failover processor 160 accordingly sends a packet to the primary server 211 via the interface 131. This means that the monitor object apparatus having the monitor ID of 50 defined by the entry E31 in the status monitor database 170 of FIG. 39 has been returned from the backup server 212 to the primary server 211.

Figure 48:
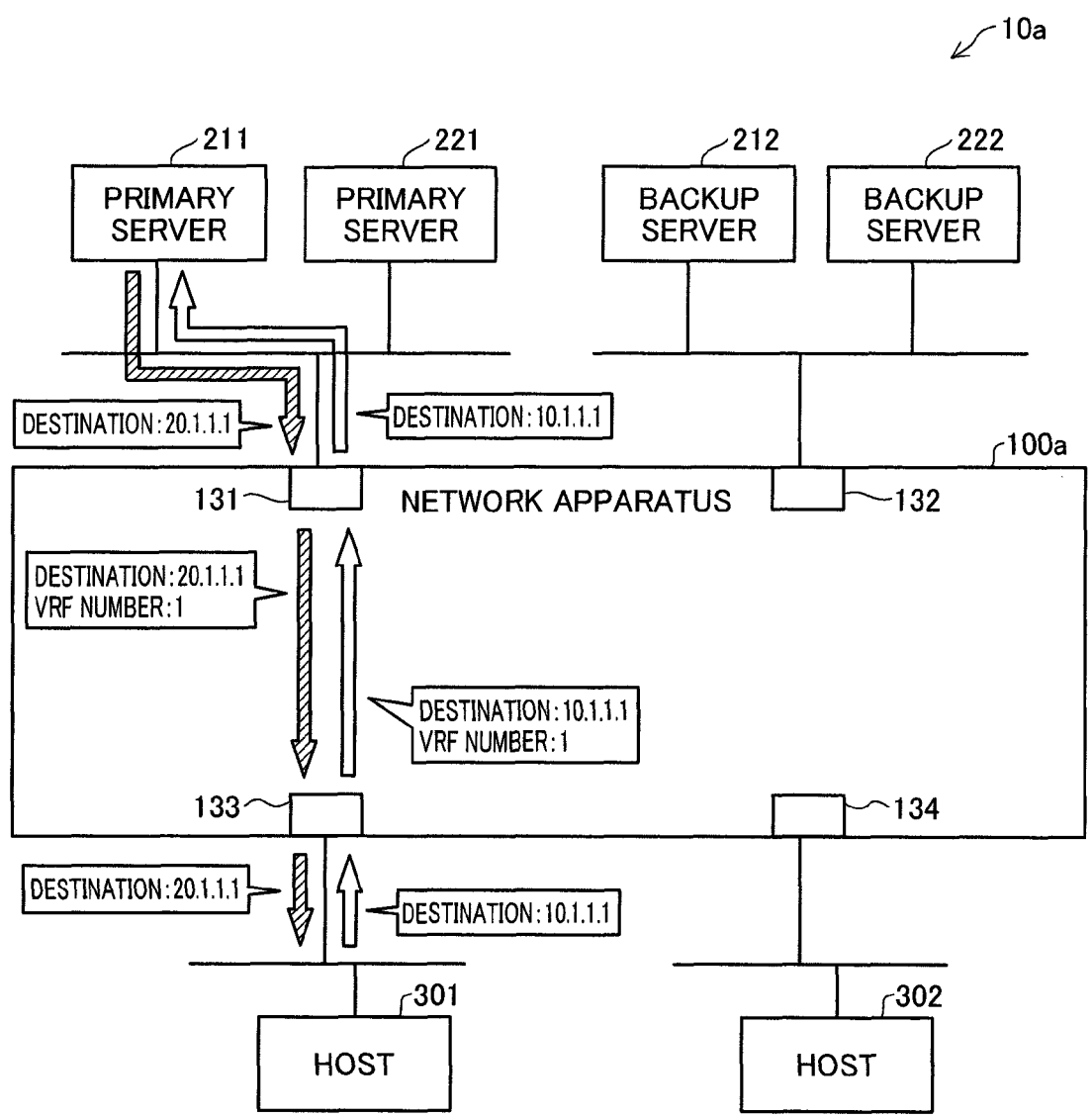
FIG. 48 is an explanatory diagrammatic representation of the operations of the network system of the third embodiment on the occasion of providing the first service after detection of a failure in the backup server.

(C-8) Operations after Detection of Failure in Backup Server in Third Embodiment FIG. 48 is an explanatory diagrammatic representation of the operations of the network system 10a of the third embodiment on the occasion of providing the first service after detection of a failure in the backup server 212. In the state of FIG. 48, the host 301 sends a request packet with a destination IP address of '10.1.1.1', in order to have access to the server providing the first service (either the primary server 211 or the backup server 212).

In the network apparatus 100a of the third embodiment, the packet forwarding processor 150 searches the interface database 140 of FIG. 6 for a matching entry E3 corresponding to the interface identifier of '133' and obtains the registry of '1' in the VRF number field of the matching entry E3 (step S12 in FIG. 13). The packet forwarding processor 150 searches the VRF1 routing table 121 of FIG. 37 specified corresponding to the obtained VRF number of '1' and specifies an output interface (step S13 in FIG. 13). The packet forwarding processor 150 then outputs the packet via the output interface 131 specified at step S13 (step S14 in FIG. 13).

In this manner, the request packet sent from the host 301 is forwarded to the primary server 211. The primary server 211 provides a required service based on the request packet received from the host 301 and sends back a replay packet to the host 301. A destination IP address of the replay packet is the IP address '20.1.1.1' of the host 301.

The network apparatus 100a receives the reply packet sent from the primary server 211 via the interface 131. The packet forwarding processor 150 performs the same series of packet forwarding process described above with regard to the received reply packet. In this case, the registry '1' in the VRF number field is obtained from a matching entry E1 retrieved corresponding to the interface identifier '131' from the interface database 140, so that the packet forwarding processor 150 searches the VRF1 routing table 121 and specifies an output interface. The reply packet sent from the backup server 212 is accordingly forwarded to the host 301. The host 302 has similar series of operations to those described above with regard to the host 301.

As described above, the primary server 211 functions as the working server providing the first service after detection of a failure in the backup server 212 providing the first service. The operations of the network system 10a of the third embodiment on the occasion of providing the second service after detection of a failure in the backup server 212 are similar to those described above with reference to FIG. 47.

FIG. 49 is an explanatory diagrammatic representation of one example of a command for deleting the contents of a routing table. The administrator of the network apparatus 100a operates a management terminal (not shown) of the network apparatus 100a to execute this operational command of FIG. 49 and delete all the entries of the VRF2 routing table 122. A learning processor (not shown) included in the network apparatus 100a relearns information on an IP address of each interface having the registry of '2' in the VRF number field of the interface database 140 and an IP address of each apparatus connecting with the interface via a line or another network apparatus. The learning processor stores the relearned information into the VRF2 routing table 122.

In the network configuration of the third embodiment, once the backup server 212 functions as the working server to provide the service, the VRF2 routing table 122 keeps the information copied from the VRF1 routing table 121 even after the working server has returned from the backup server 212 to the primary server 211. The VRF2 routing table 122 is thus kept in the state of FIG. 44 with unnecessary entries E34 through E37. Execution of the operational command of FIG. 49 deletes the unnecessary entries from the routing table and thus prevents the useless resource consumption of the routing table.

FIG. 50 is an explanatory diagrammatic representation of one example of a command for deleting arbitrary route information from a routing table. The administrator of the network apparatus 100a operates the management terminal (not shown) of the network apparatus 100a to execute this operational command of FIG. 50 and delete the entry having the destination IP address of '10.1.1.1' from the VRF1 routing table 121. The learning processor (not shown) included in the network apparatus 100a relearns information on an interface having the IP address of '10.1.1.1' and the registry of '1' in the VRF number field of the interface database 140. The learning processor stores the relearned information into the VRF1 routing table 121.

In the network configuration of the third embodiment, once the backup server 212 functions as the working server to provide the service, the backup server 212 continues functioning as the working server until detection of a failure in the backup server 212. Execution of the operational command of FIG. 50 updates the VRF1 routing table 121 to the state of FIG. 37 and thus forces the primary server 211 to function again as the working server.

As described above, the failover processor 160 of the third embodiment functioning as the status monitor monitors the status of each first processing apparatus (primary server 211 or primary server 221) that belongs to the first virtual network VRF1 and is enabled to provide the client apparatuses (hosts 301 and 302) with the specific service. In response to detection of a failure in the first processing apparatus that falls into the abnormal state disabled to provide the service, the failover processor 160 copies the route information with regard to the client apparatuses in the VRF1 routing table 121 as the route information of the first virtual network into the VRF2 routing table 122 as the route information of the second virtual network. The failover processor 160 updates the output destination interface of an entry having a layer 3 address of the first processing apparatus (primary server 211 or primary server 221) as the destination IP address in the VRF1 routing table 121 to the interface connecting with the second processing apparatus (backup server 212 or backup server 222).

In the configuration where multiple processing apparatuses with different layer 3 addresses or IP addresses (primary server 211 and primary server 221) are connected to one identical interface of the network apparatus 100*a*, the arrangement of the third embodiment assures an effective failover process without being affected by the status of the other processing apparatus.

D. Fourth Embodiment

In a network configuration according to a fourth embodiment of the invention, both a working server and a standby server are used to perform a failover operation and to provide a required service.

(D-1) System Configuration of Fourth Embodiment

Figure 51:
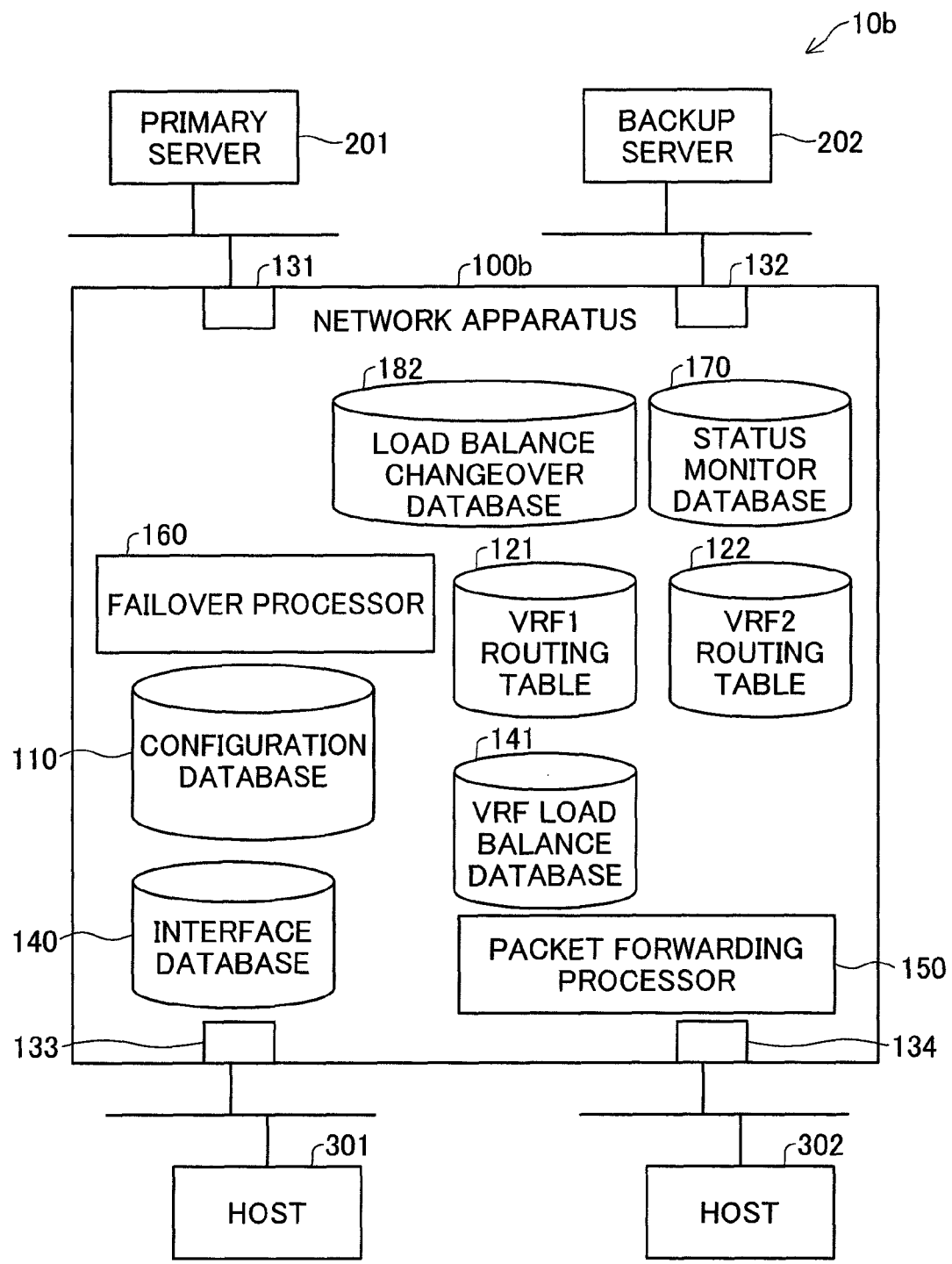
FIG. 51 is an explanatory diagrammatic representation of the general configuration of a network system according to the fourth embodiment of the invention.

FIG. 51 is an explanatory diagrammatic representation of the general configuration of a network system 10*b* according to the fourth embodiment of the invention. The general configuration of the network system 10*b* in the fourth embodiment is similar to that of the network system 10 of the first embodiment shown in FIG. 1, except replacement of the failure changeover database 180 with a load balance changeover database 182, addition of a VRF load balance database 141 as VRF definition information, and omission of the recovery changeover database 190. The like components in the configuration of the fourth embodiment to those in the configuration of the first embodiment are expressed by the like symbols and numerals and are not specifically described here. Only the differences from the structures and the operations of the first embodiment are described below.

A primary server 201 and a backup server 202 are server computers to provide hosts with a specific service, such as web service. In this embodiment, both the primary server 201 and the backup server 202 function as working servers in the hot standby state to provide the service.

The VRF load balance database 141 is used as the basis for selection of either the primary server 201 or the backup server 202 to establish communication. The load balance changeover database 182 stores information used for the failover process.

FIG. 52 is an explanatory diagrammatic representation of one example of configuration information of the network apparatus 100*b* in the fourth embodiment. The difference from the configuration information of the first embodiment shown in FIG. 5 is deletion of the rows C10, C11, C14, and C15 and addition of rows C401 through C404. Otherwise the configuration information of the fourth embodiment is similar to the configuration information of the first embodiment.

A row C401 has definitions of i) through (l) given below:
  i) An interface 133 belongs to a first VRF network;
  j) The interface 133 has a load balance with a second VRF network defined by a row C402;
  k) On detection of a failure in the primary server 201 according to a status monitor rule 50, the first VRF is excluded from a load balance destination of a packet received via the interface 133; and
  l) On detection of recovery from a failure in the primary server 201 according to the status monitor rule 50, the first VRF is kept excluded from the load balance destination of the packet received via the interface 133.

The row C402 has definitions of m) and n) given below:
  m) The interface 133 belongs to the second VRF network; and
  n) The interface 133 has a load balance with the first VRF network defined by the row C401.

A row C403 has definitions of o) through (r) given below:
  o) An interface 134 belongs to the first VRF network;
  p) The interface 134 has a load balance with the second VRF network defined by a row C404;
  q) On detection of a failure in the primary server 201 according to the status monitor rule 50, the first VRF is excluded from a load balance destination of a packet received via the interface 134; and
  r) On detection of recovery from a failure in the primary server 201 according to the status monitor rule 50, the first VRF is included in or recovered as the load balance destination of the packet received via the interface 134.

The row C404 has definitions of s) and t) given below:
  s) The interface 134 belongs to the second VRF network; and
  t) The interface 134 has a load balance with the first VRF network defined by the row C403.

FIG. 53 is an explanatory diagrammatic representation of one example of an interface database 140 in the fourth embodiment. The difference from the interface database 140 of the first embodiment shown in FIG. 6 is only entries registered in the interface database 140. A symbol 'LB' registered in the VRF number field of entries E43 and E44 represents a load balance process performed according to a predetermined rule on reception of a packet from the interface 133 or from the interface 134. The details of the load balance process will be described later.

FIG. 54 is an explanatory diagrammatic representation of one example of the VRF load balance database 141 in the fourth embodiment. The VRF load balance database 141 has an interface number field, a load balance type field, and a VRF number field. The interface number field has registry of an identifier of a packet-receiving interface. The load balance type field has registry of information indicating a search strategy for specifying a VRF number of a routing table to be searched in a packet forwarding process performed in the network apparatus 100*b*. The VRF number field has registry of identifiers of multiple VRF networks as the object of the load balance process.

Figure 55:
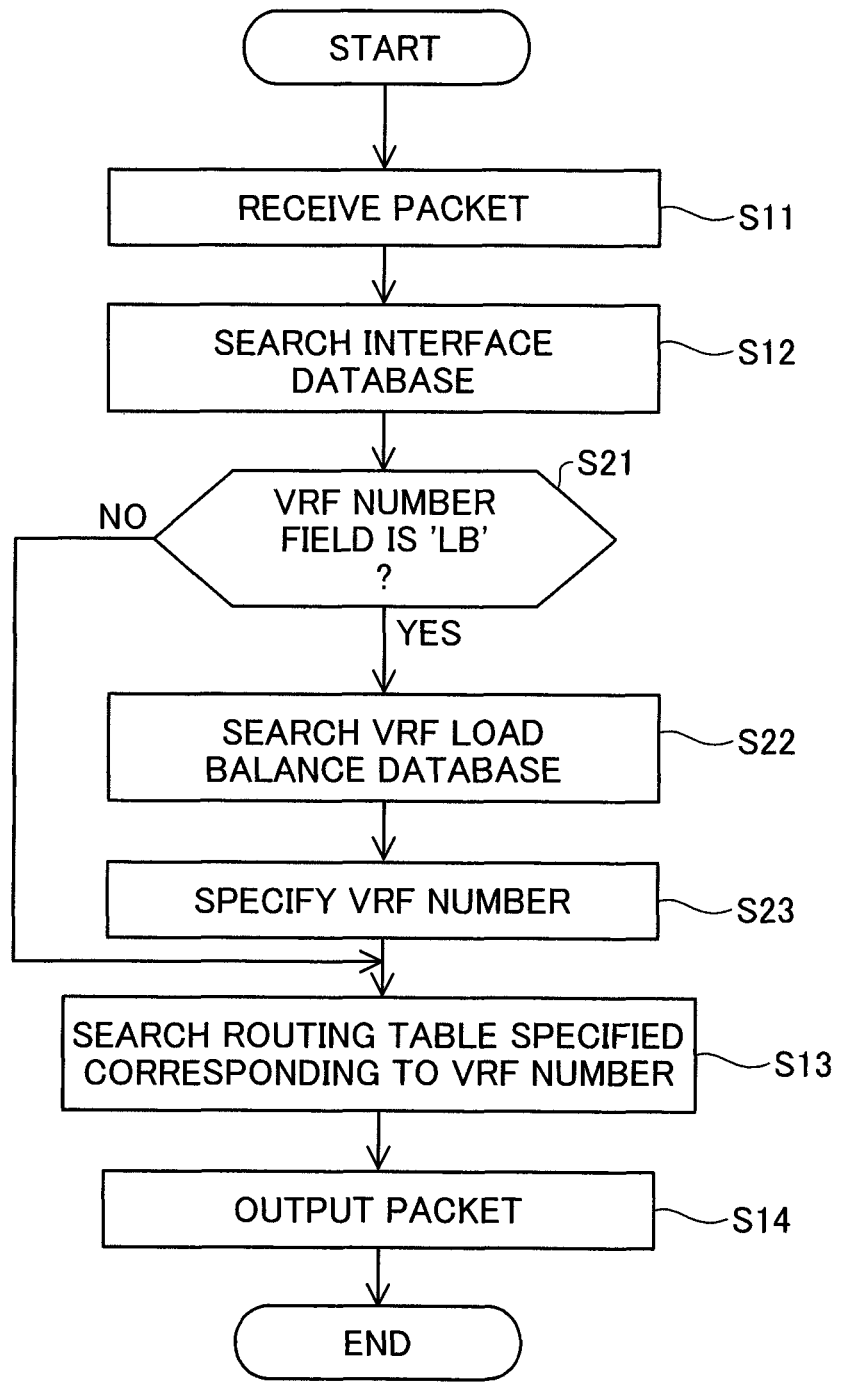
FIG. 55 is a flowchart showing a packet forwarding process performed in the fourth embodiment.

FIG. 55 is a flowchart showing a packet forwarding process performed in the fourth embodiment. The difference from the packet forwarding process of the first embodiment shown in FIG. 13 is addition of steps S21 through S23, and otherwise the packet forwarding process of the fourth embodiment is similar to that of the first embodiment. At step S21, the packet forwarding processor 150 searches the interface database 140 for any matching entry having the registry in the interface number field identical with the identifier of the packet-receiving interface and determines whether the registry in the VRF number field of the matching entry is 'LB'. When the registry in the VRF number field of the matching entry is not 'LB' (step S21: No), the processing flow goes to step S13.

When the registry in the VRF number field is 'LB' (step S21: Yes), on the other hand, the packet forwarding processor 150 searches the VRF load balance database 141 at step S22. More specifically, the packet forwarding processor 150 searches the VRF load balance database 141 for any matching entry having the registry in the interface number field identical with the identifier of the packet-receiving interface, and obtains the registries in the load balance type field and in the VRF number field of the matching entry.

The packet forwarding processor 150 specifies the VRF number at step S23. More specifically, the packet forwarding processor 150 specifies the VRF number according to a search strategy defined by the registry in the load balance type field obtained at step S22. In the illustrated example of FIG. 54, the load balance type field has the registry of 'source IP address'. Namely the packet forwarding processor 150 specifies the VRF number according to a predetermined rule based on the source IP address. One example of the predetermined rule is given below:

When the source IP address is '20.1.1.1', the former identifier (i.e., VRF number 1) between the identifiers of the multiple VRF networks registered in the VRF number field is determined as the VRF number; and When the source IP address is '30.1.1.1', the latter identifier (i.e., VRF number 2) between the identifiers of the multiple VRF networks registered in the VRF number field is determined as the VRF number.

The rule is not restricted to this example, but any other adequate rule may be adopted for the same purpose. For example, the VRF number may be specified by hash computation based on the source IP address. The search strategy for specifying the VRF number may not be based on the source IP address but may be based on any of various pieces of information other than the source IP address included in a received packet. The VRF number may be specified according to the statistical base on the amount of packet transmission.

FIG. 56 is an explanatory diagrammatic representation of one example of a VRF1 routing table 121 in the fourth embodiment. The VRF1 routing table 121 of the fourth embodiment is identical with the VRF1 routing table 121 of the first embodiment shown in FIG. 7. The VRF1 routing table 121 stores information on interfaces defined below and information on apparatuses connected to these interfaces via lines or via other network apparatuses:

interfaces having the registry of '1' in the VRF number field of the interface database 140 of FIG. 53; and interfaces having the registry of 'LB' in the VRF number field of the interface database 140 of FIG. 53 and having the registry of '1' included in the VRF number field of the VRF load balance database 141.

Namely the VRF1 routing table 121 stores the information on the interfaces 131, 133, and 134 and the information on the primary server 201, the host 301, and the host 302.

FIG. 57 is an explanatory diagrammatic representation of one example of a VRF2 routing table 122 in the fourth embodiment. The difference from the VRF2 routing table 122 of the first embodiment shown in FIG. 8 is addition of entries E43 through E46. The VRF2 routing table 122 stores information on interfaces defined below and information on apparatuses connected to these interfaces via lines or via other network apparatuses:

interfaces having the registry of '2' in the VRF number field of the interface database 140 of FIG. 53; and interfaces having the registry of 'LB' in the VRF number field of the interface database 140 of FIG. 53 and having the registry of '2' included in the VRF number field of the VRF load balance database 141.

Namely the VRF2 routing table 122 stores the information on the interfaces 132, 133, and 134 and the information on the backup server 202, the host 301, and the host 302.

FIG. 58 is an explanatory diagrammatic representation of one example of the load balance changeover database 182 in the fourth embodiment. The load balance changeover database 182 has a monitor ID field, a changeover object interface field, a non-load balance object VRF field, and a post changeover state field. The monitor ID field, the changeover object interface field, and the post changeover state field are respectively equivalent to the monitor ID field, the changeover object interface field, and the post changeover operation field in the failure changeover database 180 of the first embodiment described above with reference to FIG. 10. The non-load balance object VRF field has registry of a VRF number to be excluded from a VRF network group as the object of the load balance process (to be excluded from the VRF number field in the VRF load balance database 141) when the status of a monitor object apparatus having the monitor ID changes from the normal state enabled to establish communication to the abnormal state disabled to establish communication.

The load balance changeover database 182 is provided, based on the configuration database 110 of defining the configuration information of the network apparatus 100b (FIG. 52). The information defined in the row C401 of the configuration information described above with reference to FIG. 52 is stored in an entry E41 in the load balance changeover database 182. Similarly the information defined in the row C403 is stored in an entry E42.

(D-2) Operations before Detection of Failure in Fourth Embodiment

Figure 59:
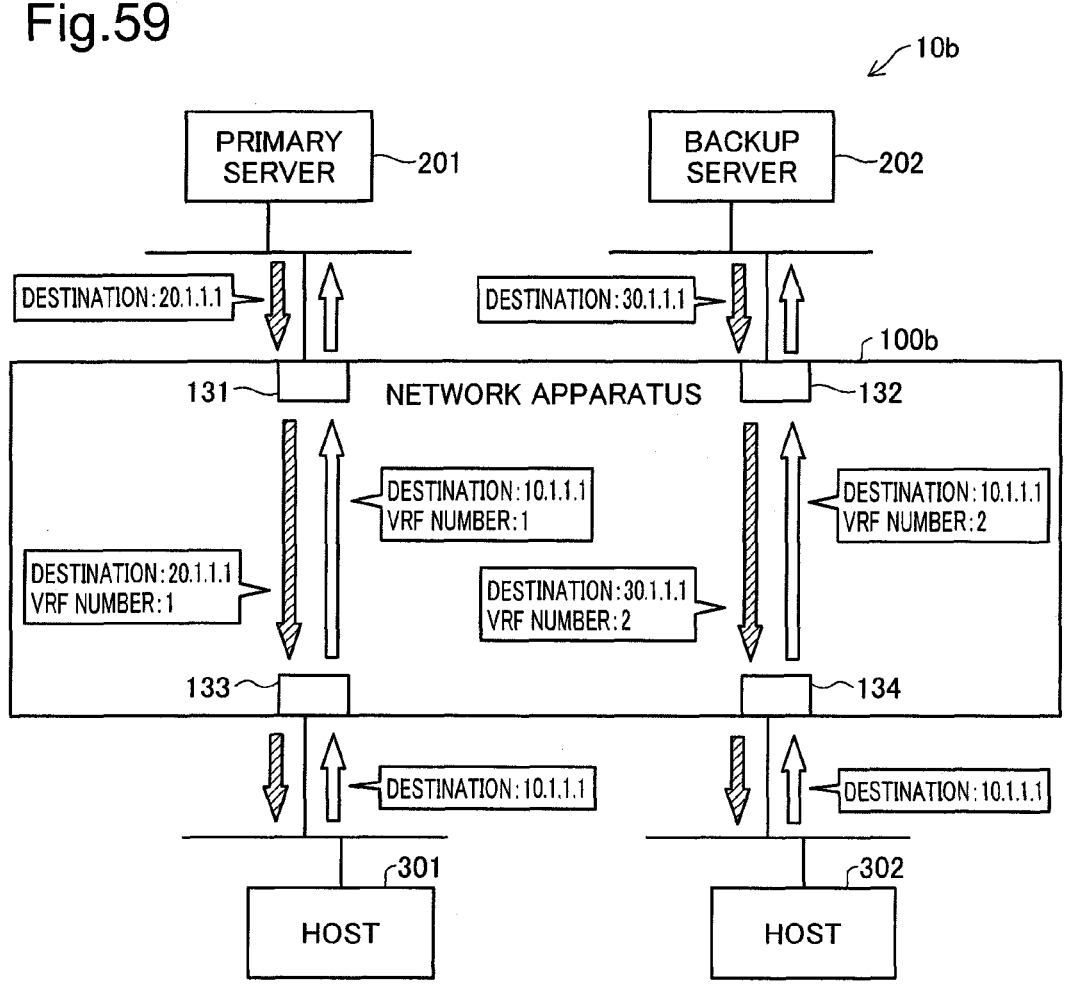
FIG. 59 is an explanatory diagrammatic representation of the operations of the network system in the normal state of both the primary server and the backup server enabled to provide the service.

FIG. 59 is an explanatory diagrammatic representation of the operations of the network system 10b in the normal state of both the primary server 201 and the backup server 202 enabled to provide the service. When receiving a request packet from the host 301, the network apparatus 100b specifies an output destination of the received request packet according to the packet forwarding process of FIG. 55. More specifically, the packet forwarding processor 150 obtains the registry of 'LB' in the VRF number field of a matching entry E43 corresponding to the interface identifier of '133' from the interface database 140 shown in FIG. 53 (step S12). Based on the obtained VRF number of 'LB', the packet forwarding processor 150 searches the VRF load balance database 141 (steps S21 and S22).

The packet forwarding processor 150 subsequently specifies the VRF number of '1' corresponding to the source IP address of '20.1.1.1' (step S23). Based on the specified VRF number of '1', the packet forwarding processor 150 searches the VRF1 routing table 121 to obtain the registry of '131' in the output interface field (step S13). The packet forwarding processor 150 then outputs the request packet via the output interface 131 specified at step S13, so as to forward the request packet sent from the host 301 to the primary server 201 (step S14).

The primary server 201 provides a required service based on the request packet received from the host 301 and sends back a replay packet to the host 301. The first VRF network is used for forwarding the reply packet (entry E41 in FIG. 53).

When receiving a request packet from the host 302, the network apparatus 100b similarly specifies an output destination of the received request packet according to the packet forwarding process of FIG. 55. More specifically, the packet forwarding processor 150 obtains the registry of 'LB' in the VRF number field of a matching entry E44 corresponding to the interface identifier of '134' from the interface database 140 shown in FIG. 53 (step S12). Based on the obtained VRF number of 'LB', the packet forwarding processor 150 searches the VRF load balance database 141 (steps S21 and S22).

The packet forwarding processor 150 subsequently specifies the VRF number of '2' corresponding to the source IP address of '30.1.1.1' (step S23). Based on the specified VRF number of '2', the packet forwarding processor 150 searches the VRF2 routing table 122 to obtain the registry of '132' in the output interface field (step S13). The packet forwarding processor 150 then outputs the request packet via the output interface 132 specified at step S13, so as to forward the request packet sent from the host 302 to the backup server 202 (step S14).

The backup server 202 provides a required service based on the request packet received from the host 302 and sends back a replay packet to the host 302. The second VRF network is used for forwarding the reply packet (entry E42 in FIG. 53).

In this manner, before detection of a failure either in the primary server 201 or in the backup server 202, these two servers 201 and 202 share the series of processing. Namely both the primary server 201 and the backup server 202 function as the working servers.

(D-3) Status Monitor Process in Fourth Embodiment

The status monitor process of the fourth embodiment follows the status monitor process of the first embodiment described above with reference to FIG. 14.

(D-4) Failover Process in Fourth Embodiment

Figure 60:
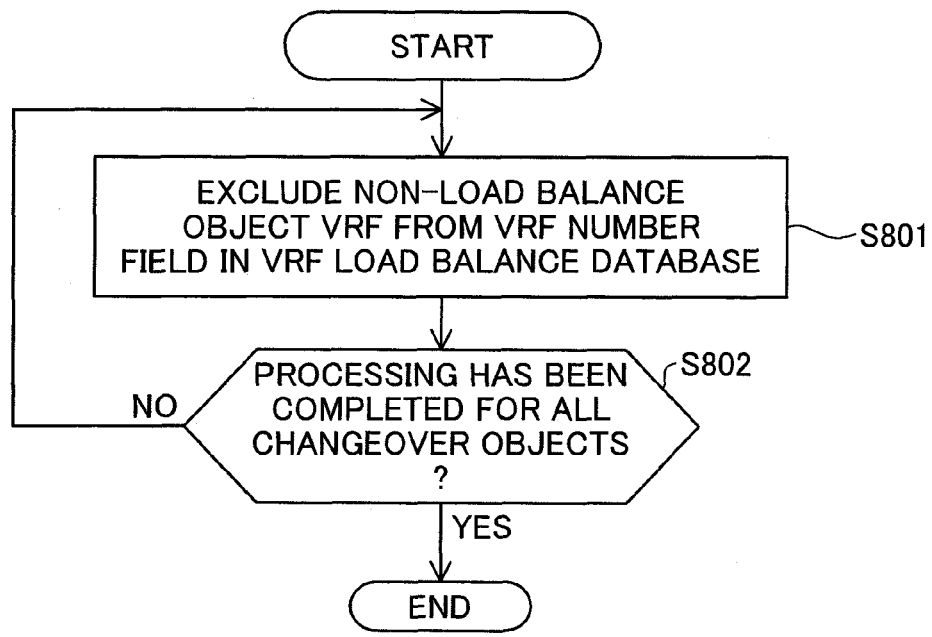
FIG. 60 is a flowchart showing the details of the failover process performed at step S508 (FIG. 14) in the fourth embodiment.

FIG. 60 is a flowchart showing the details of the failover process performed at step S508 (FIG. 14) in the fourth embodiment. The failover processor 160 refers to the monitor ID having detection of a failure in the status monitor process of FIG. 14 and the registries in the load balance changeover database 182 described above with reference to FIG. 58, and performs the failover process in response to detection of a failure according to the flowchart of FIG. 60.

The failover processor 160 excludes the non-load balance object VRF from the VRF number field in the VRF load balance database 141 at step S801. More specifically, the failover processor 160 searches the load balance changeover database 182 of FIG. 58 for any matching entry having the registry in the monitor ID field identical with the monitor ID having detection of a failure in the status monitor process and obtains the registries in the changeover object interface field, the non-load balance object VRF field, and the post changeover state field of the matching entry. The failover processor 160 subsequently searches the VRF load balance database 141 for any matching entry having the registry in the interface number field identical with the obtained changeover object interface, and excludes the obtained non-load balance object VRF from the VRF number field of the matching entry.

The failover processor 160 determines whether the processing has been completed for all the changeover objects at step S802. More specifically, it is determined whether the processing of step S801 has been completed for all the changeover object interfaces of the matching entries (having the registries in the monitor ID field identical with the monitor ID having detection of a failure in the status monitor process) in the load balance changeover database 182 searched at step S801. When the processing has been completed for all the changeover objects (step S802: Yes), the failover process is terminated. When the processing has not yet been completed for all the changeover objects (step S802: No), on the other hand, the processing flow goes back to step S801 and repeats the processing with regard to a next changeover object.

FIG. 61 is an explanatory diagrammatic representation of the VRF load balance database 141 updated at step S801 in the failover process of FIG. 60. The difference from the VRF load balance database 141 of FIG. 54 before detection of a failure is that the VRF number of '1' is excluded from and only the VRF number of '2' is stored in the VRF number field of entries E41 and E42 respectively having the registries of '133' and '134' in the interface number field.

Figure 62:
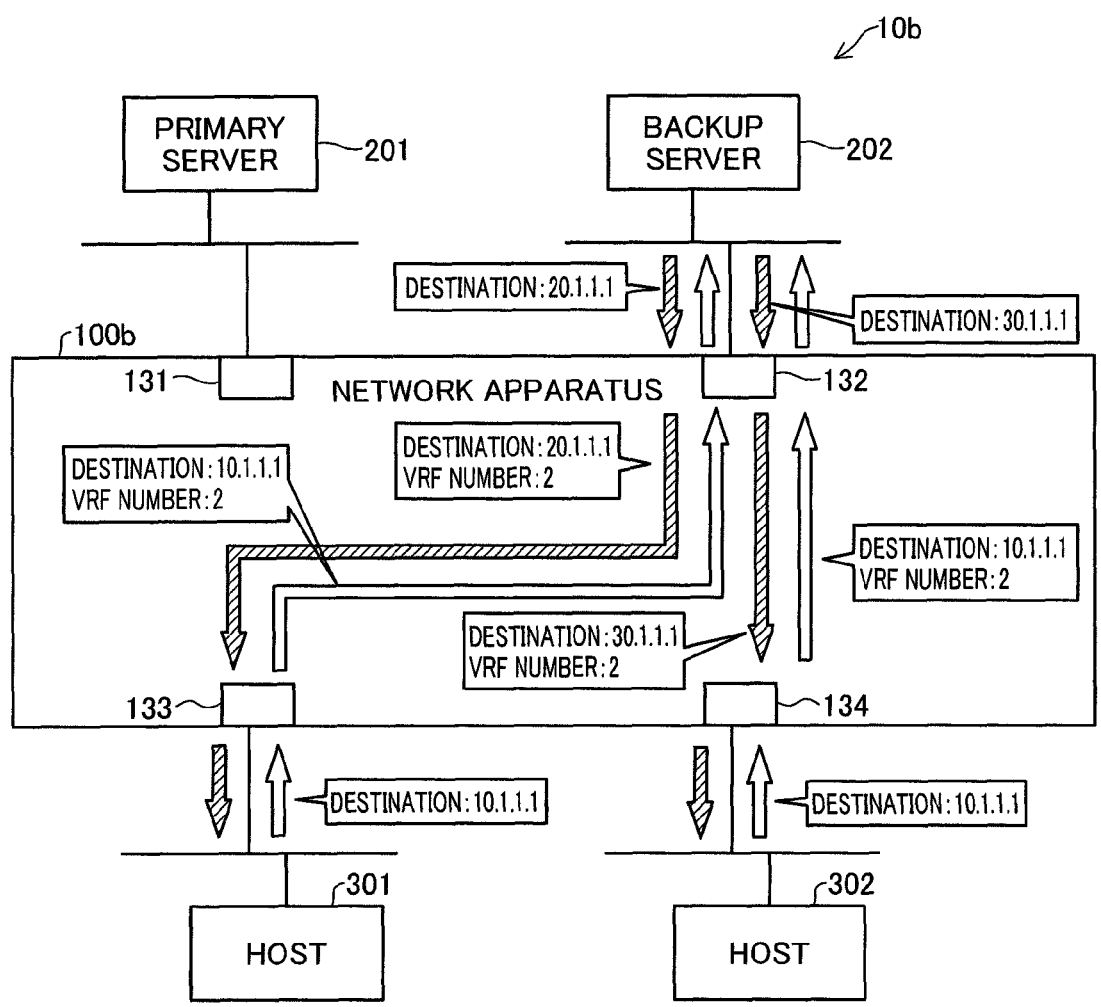
FIG. 62 is an explanatory diagrammatic representation of the operations of the network system after detection of a failure in the primary server.

FIG. 62 is an explanatory diagrammatic representation of the operations of the network system 10b after detection of a failure in the primary server 201. When receiving a request packet from the host 301, the network apparatus 100b specifies an output destination of the received request packet according to the packet forwarding process of FIG. 55. More specifically, the packet forwarding processor 150 obtains the registry of 'LB' in the VRF number field of a matching entry E43 corresponding to the interface identifier of '133' from the interface database 140 shown in FIG. 53 (step S12). Based on the obtained VRF number of 'LB', the packet forwarding processor 150 searches the VRF load balance database 141 of FIG. 61 (steps S21 and S22).

The packet forwarding processor 150 subsequently specifies the VRF number (step S23). In this state, the VRF number field has the registry of only '2' (as the identifier of the VRF network as the object of the load balance process) in the VRF load balance database 141 of FIG. 61. The packet forwarding processor 150 is thus forced to select the VRF number of '2', irrespective of the source IP address of '20.1.1.1'. The packet forwarding processor 150 searches the VRF2 routing table 122 to obtain the registry of '132' in the output interface field (step S13). The packet forwarding processor 150 then outputs the request packet via the output interface 132 specified at step S13, so as to forward the request packet sent from the host 301 to the backup server 202 (step S14).

The backup server 202 provides a required service based on the request packet received from the host 301 and sends back a replay packet to the host 301. The second VRF network is used for forwarding the reply packet (entry E42 in FIG. 53).

When receiving a request packet from the host 302, the network apparatus 100b has the same series of operations as those described above with reference to FIG. 59.

As described above, after detection of a failure in the primary server 201, the other server (backup server 202) other than the server having a failure (primary server 201) functions as the working server and performs the required series of processing. In a modified network configuration with three servers (first through third servers) sharing a load balance process, after detection of a failure in the first server, the other two servers (second server and third server) function as the working servers and share the required series of processing.

(D-5) Recover Detection-Time Process in Fourth Embodiment

Figure 63:
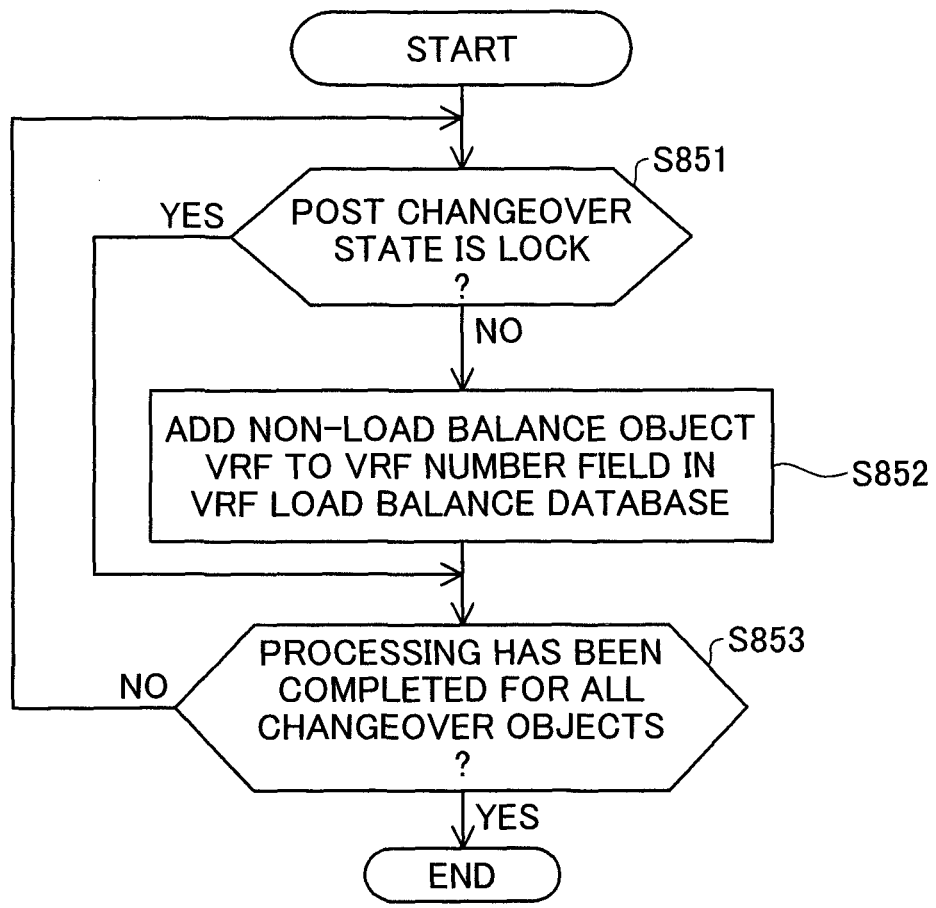
FIG. 63 is a flowchart showing the details of the recovery detection-time process performed at step S506 (FIG. 14) in the fourth embodiment.

FIG. 63 is a flowchart showing the details of the recovery detection-time process performed at step S506 (FIG. 14) in the fourth embodiment. The failover processor 160 refers to the monitor ID having detection of recovery from a failure in the status monitor process of FIG. 14 and the registries in the load balance changeover database 182 described above with reference to FIG. 58, and performs the recovery detection-time process in response to detection of recovery from a failure according to the flowchart of FIG. 63.

The failover processor 160 identifies whether the post changeover state is 'lock' at step S851. More specifically, the failover processor 160 searches the load balance changeover database 182 of FIG. 58 for any matching entry having the registry in the monitor ID field identical with the monitor ID having detection of recovery from a failure in the status monitor process, and obtains the registries in the changeover object interface field, the non-load balance object VRF field, and the post changeover state field of the matching entry. When the obtained post changeover state is 'lock' (step S851: Yes), the processing flow goes to step S853.

When the obtained post changeover state is not 'lock' (step S851: No), the failover processor 160 adds the obtained non-load balance object VRF to the VRF number field in the VRF load balance database 141 at step S852. More specifically, the failover processor 160 searches the VRF load balance database 141 of FIG. 61 for any matching entry having the registry in the interface number field identical with the obtained changeover object interface, and adds the obtained non-load balance object VRF to the VRF number field of the matching entry.

The failover processor 160 determines whether the processing has been completed for all the changeover objects at step S853. More specifically, it is determined whether the processing of steps S851 and S852 has been completed for all the changeover object interfaces of the matching entries (having the registries in the monitor ID field identical with the monitor ID having detection of recovery from a failure in the status monitor process) in the load balance changeover database 182 searched at step S851. When the processing has been completed for all the changeover objects (step S853: Yes), the recovery detection-time process is terminated. When the processing has not yet been completed for all the changeover objects (step S853: No), on the other hand, the processing flow goes back to step S851 and repeats the processing with regard to a next changeover object.

FIG. 64 is an explanatory diagrammatic representation of the VRF load balance database 141 updated at step S852 in response to detection of recovery from a failure in the recovery detection-time process of FIG. 63. The difference from the VRF load balance database 141 of FIG. 61 before detection of recovery is that the VRF number of '1' is added to the VF number field of the entry E42 having the registry of '134' in the interface number field.

As described above, the identifier of the VRF network as the object of the load balance process is stored in the VRF number field of the VRF load balance database 141. After completion of the recovery detection-time process, according to the updated registries of the VRF load balance database 141 of FIG. 64, a packet input via the interface 133 is processed in the second VRF network, while a packet input via the interface 134 is processed either in the first VRF network or in the second VRF network. This means that the interface 133 has been subjected to the lock operation and the interface 134 has been subjected to the recovery operation according to the load balance changeover database 182 of FIG. 58.

FIG. 65 is an explanatory diagrammatic representation of one example of a command. Execution of this operational command initializes the registries with regard to the interface 133 in the VRF load balance database 141 (to the state of FIG. 54). The network system 10b is accordingly restored to the original state before detection of a failure in the primary server 201.

As described above, on reception of a packet from a client apparatus (host 301 or host 302), the packet forwarding processor 150 of the fourth embodiment performs a route search based on either one of the VRF1 routing table 121 as the route information of the first virtual network and the VRF2 routing table 122 as the route information of the second virtual network selected corresponding to the source apparatus (host 301 or host 302) of the packet according to a predetermined rule. This arrangement enables the two processing apparatuses (primary server 201 and backup server 202) to provide services, thus assuring establishment of an efficient network system from the viewpoint of capital investment.

The failover processor 160 functioning as the status monitor monitors the statuses of both the first processing apparatus (primary server 201) belonging to the first virtual network (VRF1) and the second processing apparatus (backup server 202) belonging to the second virtual network (VRF2). On detection of a failure occurring in one of the processing apparatuses as the monitor objects, the failover processor 160 updates the VRF load balance database 141 as the VRF definition information to exclude the client apparatuses (hosts 301 and 302), which belong to both the first virtual network and the second virtual network, from the virtual network which the monitor object processing apparatus having the failure belongs to. The network configuration of the fourth embodiment has the similar effects to those of the network configuration of the first embodiment described previously.

E. Fifth Embodiment

A network configuration including a management server for managing the operation statuses of servers providing services is described as a fifth embodiment according to the invention.

(E-1) System Configuration of Fifth Embodiment

Figure 66:
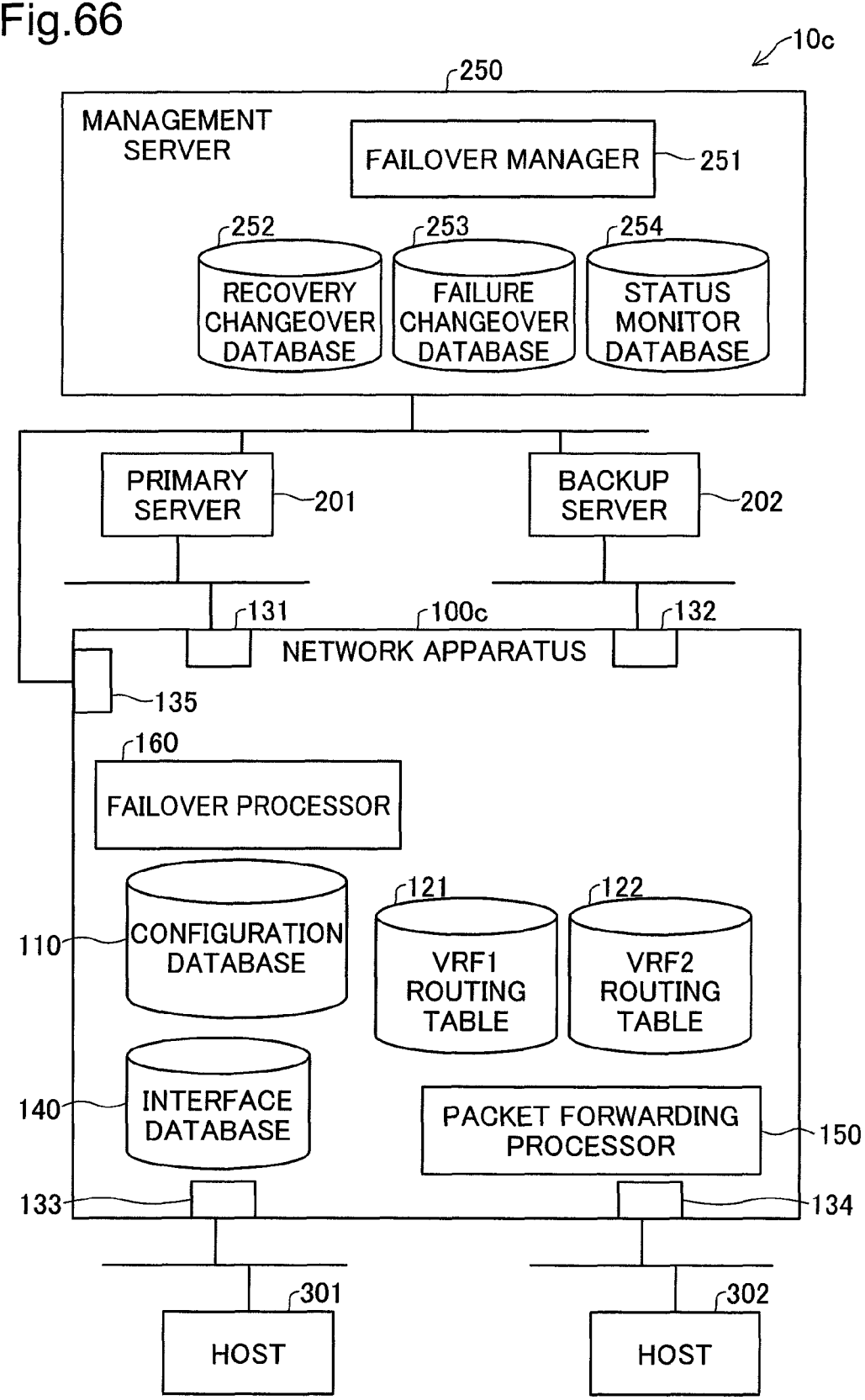
FIG. 66 is an explanatory diagrammatic representation of the general configuration of a network system according to the fifth embodiment of the invention.

FIG. 66 is an explanatory diagrammatic representation of the general configuration of a network system 10c according to the fifth embodiment of the invention. The general configuration of the network system 10c in the fifth embodiment is similar to that of the network system 10 of the first embodiment shown in FIG. 1, except addition of a management server 250 functioning as a management apparatus and addition of an interface 135 to and omission of the status monitor database 170, the failure changeover database 180, and the recovery changeover database 190 from a network apparatus 100c. The like components in the configuration of the fifth embodiment to those in the configuration of the first embodiment are expressed by the like symbols and numerals and are not specifically described here. Only the differences from the structures, the operations, and the effects of the first embodiment are described below.

The management server 250 is an external device connected to the network apparatus 100c via the interface 135. The management server 250 has the function of monitoring the statuses of both a primary server 201 and a backup server 202 and gives an instruction for a failover process to the network apparatus 100c.

The management server 250 includes a failover manager 251, a status monitor database 254, a failure changeover database 253, and a recovery changeover database 252. The details of the failover manager 251 will be described later. The status monitor database 254 has the same structure as that of the status monitor database 170 of the first embodiment described above with reference to FIG. 9. The failure changeover database 253 has the same structure as that of the failure changeover database 180 of the first embodiment described above with reference to FIG. 10. The recovery changeover database 252 has the same structure as that of the recovery changeover database 190 of the first embodiment described above with reference to FIG. 11.

A failover processor 160 included in the network apparatus 100c of the fifth embodiment receives the instruction from the management server 250 and performs a failover process. An IP address, a subnet mask length, and a default gateway set in the management server 250 are not directly related to the following description and are thus not specifically explained here.

FIG. 67 is an explanatory diagrammatic representation of one example of configuration information of the network apparatus 100c in the fifth embodiment. The difference from the configuration information of the first embodiment shown in FIG. 5 is deletion of the rows C11 and C15 and addition of rows C501 through C503. Otherwise the configuration information of the fifth embodiment is similar to the configuration information of the first embodiment.

The row C501 defines the interface 135. The interface 135 is an Ethernet (registered trademark) interface. The row C502 defines an IP address and a subnet mask length of the interface 135. The row C503 defines that the management server 250 gives a failover instruction. The definition of the row C503 may be omitted but is preferably included in the configuration information to prevent the network operation 100c from being operated in response to a failover instruction from an unexpected external device.

Unlike the interfaces 131 through 134, the interface 135 has no definition on the belongingness to a VRF network. This means that the interface 135 is an independent interface that does not belong to any VRF network.

FIG. 68 is an explanatory diagrammatic representation of one example of an interface database 140 in the fifth embodiment. The difference from the interface database 140 of the first embodiment shown in FIG. 6 is only addition of an entry E55. The information defined in the rows C501 and C502 in the configuration information of FIG. 67 is registered in the entry E55.

(E-2) Status Monitor Process in Fifth Embodiment

Figure 69:
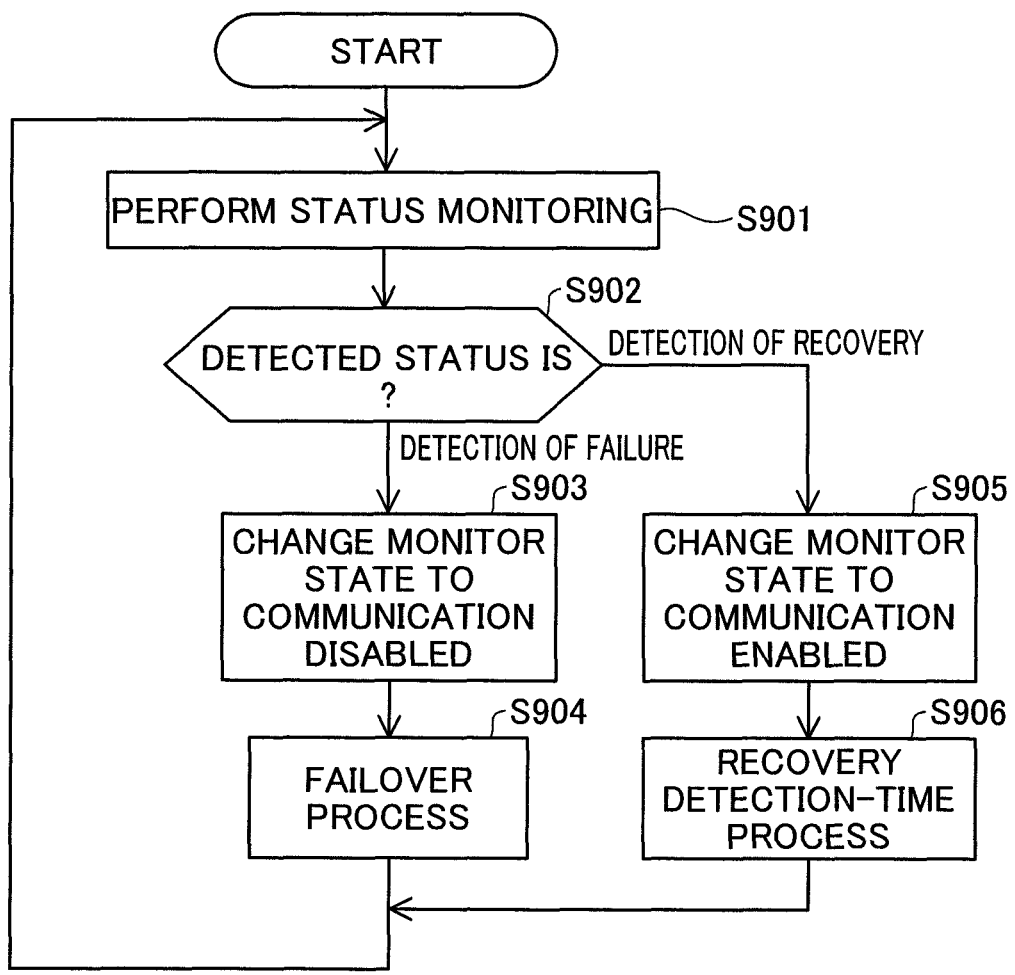
FIG. 69 is a flowchart showing a status monitor process performed in the fifth embodiment.

FIG. 69 is a flowchart showing a status monitor process performed in the fifth embodiment. The failover manager 251 of the management server 250 refers to the status monitor database 254 and monitors the operation statuses of the primary server 201 and the backup server 202 according to the flowchart of FIG. 69. The failover manager 251 performs status monitoring of the two servers 201 and 202 based on the status monitor database 254 at step S901. According to one typical procedure of failure or recovery detection, the failover manager 251 sends a packet to each monitor object apparatus at regular intervals and detects the occurrence of a failure or recovery from a failure corresponding to non-reception or re-reception of a reply packet sent back from the monitor object apparatus as a response to the packet. Another procedure may be adopted for the same purpose; for example, the network apparatus 100c may perform monitoring to detect the occurrence of a failure or recovery from a failure and send a monitoring result to the management server 250 at regular intervals.

The failover manager 251 identifies the result of the status monitoring at step S902. On detection of a failure occurring in the monitor object apparatus, the failover manager 251 updates the registry in the monitor state field of a corresponding entry in the status monitor database 254 to 'communication disabled' at step S903. The processing of step S903 is similar to the processing of step S507 in the flowchart of FIG. 14 described in detail above. At subsequent step S904, the failover manager 251 performs a failover process as described later.

On detection of recovery from a failure in the monitor object apparatus (step S902), the failover manager 251 updates the registry in the monitor state field of a corresponding entry in the status monitor database 254 to 'communication enabled' at step S905. The processing of step S905 is similar to the processing of step S505 in the flowchart of FIG. 14 described in detail above. At subsequent step S906, the failover manager 251 performs a recovery detection-time process as described later.

(E-3) Failover Process in Fifth Embodiment

Figure 70:
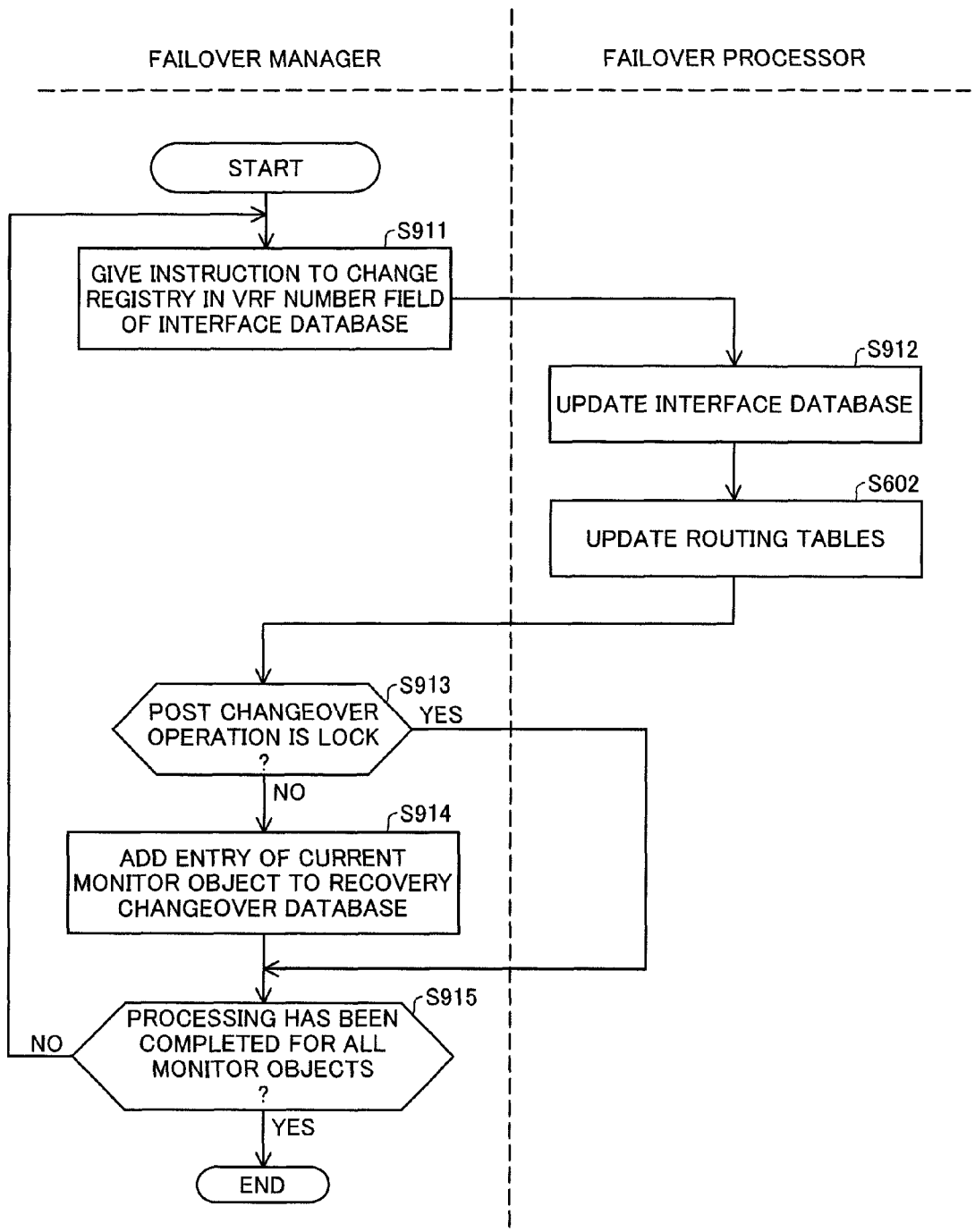
FIG. 70 is a flowchart showing the details of the failover process performed at step S904 (FIG. 69)

FIG. 70 is a flowchart showing the details of the failover process performed at step S904 (FIG. 69). A left column of FIG. 70 shows series of processing performed by the failover manager 251 of the management server 250, while a right column shows series of processing performed by a failover processor 160 of the network apparatus 100c. This is also adopted for the flowchart of FIG. 71 described later.

The failover manager 251 gives a VRF number changeover instruction at step S911. More specifically, the failover manager 251 searches the failure changeover database 253 for any matching entry having the registry in the monitor ID field identical with the monitor ID having detection of a failure in the status monitor process, and obtains the registries in the changeover object interface field, the changeover destination VRF field, and the post changeover operation field of the matching entry. The failover manager 251 then sends an instruction for updating the interface database 140 based on the obtained registries to the failover processor 160 of the network apparatus 100c.

The failover processor 160 updates the interface database 140 based on the contents of the instruction received from the failover manager 251 (step S912) and updates routing tables (step S602) in the same manner as the first embodiment described above.

The failover manager 251 subsequently identifies whether the post changeover operation is a 'lock' operation at step S913. This identification is based on the registry in the post changeover operation field of the failure changeover database 253 obtained at step S911. When the registry in the post changeover operation field is 'lock' (step S913: Yes), the processing flow goes to step S915. When the registry in the post changeover operation field is not 'lock' (step S913: No), on the other hand, the failover manager 251 adds information on an entry of the current monitor object to the recovery changeover database 252 at step S914. The failover manager 251 determines whether the processing has been completed for all the changeover objects at step S915. When the processing has been completed for all the changeover objects (step S915: Yes), the failover process is terminated. When the processing has not yet been completed for all the changeover objects (step S915: No), on the other hand, the processing flow goes back to step S911 and repeats the same series of processing with regard to a next changeover object.

(E-4) Recover Detection-Time Process in Fifth Embodiment

Figure 71:
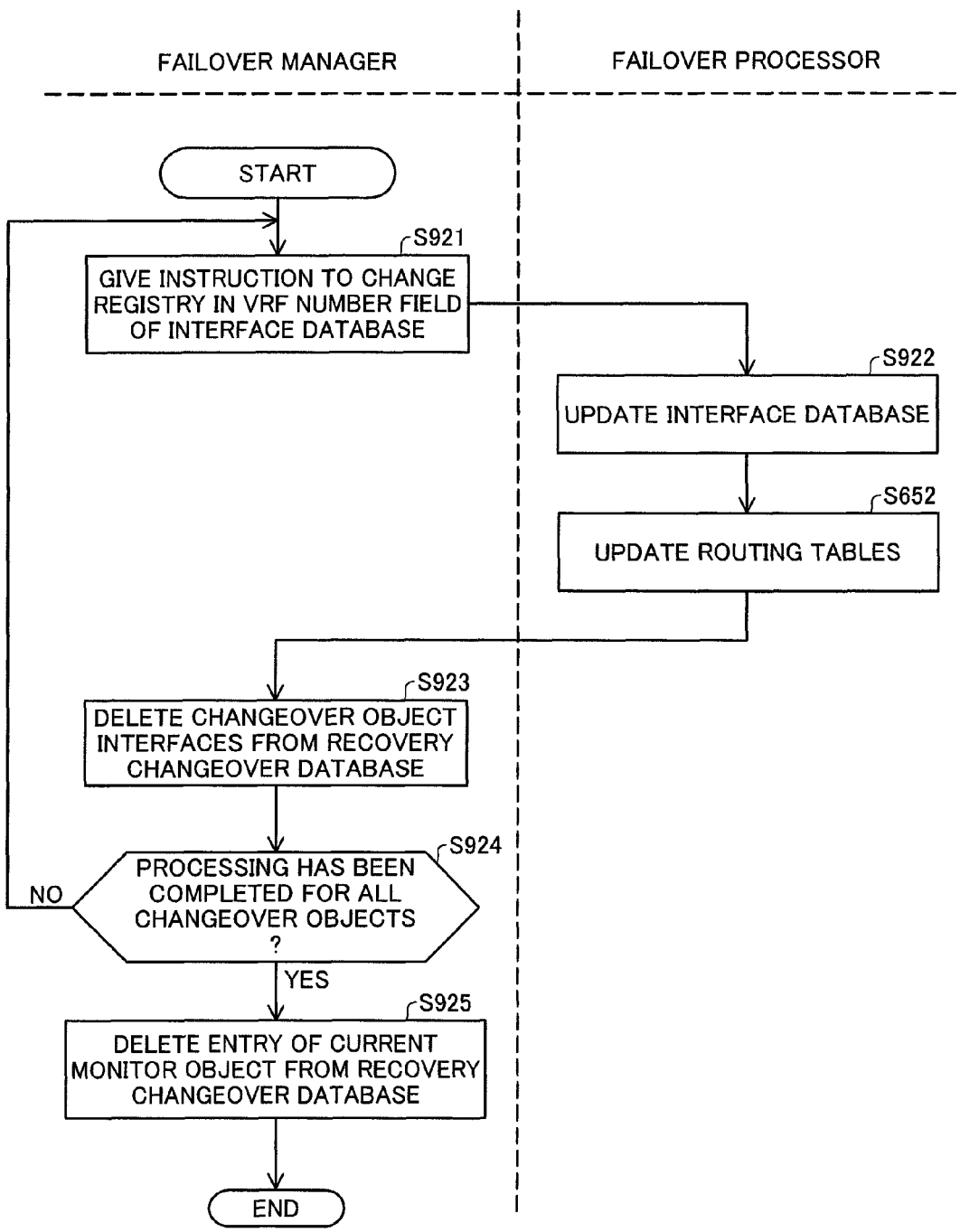
FIG. 71 is a flowchart showing the details of the recovery detection-time process performed at step S906 (FIG. 69).

FIG. 71 is a flowchart showing the details of the recovery detection-time process performed at step S906 (FIG. 69). The failover manager 251 gives a VRF number changeover instruction at step S921. More specifically, the failover manager 251 searches the recovery changeover database 252 for any matching entry having the registry in the monitor ID field identical with the monitor ID having detection of recovery from a failure in the status monitor process, and obtains the registries in the changeover object interface field and the changeover destination VRF field of the matching entry. The failover manager 251 then sends an instruction for updating the interface database 140 based on the obtained registries to the failover processor 160 of the network apparatus 100c.

The failover processor 160 updates the interface database 140 based on the contents of the instruction received from the failover manager 251 (step S922) and updates the routing tables (step S652) in the same manner as the first embodiment described above. At step S923, the failover manager 251 deletes the changeover object interface processed at steps S921 through S652.

The failover manager 251 determines whether the processing has been completed for all the changeover objects at step S924. When the processing has been completed for all the changeover objects (step S924: Yes), the failover manager 251 deletes an entry of the monitor ID having detection of recovery from a failure in the status monitor process from the recovery changeover database 252 at step S925 and terminates the recovery detection-time process. When the processing has not yet been completed for all the changeover objects (step S924: No), on the other hand, the processing flow goes back to step S921 and repeats the same series of processing with regard to a next changeover object.

In the network configuration of the fifth embodiment, the failover manager 251 of the management server 250 implements part of the functions performed by the failover processor 160 in the network configuration of the first embodiment. The substantive processing contents of the failover process and the recovery detection-time process in the fifth embodiment are similar to those in the first embodiment.

As described above, the failover manager 251 of the management apparatus (management server 250) of the fifth embodiment sends a failover instruction for updating at least one of the route information and the VRF definition information to the failover processor 160 of the network apparatus 100c. The network configuration of the fifth embodiment including the management apparatus provided as an external device outside the network relay apparatus has the similar effects to those of the network configuration of the first embodiment described previously.

The management server 250 generally has the higher throughput capacity than the network apparatus 100c. The management server 250 may thus perform the more advanced detection, for example, a CPU utilization rate of each processing apparatus, in addition to detection of a failure.

F. Modifications

The invention is not limited to any of the embodiments and their applications discussed above but may be actualized in diversity of other embodiments and applications within the scope of the invention. Some examples of possible modification are given below.

F1. Modification 1

For the simplicity of explanation, the network apparatus has the two VRFs in the embodiments described above. The number of VRFs implemented on the network apparatus may be determined arbitrarily. A VRF attributes-free global network may be implemented on the network apparatus. In this case, the global network may be regarded as one type of VRF without the VRF attributes.

F2. Modification 2

The exemplary configurations of the network systems are described in the above embodiments. The configuration of the network system is, however, not restricted to these embodiments but may be changed and modified arbitrarily within the scope of the invention. The number of servers and the number of hosts included in the network system may be determined arbitrarily. Any of the servers and the hosts may be connected indirectly to the network apparatus via another network apparatus.

F3. Modification 3

The exemplary structures of the network apparatuses are described in the above embodiments. The structure of the network apparatus is, however, not restricted to these embodiments but may be changed and modified arbitrarily within the scope of the invention. For example, logical interfaces multiplexed on a VLAN (Virtual Local Area Network) may be provided as the interfaces of the network apparatus. In another example, tunnel interfaces, LSPs (Label Switched Paths) of MPLS (Multi-Protocol Label Switching), and other virtual interfaces may be provided as the interfaces of the network apparatus.

F4. Modification 4

The exemplary structures of the tables included in the network apparatus are described in the above embodiments. The fields included in the tables may be determined arbitrarily within the scope of the invention. For example, the tables may be structured to have other adequate fields, in addition to or in place of those described in the embodiments. The respective tables may be formed in the direct map format.

F5. Modification 5

In the embodiments described above, the primary server providing service is specified as the monitor object in the status monitor process. The monitor object in the status monitor process may be determined arbitrarily. For example, a server that does not directly provide the service or a database server or a storage device required for the service may be specified as the monitor object. The monitor object apparatus may be determined flexibly according to the configuration of the network system.

F6. Modification 6

The status monitor process described in each of the embodiments is only illustrative but is not restrictive in any sense. The status monitor process may follow any other suitable procedure. For example, a TCP (Transmission Control Protocol) session may be established between a network apparatus and a server. Disconnection of the TCP session may be detected as a failure, and reestablishment of the TCP session may be detected as recovery from a failure. The session for monitoring the status of the server is not limited to the TCP session but may be any other suitable session, for example, a BFD (Bidirectional Forwarding Detection) session. The network apparatus may have access to the service provided by the server, with a view to monitoring the operation status of the server.

F7. Modification 7

In the network configuration of the fifth embodiment, the failover manager of the management server takes over part of the functions performed by the failover processor of the network apparatus in the network configuration of the first embodiment. This application is, however, not restricted to the first embodiment. Any of the network configurations of the second through the fourth embodiments may be modified to include a management server, which is provided as an external device outside the network apparatus and takes over part of the functions performed by the processor of the network apparatus. For example, the management server may perform part of the load balance process described in the fourth embodiment. This modified arrangement allows for the more advanced load balance, for example, corresponding to the CPU utilization rate of each server.

F8. Modification 8

The second, through the fifth embodiments are described as the modifications of the first embodiment. The second through the fifth embodiments may be implemented as modifications of any embodiment other than the first embodiment. The first through the fifth embodiments may be applied in any combinations.

The embodiments and their modified examples discussed above are to be considered in all aspects as illustrative and not restrictive. There may be many other modifications, changes, and alterations without departing from the scope or spirit of the main characteristics of the present invention. Part or all of the structures and the functions actualized by the hardware devices, modules or units in the above embodiments may be accomplished by the software configuration. Part or all of the functions implemented by the software modules in the above embodiments may be accomplished by the hardware configuration. All changes within the meaning and range of equivalency of the claims are intended to be embraced therein. The scope and spirit of the present invention are indicated by the appended claims, rather than by the foregoing description.

What is claimed is:

1. A network system, comprising:
   a first processing apparatus configured to provide a specific service;
   a second processing apparatus configured to provide the specific service, the first processing apparatus and the second processing apparatus having one identical address;
   a client apparatus configured to utilize the specific service;
   a network relay apparatus connected directly or indirectly via interfaces to the first processing apparatus, the second processing apparatus, and the client apparatus, configured to relay packet transmission between the client apparatus and the first processing apparatus or the second processing apparatus, and configured to forward a received packet, which is received via the interface connecting with the client apparatus to be sent to the address as a destination, to one processing apparatus in a state enabled to provide the specific service between the first processing apparatus and the second processing apparatus;
   wherein the network relay apparatus includes:
   a VRF definition information storage configured to store VRF definition information that defines belonginqness of each of the first processing apparatus, the second processing apparatus, and the client apparatus, to either of a first virtual network and a second virtual network;
   a status monitor configured to monitor a status of at least one of the first processing apparatus and the second processing apparatus specified as a monitor object apparatus, and to detect a state of the monitor object apparatus; and
   a failover processor configured to update the belongingness of the client apparatus to either of the first virtual network and the second virtual network in the VRF definition information, based on the detected state of the monitor object apparatus,
   a packet forwarding processor configured to, on detection of the packet, specify a virtual network to which a source apparatus of the packet belongs, by referring to the VRF definition information.

2. The network system in accordance with claim 1, wherein the network relay apparatus comprises:
   a first route information storage configured to store route information of the first virtual network;
   a second route information storage configured to store route information of the second virtual network;
   wherein the packet forwarding processor is further configured to perform a route search based on route information corresponding to the specified virtual network.

3. The network system in accordance with claim 2, wherein the VRF definition information defines that:
   the first processing apparatus and the client apparatus belong to the first virtual network; and
   the second processing apparatus belongs to the second virtual network,
   the status monitor monitors a status of at least the first processing apparatus belonging to the first virtual network, and
   on detection of a failure of the first processing apparatus that falls in a state disabled to provide the specific service, the failover processor updates the VRF definition information to change the belongingness of the client apparatus from the first virtual network to the second virtual network.

4. The network system in accordance with claim 3, wherein after detection of the failure occurring in the monitor object apparatus, the status monitor continues monitoring the status of the monitor object apparatus,
   on detection of recovery from the failure in the monitor object apparatus that falls in a state enabled to provide the specific service,
   the failover processor selectively performs either of:
   a recovery operation of updating at least one of the route information and the VRF definition information to an original state before detection of the failure; and
   a lock operation of updating neither route information nor the VRF definition information.

5. The network system in accordance with claim 2, wherein the VRF definition information defines that:
   the first processing apparatus and the client apparatus belong to the first virtual network; and
   the second processing apparatus belongs to the second virtual network,
   the status monitor monitors a status of at least the first processing apparatus belonging to the first virtual network, and
   on detection of a failure of the first processing apparatus that falls in a state disabled to provide the specific service, the failover processor updates the VRF definition information to change the belongingness of the second processing apparatus and the client apparatus to the first virtual network, and change the belongingness of the first processing apparatus to the second virtual network.

6. The network system in accordance with claim 2, wherein the VRF definition information defines that:
   the first processing apparatus and the client apparatus belong to the first virtual network; and
   the second processing apparatus belongs to the second virtual network,
   the status monitor monitors a status of at least the first processing apparatus belonging to the first virtual network, and
   on detection of a failure of the first processing apparatus that falls in a state disabled to provide the specific service, the failover processor copies route information with regard to the client apparatus among the route information of the first virtual network onto the route information of the second virtual network, and updates the route information of the first virtual network to change an output interface set for a received packet with the address of the first processing apparatus as a destination address, to the interface connecting with the second processing apparatus.

7. The network system in accordance with claim 2, wherein the VRF definition information defines that:
   the first processing apparatus belongs to the first virtual network;
   the second processing apparatus belongs to the second virtual network; and
   the client apparatus belongs to both the first virtual network and the second virtual network, on reception of a packet from the client apparatus, the packet forwarding processor performs a route search based on either one of the route information of the first virtual network and the route information of the second virtual network according to a predetermined rule, where selection of route information is based on a source apparatus of the packet, the status monitor monitors both the first processing apparatus belonging to the first virtual network and the second processing apparatus belonging to the second virtual network specified as monitor object apparatuses, on detection of a failure occurring in one of the monitor object apparatuses that falls in a state disabled to provide the specific service, the failover processor updates the VRF definition information to exclude the client apparatus, which belongs to both the first virtual network and the second virtual network, from a virtual network to which the monitor object apparatus having the failure belongs.

8. The network system in accordance with claim 2, further comprising:

a management apparatus configured to manage the network relay apparatus, wherein the management apparatus includes:

a failover manager configured to send a failover instruction to the failover processor to update at least one of route information and the VRF definition information.

9. A network relay apparatus connected directly or indirectly via interfaces to a first processing apparatus and a second processing apparatus and for relaying packet transmission between the client apparatus and the first processing apparatus or the second processing apparatus, the first processing apparatus and the second processing apparatus have an identical address allocated thereto and are configured to provide a specific service, and to a client apparatus configured to utilize the specific service, the network relay apparatus comprising:

a VRF definition information storage configured to store VRF definition information that defines belongingness of each of the first processing apparatus, the second apparatus, and the client apparatus to either of a first virtual network and a second virtual network;

a status monitor configured to monitor a status of at least one of the first processing apparatus and the second processing apparatus specified by a monitor object apparatus and detect a state of the monitor object apparatus; and a failover processor configured to update the belongingness of the client apparatus to either of the first virtual network and the second virtual network in the VRF definition information, based on the detected state of the monitor object apparatus, a packet forwarding processor configured to, on detection of a packet, specify a virtual network to which a source apparatus of the packet belongs by referring to the VRF definition information, and further configured to forward the packet, which is received via the interface connecting with the client apparatus to be sent to the address as a destination, to one processing apparatus in a state enabled to provide the specific service between the first processing apparatus and the second processing apparatus.

10. The network relay apparatus in accordance with claim 9, further comprising:

a first route information storage configured to store route information of the first virtual network;

a second route information storage configured to store route information of a the second virtual network;

wherein the packet forwarding processor configured to perform a route search based on route information corresponding to the specified virtual network.

11. The network relay apparatus in accordance with claim 10, wherein the VRF definition information defines that:

the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor updates the VRF definition information to change the belongingness of the client apparatus from the first virtual network to the second virtual network.

12. The network relay apparatus in accordance with claim 11, wherein after detection of the failure occurring in the monitor object apparatus, the status monitor continues monitoring the status of the monitor object apparatus, on detection of recovery from the failure in the monitor object apparatus that falls in a state enabled to provide the specific service, the failover processor selectively performs either of:

a recovery operation of updating at least one of the route information and the VRF definition information to an original state before detection of the failure; and a lock operation of updating neither route information nor the VRF definition information.

13. The network relay apparatus in accordance with claim 10, wherein the VRF definition information defines that:

the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor updates the VRF definition information to change the belongingness of the second processing apparatus and the client apparatus to the first virtual network, and change the belongingness of the first processing apparatus to the second virtual network.

14. The network relay apparatus in accordance with claim 10, wherein the VRF definition information defines that:

the first processing apparatus and the client apparatus belong to the first virtual network; and the second processing apparatus belongs to the second virtual network, the status monitor monitors a status of at least the first processing apparatus belonging to the first virtual network, and on detection of a failure of the first processing apparatus that falls in a state disabled to provide the specific service, the failover processor copies route information with regard to the client apparatus among the route information of the first virtual network, onto the route information of the second virtual network, and updates the route information of the first virtual network to change an output interface set for a received packet with the address of the first processing apparatus as a destination address, to the interface connecting with the second processing apparatus.

15. The network relay apparatus in accordance with claim 10, wherein
the VRF definition information defines that:
the first processing apparatus belongs to the first virtual network;
the second processing apparatus belongs to the second virtual network; and
the client apparatus belongs to both the first virtual network and the second virtual network,
on reception of the packet from the client apparatus, the packet forwarding processor performs a route search based on either one of the route information of the first virtual network and the route information of the second virtual network according to a predetermined rule, where selection of route information is based on a source apparatus of the packet,
the status monitor monitors both the first processing apparatus belonging to the first virtual network and the second processing apparatus belonging to the second virtual network, specified as monitor object apparatuses,
on detection of a failure occurring in one of the monitor object apparatuses that falls in a state disabled to provide the specific service, the failover processor updates the VRF definition information to exclude the client apparatus, which belongs to both the first virtual network and the second virtual network, from a virtual network to which the monitor object apparatus having the failure belongs.

16. The network relay apparatus in accordance with claim 10,
the network relay apparatus being connected with a management apparatus configured to manage the network relay apparatus, wherein
the failover processor receives a failover instruction from the management apparatus to update at least one of route information and the VRF definition information.

17. A control method implemented by a network system including a first processing apparatus configured to provide a specific service, a second processing apparatus configured to provide the specific service; a client apparatus configured to utilize the specific service, and a network relay apparatus connected directly or indirectly via interfaces to the first processing apparatus, the second processing apparatus, and the client apparatus, and configured to relay packet transmission between the client apparatus and the first processing apparatus or the second processing apparatus,
the control method comprising:
allocating one identical address to both the first processing apparatus and the second processing apparatus;
storing VRF definition information that defines belongingness of each of the first processing apparatus, the second processing apparatus, and the client apparatus to either of a first virtual network and a second virtual network;
monitoring a status of at least one of the first processing apparatus and the second processing apparatus specified as a monitor object apparatus, and detecting a state of the monitor object apparatus;
updating the belongingness of the client apparatus to either of the first virtual network and the second virtual network in the VRF definition information, based on the detected state of the monitor object apparatus,
on detection of a packet, specify a virtual network to which a source apparatus of the packet belongs by referring to the VRF definition information; and,
forwarding the packet, which is received via the interface connecting with the client apparatus to be sent to the address as a destination, to one processing apparatus in a state enabled to provide the specific service between the first processing apparatus and the second processing apparatus.

* * * * *